(12) United States Patent
Wu et al.

(10) Patent No.: US 9,342,505 B2
(45) Date of Patent: May 17, 2016

(54) TRANSLATION PROTOCOL FOR LARGE DISCOVERY PROJECTS

(71) Applicants: Jianqing Wu, Beltsville, MD (US); Ping Zha, Beltsville, MD (US)

(72) Inventors: Jianqing Wu, Beltsville, MD (US); Ping Zha, Beltsville, MD (US)

(*) Notice: Subject to any disclaimer, the term of this patent is extended or adjusted under 35 U.S.C. 154(b) by 130 days.

(21) Appl. No.: 13/907,943

(22) Filed: Jun. 2, 2013

(65) Prior Publication Data
US 2014/0358518 A1  Dec. 4, 2014

(51) Int. Cl.
*G06Q 50/18* (2012.01)
*G06F 17/28* (2006.01)
*G06Q 10/10* (2012.01)

(52) U.S. Cl.
CPC .......... *G06F 17/2836* (2013.01); *G06F 17/289* (2013.01); *G06F 17/2854* (2013.01); *G06Q 10/10* (2013.01); *G06Q 50/18* (2013.01)

(58) Field of Classification Search
None
See application file for complete search history.

(56) References Cited

U.S. PATENT DOCUMENTS

| | | | | |
|---|---|---|---|---|
| 6,691,103 B1* | 2/2004 | Wozny | .............. | G06F 17/30424 |
| 7,376,561 B2* | 5/2008 | Rennillo | .................. | G10L 15/26 |
| | | | | 704/235 |
| 7,783,472 B2* | 8/2010 | Nagao | .................... | G06F 17/289 |
| | | | | 704/2 |
| 7,925,494 B2* | 4/2011 | Cheng | ................... | G06F 17/289 |
| | | | | 704/2 |
| 2003/0187681 A1* | 10/2003 | Spain | .................. | G06F 17/2872 |
| | | | | 705/28 |
| 2005/0288920 A1* | 12/2005 | Green | ................. | G06F 17/2785 |
| | | | | 704/3 |
| 2006/0136824 A1* | 6/2006 | Lin | ...................... | G06F 17/2836 |
| | | | | 715/264 |
| 2011/0047156 A1* | 2/2011 | Knight | .............. | G06F 17/30705 |
| | | | | 707/737 |
| 2012/0240039 A1* | 9/2012 | Walker | .................... | G06Q 10/10 |
| | | | | 715/265 |

* cited by examiner

*Primary Examiner* — Pierre-Louis Desir
*Assistant Examiner* — Yi-Sheng Wang
(74) *Attorney, Agent, or Firm* — Jianqing Wu

(57) ABSTRACT

The present invention is a server-based translation protocol for improving translation performance for cases where a large number of documents are generated in a source language context but the controversies are adjudicated in a different language context. The protocol is intended to improve terminology consistency, offset the effects of contextual shift on perceived facts in translations, and improve task-tracking order. If the protocol is used by well trained and motivated document reviewers in a collaborative and harmonic environment, it can reduce unnecessary translations, improve translation accuracy, minimize the needs for amendments, control translation costs, and help the client significantly improve its litigation position.

20 Claims, 14 Drawing Sheets

Index Table | Name Search | Full Screen | Email | Set up Project | Set up Tables | Log out

Review Assistance

Date: 4/3/2009
Manager: Manager Lastname

| Global Search | | | | | | | | | | | | Search | | |
|---|---|---|---|---|---|---|---|---|---|---|---|---|---|---|

Coding Rules | Translation Log | Foreign Terms | Transactions | Attorneys | Special Terms | Discussion Pad | Instructions
Validated Table | Combined Table | Tentative Table | Edit table | Reference table

Attorney Name Table

| | No. | Email | First Name | MI | Last Name | Company | Date | Type | Comments | Entry date | Confirm date | App | Initials |
|---|---|---|---|---|---|---|---|---|---|---|---|---|---|
| ☐ | 1222 | test9999@test.com | Jack | | Smith | New Law Firm, LLP | 01/20/20081 | | | 04/03/2009 12:10:25 | 04/03/2009 12:32:07 | VOTE | TST |
| ☐ | 1223 | test99991@test.com | Lisa | | Cars | Law House, LLP | 01/20/20080 | | 周律师所 | 04/03/2009 12:15:10 | 04/03/2009 12:32:07 | VOTE-R | TST |

Current Votes: 3

| User ID | Initials | Vote Date |
|---|---|---|
| 6 | TSF | 04-03-2009 12:32:07 |
| 5 | TST2 | 04-03-2009 12:29:18 |
| 4 | TST1 | 04-03-2009 12:21:05 |

| | 12 | | | | | | | Test | | 03/03/2009 08:44:52 | 03/03/2009 10:29:50 | MG | null |
| ☐ | 12 | | | | | Large & Small PC | 11/01/20082 | Test | | 03/03/2009 08:44:52 | 03/03/2009 10:29:50 | MG | null |
| ☐ | 1218 | test1218@test.com | Scott | | Foster | Large & Small PC | 11/01/20082 | | 大小律师所 | 03/03/2009 08:44:52 | 03/03/2009 10:29:50 | MG | null |

[Enter] [Delete] [Edit]

Page 1 of 2 | Go to Page: [1] [Go] | Records Per Page: [5] [▼] Next Last

FIG. 3

Add Records To Database Table

Server Response: Record 12 was entered at 05/10/2009 11:27:05

Date format: MM-DD-YYYY ⬅ 618

- Table: Coding
- Scope Effect: Amended
- Coding as: NR
- Key (<80): Sales data, [ch]销售数据
- Date: (default is system time)
- Comment (<300): Sales data [foreign term may be placed here] in commission computation file should be coded as non-responsive. See CN-11223490

Interactive search ⬅ 619

Submit    Close

Add Records To Database Table

Server Response: Record 13 was entered at 05/10/2009 10:35:06

Date format: MM-DD-YYYY ⬅ 618

- Table: Attorneys
- Scope Effect: Original
- Sub-Type: Client
- Key (<80): Ford, John
- Foreign Key (<80): 约翰 · 福特
- Date: (default is system time)
- Comment (<300): Attorney of Black and While LLP for the client in an early merger case. [Ch: 福特 . 约翰 ]

618 ⬅ Interactive search

Submit    Close

FIG. 7

Add Records To Master Table

Server Response: Record 13 was entered at 05/10/2009 10:35:06

Date format: MM-DD-YYYY ← 618

- Table: Terms
- Scope Effect: Original
- Sub-Type: Special Terms
- Key (<80): CDMA
- Foreign Key (<80): 码分多址，码多重进接
- Date: (default is system time)
- Comment (<300): It means code division multiple access. It is a method in wireless access. [foreign term may be placed here]

[Interactive search] [Submit] [Cancel]

FIG. 8

Global Search: Global Search Result

Txt ← Sorted by: Alphabetic
625                              626

| Text | terms | All Text files with txt extension |
|---|---|---|
| Smith, John 约翰·史密斯 | attorneys | Client  Attorney for Tat Xi To (TXT) [tentative] |
| Sales data 销售数据 | coding  Amend | Exclude BN12012, see specification.txt |
| Sales data 销售数据 | coding  Amend | Produce BN12010, see specifiation.txt |

[Enter New Record]    [Search] [Confirm Data] [Close]

FIG. 9

| | | | | | |
|---|---|---|---|---|---|
| Index Table: Change Histories | | | | | |
| Filters: | Main Type | All Tables ▼ | Sub Type | (NA) ▼ | GO |

| Date | Keys | Coding Effect /Sub-type | Scope Effect | Comments | |
|---|---|---|---|---|---|
| 05/12/09 3:12:01 | Sales data 销售数据 | NR | Original | NR, if in commission report | 630 |
| 05/12/09 4:11:21 | Sales data 销售数据 | NR | Amend | NR, if in commission report unless it discusses M series | |
| 05/11/09 6:11:21 | Smith, Ted 特德·史密斯 | Attorney | Original | Attorney for Green Bay. Also, known as STS | |
| 05/01/09 4:01:01 | PC tank PC 油箱 | NR | Amend | Read Request 16 to exclude P series machines | |

Close

FIG. 10

Search Document (Using Private Key Arrays)

| 佣金，礼物，金钱，支付 ...... | Current Search 641 | Hide it 640 |
|---|---|---|

| Group | Key Description | Key Array Location | Search Machine | | 642 |
|---|---|---|---|---|---|
| A | Target Products | Cookie | Client | Setup | Search |
| B | Name List | Cookie | Client | Setup | Search |
| C | Special Keys | Server | Server | Setup | Search |
| D | Hot Issue List | Cookie | Server | Setup | Search |

Setup for Group A

Provide a name or description for the search:

Target Product List

Provide keys (In any language with a proper delimiter):

服务器，终端，屏幕，电源，供应器，集装箱，罐，水槽，silverflight, golden pan

○ Saved as Cookie  ● Saved on Server
○ Search on Client  ● Search on Server

[ Save ]   [ Cancel ]

FIG. 12

| Setup | Search Document | Close |

| 佣金，礼物，金钱，check, fee | GO |
| A  Product List  Cookie  Client  GO |
| B  Name List    Cookie  Client  GO |
| C  Special...   Server  Server  GO |
| D  Hot Issue..  Server  Server  GO |

FIG. 13

Set up Reference Table

Virtual Tables  ←—655  Selection Criterion (as default filter)

| Names | | Client attorney | ▼ |
|---|---|---|---|
| Projects | | All | ▼ |
| F-terms | | Flagged | ▼ |
| S-terms | | Special | ▼ |
| Coding rules | | Amended | ▼ |

←—656

[ Save ]   [ Discard ]

FIG. 18

Set Up Default Reference Tables

Tables ←—655   Filter (type field) ←—656   Sorted By ←—657

| Names | Attorney ▼ | Last Name ▼ |
|---|---|---|
| Projects | Target ▼ | Key ▼ |
| All-terms | All ▼ | Key ▼ |
| Products | Blue-flag ▼ | Comment ▼ |
| Coding rule | All ▼ | Key ▼ |

Total display No. per page: [ 50 ] ←—658

[ Save ]   [ Discard ]

FIG. 19

Set Up Full Feature for Reference Table for: Projects

1. Set Filter and Values

| Names | Contains ▼ | Any | ← 660 |
| Project ID | From 112233 | TO 223344 | ← 661 |
| Type | Dispute ▼ | ← 662 |
| Date | From 01/01/09 | TO 01/31/10 | ← 663 |
| Comment | Not contain ▼ | TIC | ← 664 |

2. Select Cascading Sorting Keys:

Type ▼
Last Name ▼
Project ID ▼   ← 665
Date ▼
Comment ▼

3. Select Field as Search Key for Highlighting Keys in Document    All ▼  ← 666

4. Set Reference Table Size: [30] Per page ← 667

5. Select Rotating Bar Style: Compact ▼ ← 668

Save    Discard   ← 669

FIG. 20

TRANSLATION PROTOCOL FOR LARGE DISCOVERY PROJECTS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to document review method, and in particular, to the method for translating a large number of documents in e-discovery.

BACKGROUND OF THE INVENTION

Discovery is a process by which two parties in a legal proceeding exchange documents and exhibits according to specific rules of procedure. In a typical legal proceeding, a party ("requesting party") may, pursuant to procedural rules, send a document request to another party ("responding party") to compel the responding party to produce documents that contain any of many categories of subject matters. The responding party reviews potential documents, identifies documents containing any of the enumerated categories of subject matters, and produces them for the requesting party. Historically, the responding party reviewed paper documents, copied responsive documents, and produced them for the requesting party. Information technologies have encouraged companies to generate a large volume of electronic documents, and thus it is necessary to use an Internet review platform for the review of documents. In a typical document review, the representing law firm or the client retains a data company for providing data hosting service and retains contract attorneys ("the reviewers") from employment agency to review documents on terminal computers ("client computers"). The reviewers can access the server of the review platform and download documents one by one for review. Document review is also frequently conducted for internal investigation.

A. Needs for Translations

If a case containing foreign language documents is to be decided in a forum using another language ("target language"), some documents must be translated into the target language for several purposes. Translations are used in case preparations. In the forum country, a majority of attorneys may be unable to read the source language. It is thus impossible for them to read original documents. They have to rely upon translations to prepare cases. When a case has more than a million documents, the cost for this component is very high. This need can be greatly reduced by retaining attorneys who can read and speak the source language. If the whole litigation team is able to understand foreign language, they would not need to have every important document translated for their use.

The second common use is using translations as discovery materials. In the United States, both parties need to produce relevant documents accompanied by translations. The scope and number of translations depend upon whether the counsel for the opposing party can read the source language although they may be subject to parties' agreement. If the required documents are in a foreign language, the party may be required to produce translations.

Another use is as supporting evidence in pretrial procedures. If there is a dispute in discovery scope, the party might have the dispute decided in motion. In such motion, the parties will attach translations to exhibits so that the hearing officers can look at the documents in deciding the motion. Exhibits and translations may be used for deciding any other side issues such as temporary restraining order, special appearance for challenging service of process, motions for all kinds of pretrial issues, motion for summary judgment, and motion for direct verdict notwithstanding jury verdict. For a large case involving complex facts, summary judgment motion may be backed up with exhibits consisting of thousands of documents and translations.

Translations are used to assist the counsel in negotiating for settlement. In settlement negotiation, the two sides argue why the settlements should be in their favors. To support their positions, they produce original documents together with translations. The counsel who does not understand the source language has to rely upon attached translations in evaluating settlement proposals. Apparently, the party that can produce favorable exhibits would be in a better situation to bargain for favorable settlement.

Another use is aiding the hearing officers or jury in deciding the case. Most judges do not understand foreign languages, but they need documentary evidence when they decide cases. Documents and translations are also used during merit trial. The documents are admitted as evidence. The hearing officers review the exhibits and decide the case. If a case has millions of documents, the party may need to translate some of them, which might be important to issues in dispute.

If a party loses the case and takes an appeal, the party needs to prepare appeal brief together with appendix. The appendix contains exhibits comprising mainly original documents and translations. It is possible that the appendix may require additional documents, which are not in the original trial exhibits. After the case is decided, it may be affirmed or remanded. If the case is remanded for deciding additional issues, additional exhibits with translations may be required.

B. Complex and Unique Document Compositions

Client companies make different products and sell different services. Thus their documents contain completely different substances. Despite their differences, they documents contain (1) information on a large number of projects, services, and processes, (2) strange codes or causal names of products, services, and materials, (3) a large number of players such as employees, customers, attorneys and consultants, and other parties, (4) technical subjects of varying complexity, (5) jargon, abbreviations, and acronyms, (6) assumptions only understood by those who were involved in the underlying transactions, (7) incomplete person names, place names, and discussion topics that can be understood only by those in the discussion group, (8) protected compressed and zipped files, (9) trade secrets protected by passwords, and (10) substance in one or more foreign languages. Due to any and all of the reasons, document review is not an easy task.

Corporate documents contain a large number of duplicates. Duplicate documents arise from document distribution practices, archiving, file backups, drive backup, media backup, and server backup. A document may be distributed to several, tens, and hundreds of employees. The some documents may be amended and again sent to a large number of employees. Each of the documents in an individual employee possession may be again backed up in many ways. Certain documents may have thousands of copies while others may have only tens to hundreds of copies. The large number of documents is primarily responsible for the high cost.

Due to the large number of software applications for creating documents and complex file histories, some documents cannot be properly processed for review. Documents cannot be opened due to (1) lack of a supporting application, (2) association with a wrong application, (3) missing necessary components, (4) being linked to an unavailable file, (5) incorrect encoding in the texts of foreign languages, (6) corrupted file structure, (7) infection by virus, and (8) lost part of information or damaged file structure. It is easy to name potential causes, but often difficult to ascertain whether a document has a real technical problem. When a great number of documents cannot be opened, it is a disaster. The only possible solution is to find original documents. Documents incorrectly marked as having a technical problem may be routed back to reviewers for another round of review. Two or three rounds of attempts can incur a great deal of costs.

Encoding problems in foreign language documents add another layer of complication. Many large corporations are doing business worldwide. Their corporate documents are written in different languages, depending upon the geographic region where the documents are created and what are the intended readers. Some documents are written in foreign languages, others contain foreign languages between lines, and yet others contain English translation. Some documents may be written in more than one language with internal cross-references. It would be very difficult to have those documents reviewed. They go through several rounds of reviews. For the reason obvious, this kind of documents cannot be properly reviewed in several rounds, one for each of the languages. If such documents are important, they are translated to the target language.

Password protection of documents adds further complications. Passwords protected documents often appear in the documents of software companies and technology companies. This class of documents can significantly reduce review speed. It is often difficult or even impossible to find right passwords. In many times, the reviewers treat such documents as trash or technical documents. The parties in civil litigation may reach an agreement on how to treat those documents. Now companies use zip files to send documents by email. A zip file may contain tens to hundreds of files. Some zip files contain database dump files, large number of forms and templates, all files for a complete project, and routine spreadsheets. An attempt to deal with the password problem can consume a great deal of time. An operation from file selection, downloading, to unzipping the file can waste as much as 10 minutes per document. If a reviewer is still unable to open a document, the reviewer waits for help or repeatedly tries the same operations. The time wasted from this problem is difficult to assess. Documents routed to a wrong destination will be routed back and forth without final resolution.

C. Litigation Dynamics

Document production, which includes translation, is further complicated by unpredictable but routine changes inherently in litigation. All current review models lack the ability to deal with changes. For a small case handled by a single lawyer, any change to any aspect of a review production is already a headache problem. In a massive document review project, any change means a huge costs and a great deal of delay.

Constant and routine changes in litigation are in a head-on clash with the constraints of the review model. In many times, even if the client can pay for a huge cost, it is simply has no time to make required changes. Litigation in the adversary system by nature is a contentious game, and the purpose for making changes is to increase the chance of win and reduce the chance of loss. However, everything else in the document production model is against any change. One biggest impeding factor is the large number of documents. Naturally, all law firms have the needs to change review instructions concerning review standards, request definitions (specification definitions), coding rules, and methods of handling of documents. In reality, discovery is a trail and error process that is characterized by changes, adjustments, fixes, quality checks, corrective reviews, and special reviews. In situations where any change cannot be applied to a portion of the documents due to practical difficulty, the review team has to review all documents. This requires a great deal of review time. In other situations, any change may affect a sub set of documents in the review pool.

One of the many complicating factors is the number of players. For any review, the players may include client employees, litigation attorneys, project managers, document processors, staff recruiters, document reviewers, and technical consultants. One single misunderstanding by any of the players may result in an error that might require a massive corrective review. Another complicating factor is the huge amount of case information. When a change is proposed, it is impossible to foresee how the proposed change will affect documents through its direct effects or its unforeseen interactions with one or more case facts.

Finally, many changes, even though they are purely litigation decisions, cannot be successfully implemented without the support of review platforms. When a proposed task is to find and review a set of priority documents in order to meet a deadline, one question is whether the review platform can competently identify the set of documents. Platform search capability, algorithm designs, file formats, file types, file conditions, files processing histories, and the way of organizing information in the documents affect the chance of success. Even the work habits of the reviewers may be a differential factor. Some reviewers may be able to successfully make a change while others may give up. Although experience may be the most valuable thing to predict the chance of success, no one can guarantee any type of outcome in a system with too many variables. A very sound change plan may be easily defeated by a surprising factor. If all factors can be considered independently, the problem may be not frightening. In many times, a change may be impeded by a battery of main factors such as review software characters, internet connection characters, review computer characters, server characters, file characters, file processing histories, reviewer's working habits, and the sizes of affected documents. Each main factor may comprise tens to hundreds of sub-level factors and they may be intertwined with each other. This explains how a law firm can actually spend tens of millions of review fees on a typical review project.

D. Common Translation Problems and Reasons for High Costs

Translation is conduced while a plurality of reviewers review documents. The background in reviewing documents has been described in published patent documents.

When a reviewer runs across a document and determines it is important enough to have it translated, the reviewer puts a note in a comment field, places a check mark in a translation flag check box, or sends a message to a litigation attorney. The litigation attorney decides which document should be translated into the target language. The reviewer may conduct translation immediately for a small document or conduct translation thereafter. A log in an excel file or word file may be used to track all translations.

There are many reasons for high document review costs. When documents have foreign languages, the billing time for translations is responsible for much more discovery costs. There are several causes for high translation costs. One of common causes is the large number of duplicate documents that cannot be eliminated. For example, a particulate document is created by distributing a draft to a group of members for review and the drafter will get each of edited documents for inclusion in the final version. This process can be repeated many times in several months to several years. This practice may result in hundreds to thousands of copies that are not identical. All those copies may be assigned to a large number of reviewers. While each reviewer can identify the most inclusive copy within its small review range or folder, but there is no easy way for the whole reviewer team to figure out which one should be translated. Tens of reviewers might tag the some documents for translation. The project manager or litigation attorney, especially if he cannot read the source language, cannot determine whether those documents are identical based upon the review note. If some of the documents have been translated, the attorney cannot tell whether the translated documents are identical because all translations look somehow different. This is what the inventor refers to as "term multiplicity" and "structure multiplicity". When there are several litigation attorneys and a group of reviewers, they can routinely spend a great deal of time to figure out which documents have been translated and which need to be translated.

Good translations require a great deal of time. Translation time in terms of dollar amount per word can vary by many folds, depending upon nature of original documents, accuracy requirements, translators knowledge, and translation philosophy. A decent translation of a document requires more knowledge than what is required to paraphrase text in the document and far more than what is required to code the document. Translation of legal documents is never a job that anyone can do. When accuracy is not required and the subject in the document is very general, Google and Ping translation may be good enough and the reviewer just takes a look at the machine-translated text to ensure that it does not add harmful texts. If accuracy is not required and if the reviewer has good background, the reviewer can translate the document in nearly typing speed, and still achieve moderate accuracy. When the document is highly technical and the reviewer does not have required relevant knowledge, the reviewer has to struggle, but still cannot deliver required accuracy. When the document contains highly technical matters and also requires the highest accuracy, the document may demand the highest skill levels and require a great deal of time. If the original document is highly technical, concerned with critical issues, and contains some problems (such as bad handwriting, causal notes, missing pages, and errors and omissions), it would be a research project. The translation may require several rounds of amendments. A challenge by the opposing party may require further amendment. When the document pool contains a large number of hot, technical, and troublesome documents, and there is no good method for managing the work flow for all attorneys and reviewers, translation costs can be further increased.

One of several additional factors affecting translation costs is translation method. Translation methods include verbatim translation and translation by meaning. For each of the methods, there are still various subtle differences as to translation methodology. Verbatim translation can be performed much faster because the translator does not need to fully understand the content. It can be done by sentence-by-sentence replacements according to different grammar rules. The risk is that the resulted translation may loss intended meanings. Translation by meaning is much difficult especially in litigation settings. If the translator does not have the knowledge of underlying technology, the translator has to learn the subject matter during translation. If the subject matter is very complicated, this learning process can take much more time, and the translator still can make mistakes that a skillful translator would immediately know. There are also situations where subject matters are so complex that they are not for laypersons to translate. If the translator knows underlying technologies, she can learn the subject matter much more quickly, and can have better sense to avoid making mistakes. A right translator is in a much better position to ascertain implied assumptions, incorporated external facts, original mistakes and omissions, and uncommon expressions in original documents.

One factor that can also contribute to the high costs is the total lack of tools for translations. When a foreign language is so big, no one can know everything. For example, Chinese is a very big language that has evolved for more than four thousands years. It has such a long evolving history that it requires "translation" for readers in different eras. It has a huge numbers of character combinations. It is so big that it requires "translation" for readers in different technical fields. On top of that are rich cultural, social, political, historical, and geographical elements. Even just human's names, location names, and company names can totally disrupt work flow to nearly a halt. No one knows all official counterparts of all company names, location names, and people's names. No single person can ever know everything about such a language. The translator may run into something that requires mini research. If separate public Internet access is not provided, the translator may have to use sound translation rather than officially recognized counterparts, and may have to spend much more time to fix inconsistencies and errors after the translator knows better translations. If no tool is provided and if the translator is unable to understand something, the translator has to consider whether it is related to an implied assumption, incorporated external fact, an original mistake, or unusual expression. Such attempts may help the translator to find the right answer.

The tools for foreign language data entry affect translation efficiency. Data entry may be necessary for finding right foreign documents, conducting backward translation for verification, and creating text in translations. The Windows' data entry method has limited functions and most reviewers do not like. Each reviewer may be good at using one particular method. Their productivity in typing foreign language texts may differ by hundreds of times. The data entry methods for certain Asian languages can affect data entry efficiency dramatically. If backward translation is necessary, a reviewer may be able to perform very well by using one data entry method, but cannot work at all by using another method.

The number of foreign languages in a case also dramatically affects review productivity. Some documents may be created in more than two languages in alternate. Such documents will need many rounds of reviews. Strictly speaking, competent review cannot be performed by multiple independent reviews because this review model is unable to ascertain combination effects. Each of the sections may be non-relevant when it is reviewed separately, but their combination may present a significant issue. Demanding one reviewer to review multiple languages is also troublesome because there is no guarantee that the reviewer is really competent to review all languages. If a document in many languages is a product of one single author, it is questionable whether the author is able to convey objective meanings in all the languages.

Amount of case information always affects translation costs because each of the reviewers must learn it. When the amount of information is doubled, the time spent on the learning process for all reviewers is also doubled. The large amount of case information, numerous file types, and common technical problems may be intertwined to further increase translation costs. Poor review plans, lack of background knowledge, insufficient experience, incomplete and confusing review instructions, and missing support applications on review computers are among other factors that may contribute to high costs.

Great effort has been made to reduce discovery costs in the review industry. Certain search and file elimination methods may disrupt what the inventor calls cross-document verbal context and transaction context, and make some critical documents unavailable. Such search methods will make translation tasks more difficult or force translators to make best guess. Some computer search methods can reduce documents by as much as 80%. This may reduce the number of documents to be translated. The deduced size of the document pool can reduce the total production cost, but it may reduce accuracy of translations if it affects the verbal and transaction context or make some translations incomprehensible.

E. Relevant Experience and Learning Process

In a typical review, reviewers start learning basic case information. The learning process for experienced reviewers is different from that for inexperienced reviewers. All reviewers have to learn basic case facts, review instructions, and review software. Experienced reviewers can go through this process faster because they do not need to learn every detail. They only need to learn case facts and the unique or different aspects of review procedure, background law, substantive instructions, review platform, tags structure, and coding conventions. In a second request review, experienced reviewers might have known most of the two dozens requests. They only need to learn those unique and distinctive requests, and they are familiar with most of concepts such as market shares, sale prices, costs of saving, cost and benefit analysis, and most antitrust sensitive issues. They also know the basics for conducting responsiveness and privilege review, and thus do not need to spend time to learn everything and develop new skills for applying requests to documents. They may know short cuts for conducting relevancy analysis and privilege analysis. It is far less likely for them to make fatal errors under reasonable review speed. In comparison, new reviewers have too many new things to learn. New things include case facts, review procedure, background law, review instructions, review platform features, tags structures, coding conventions, analytical methods, and handling platform problems. They need to develop basic skills for conducting legal analysis, applying document definitions to documents, and performing complex analysis. They may make a coding error as a result of using a wrong approach in conducting legal analysis or failing to realize important facts.

All reviewers cannot reach their full potential in all reviews. One reason is that they cannot master everything. Their workflow may be interrupted because they have to address less frequently encountered facts, terms, expressions, things, people names, and place names. If a company has used two thousand of attorneys, a reviewer can remember one hundred names, which appear frequently. The reviewer is unable to remember the remaining one thousand and nine hundred attorney names. Whenever the reviewer encounters those unfamiliar attorney names, the reviewer needs to check them against a names list or to figure it. In addition, they have to sporadically deal with issues such as illegible documents, handwritten notes, foreign languages, compressed files, missing passwords, large spreadsheets, database files, and defective encoding. This explains why their performance curves level off.

Experienced reviewers have their own peculiar "liabilities." Due to insufficient review guidelines, experienced reviewers may import the meanings of special terms such as responsive, significance, privilege, and technical issues into the current project. Importation of different interpretation rules can directly compromise review objective. Tagging logic and coding conventions are different from sites to sites, and written review manuals seldom provide sufficient details to alert the reviewers to their unique coding logic. Review manuals may contain many interpreting gaps. Experienced reviewers may fill the gaps with what they know. They might port into the current case their prior procedures, substantive definitions, and interpretation rules, coding rules, and tag configurations. As a result, they might code documents contrary to site requirements. The errors are generally not the kind of errors that can post risks to the client's cause.

In some review projects run by new associates, quality control data often reveal that experienced reviewers perform worse than new reviewers. There are several reasons for this noted "poor performance."

The first reason is their differences in interpretation philosophy. Experienced reviewers tend to read requests more narrowly and pay more attention to substance. Thus, they exclude more documents in a document production for an opposing party. New reviewers and new associates tend to read definitions more broadly and pay more attention to the requests' literal meanings than its substance. Experienced reviewers, especially those with solid litigation background, may exclude documents that merely mention buzzwords without real substances. They might exclude hundreds of types of documents. By reading requests literally, the requests can squarely read on those documents. However, the documents are not the kinds of documents the request drafters would need. If one of the documents were coded as privileged, the substance in the document would be insufficient to fill a defensible log entry. By using this literal relevancy standard, the manager would regard many coding decisions as errors.

Over-inclusion of non-responsive documents is a prevalent problem under the current review models. The Department of Justice returned documents on the ground that the production contained too many irrelevant documents. An incidence like this clearly suggests that relevancy should be determined based upon document substance at least to some extent. By using different interpreting philosophies, new reviewers can achieve better consistency but experienced reviewers may achieve low consistencies. This also explains why high school students can achieve high consistencies when they are asked to code documents according to a list of definitions in a few simple steps. Young students can perform better in doing most simple manual tasks. When quality control staff also takes the literal approach, experienced reviewers will be the minority.

The second reason for devaluing review experience is that the current review model is unable to utilize the reviewers experience and knowledge. For a corporate client conducting business in multiple industries, its manufacturing products touch many fields, and so do its technologies. Corporate documents may include executive's elegant speeches, counsel's sophisticated legal analysis, sales staffs routine marketing materials, all kinds of complex secured transaction files, personal informal email, various legal instruments, hard-to-understand financial records, R&D experiment reports, and quality control test data. As diverse as corporate documents are the backgrounds of document reviewers. The reviewers may have majored in literature, history, business administration, secured transactions, accounting, life science, physical sciences, chemical engineering, mechanical engineering, software and information technology, electrical engineering, and medicines. By using the current assignment methods, documents are processed by custodians. Same or similar documents are assigned to many reviewers randomly, just like lottery number balls to be blown out of a drawing vent to land in review folders or ranges. Most documents in their folders are not relevant to their experience and knowledge. In addition, they review documents out of context and thus cannot understand special, implied, omitted, and misspelled terms which appear in abundance. Naturally, every reviewer codes documents by best guess. What they are actually doing is to "classify" documents based upon what they can understand from the documents. In conducting this kind of cursory review, experience may be a waste.

For translation of documents for litigation purposes, the length of translation experience may have little relevancy. If a reviewer lacks relevant technical knowledge and required technical strength necessary for understanding a particular document, he is unable to produce accurate translation.

F. Translation Performance

All foreign language cases can be classified into three types on the basis of their requirements for review accuracy: (1) low or no requirement, (2) moderate requirement, and (3) very high requirement. In certain matters, document production may be a formality matter. In some merger cases where the final combined market share is still far below 50%, a document review may be a matter of process unless there are other antitrust issues. If the documents do not contain other risky subjects, high school students and even computer algorithms could do the job. In this type of cases, translation would not matter unless it is so far away and that it hits some hot buttons. A majority of cases do require reasonable accuracy. In this class of cases, final disposition depends upon their documentary evidence. The parties win with evidence, and lose for evidence. Translations act as the critical middleman for passing case facts from original documents to the hearing officers. When both sides do not have solid evidence to back up their claims and defenses, they dispose of the case by the usual settlement. The final settlement price most probably depends upon their relative strengths of documentary evidence including translation quality. The third class of cases requires very high review accuracy. In this class of cases, the stake may be millions to billions dollars of punitive damages, triple civil damages, twenty years jail times, and even person's or company's right to exist. Those cases include securities class action, product liability action, high-profile patent infringement action, criminal prosecution, and violation of sensitive statutes such as Foreign Corrupt Practices Act and Export Control Law. When the middleman tell a wrong story or distort facts, the results can be easily imagined. The method of present invention is primarily intended for the last two classes of cases.

On some review sites, helpful information is posted on a blackboard or clipboard for sharing. This effort is intended to identify coding and translation problems. Discussion meetings may be conducted on a daily or weekly basis. This method is, however, ineffective and inconvenient. Oral communication is ineffective to discuss subtle coding and translation issues, and cannot be used to share complex facts between reviewers. Some review sites provide a questions-and-answers forum, where the reviewers provide questions and project managers provide answers one or several days later. Sharing information by using Windows' share drive has also been used as early as the birth of the operation system itself. However, this method presents several problems. First, the arrangement does not allow plural reviewers to write information to the same source and the operating system may lock up the file when one reviewer opens the file. To avoid this problem, each of the reviewers is allocated a time slot to enter questions. It can waste a great deal of administrative time in scheduling and working around allocated time window. Second, such a method cannot be standardized to implement powerful functions. Different cases require totally different ways of organizing and sharing case information. Finally, there is no suitable way to ensure that all information posted is accurate and reliable. Posting a piece of wrong information for sharing may cause other reviewers to make a wrong coding decision. As a result, only project managers and litigation attorneys can answer such questions. The law firms do not want to use such method to share elementary facts that may control coding decisions in many related documents. Questions-and-answers could be implemented by email, email attachments, web pages, or web page attachments. However, it is seldom used for similar reasons. It cannot be used to share elementary facts in real time, and there is no proper way to ensure data accuracy.

Translations for discovery projects inherently discourage the use of new technologies. Translation memory system, which can store translated materials as subsequent use, cannot be used due to its very high deployment cost, risk of sharing or leaking confidential and sensitive information, and potential recycled errors, a well known problem. When translation is performed by off-site vendors, translations are conducted in a context-deficient environment, inevitably resulting in massive distortions and disastrous mistakes.

G. Prior Art Translation Tasks Tracking Method

One important thing in the management of work flow is tracking which documents have been translated and which documents should be translated. In a single super lawyer model, one single attorney reviews all documents and then decides which one should be translated. It has no issue. However, in a complex presentation model, there are several litigation attorneys and tens to hundreds of reviewers and/or translators, it is never be an easy task to manage work flow. Two common factors make this seemingly straightforward task very difficult. Most litigation attorneys are unable to read documents in source language, and, due to what the inventor calls as "translation term multiplicity" and "structure multiplicity," the attorneys are unable to determine whether two original documents are similar or identical by looking at their translations. An original document may end up with different translations even if the same translator did all translations. When different attorneys and a group of reviewers and/or translators work at different locations, the process of determining documents would consume a great deal of time. While law firms might use some simple tools to keep track of translations, it is a trial-and-error process. It is inevitable that many similar or identical documents have been translated many times, while some important documents do not get attention. Even though, every project is concluded successfully, it has a huge burden to the managing attorneys and a huge bill to the client.

Any translation contains commonly known problems including imperfections, approximations, unavoidable distortions, and even human errors. Those things may have sufficiently serious impact on outcome of litigation. There are no known methods for addressing translation term multiplicity and structure multiplicity.

SUMMARY OF THE INVENTION

The present invention is a method and process for improving review performance and translation quality in a complex representation model. The concept is to "unify" all attorneys as a super attorney and all document reviewers (including translators) as a super reviewer. The method helps the reviewers reconstruct the relationship of segregated documents and allow the reviewers to review documents in a virtual language context.

The present invention is a process for facilitating collaborative work by all entities and players in a document review project. It allows all players including litigation attorneys, document processors, project managers, and review attorneys to update their instructions real time so that others players will know all respective instructions and thus avoid misunderstanding. This collaboration can help reviewers (including translators) reduce the chance of errors.

The present invention is a process for sharing work products during the entire review process. By this process, the reviewers can share their work products, reuse elementary work pieces, and avoid conducting duplicate research, analysis, and fact-finding. As a result, the reviewers can avoid working on duplicate tasks and use the time to hunt for important information.

The present invention is a process that allows the managing staff to instantaneously change their review standards, construction rules, coding rules, methods of treating documents, and factual entries. By using this process, the whole review team can reduce the amount of time for fixes, reworks, and corrective review to the minimum theoretically.

The present invention is a process by which conflicting instructions between litigation attorneys can be minimized and avoided; different interpretations of same rules, instructions and guidelines by different reviewers can be minimized; conflicting and inconsistent treatments of documents can be minimized; coding errors caused by different understandings of the same rules and instructions as a result of reviewers' different experience can be minimized; and documents-selection errors can be minimized.

The present invention is also a process for maintaining a dynamic translation tracking table, which helps all litigation attorneys and reviewers instantly determine if a similar or same document has been translated, and if yes, the attorneys and reviewers can review the document and translation in real time before a decision is made.

The present method of invention is also a process for reducing translation term multiplicity concerning certain matters such as personal names and titles, company identities, times and duration, location names, and any of other terms that are important to the clarity of text or performance of documentary evidence.

The present invention is also a method and process for minimizing the effects of change in language context on hearing officers' ability to understand translations. Foreign language documents created in a foreign context are intertwined with foreigner names, foreign culture, foreign geography, foreign natural condition, foreign politics, foreign history, foreign business practice, and foreign legal environment. When such documents are translated from a source language to a target language by any known method, their translations inhere all contextual elements. When the translations are placed in front of the hearing officers who know a different context, the effects are same as putting language into a wrong context. Thus, the translations are "incomprehensible" to the hearing officers. The present invention provides a protocol for minimizing the impact of contextual shift on the comprehension of the hearing officers.

The present invention is also a method and process for rephrasing the texts created by second language speakers in the target language in a foreign context. The method includes a server-implemented method for correcting obvious errors, common errors, quoted foreign terms, and a scheme for providing annotations to compensate for effects of contextual shift.

BRIEF DESCRIPTION OF DRAWINGS

FIG. 3 shows the web user interface of a discovery information management system (also "review-assisting system").

FIG. 6 shows a data entry form for adding a coding rule to the coding table.

FIG. 7 shows a data entry form for adding a data record concerning a person to the names ("attorney") table.

FIG. 8 shows the web page for adding a data record for an acronym to the database table.

FIG. 9 shows the search result page after the reviewer types in a key and clicks the global search button.

FIG. 10 shows the web index table showing all cumulative changes and latest changes.

FIG. 11 shows the full search page (with setup links) for conducting searches using a plurality of personal or private search key arrays.

FIG. 12 shows the setup page for a reviewer to set up the search tool using multiple personal or private search key arrays.

FIG. 13 shows a compact search page for conducting searches using a plurality of personal or private search key arrays.

FIG. 18 shows a setup page for setting up reference tables for all virtual tables for a system using one shared database table.

FIG. 19 shows a simplified setup page for setting up reference tables for a plurality of individual database tables.

FIG. 20 shows a full-featured setup page for setting up one reference table for the project table.

DETAILED DESCRIPTION OF THE INVENTION

Figure 1:
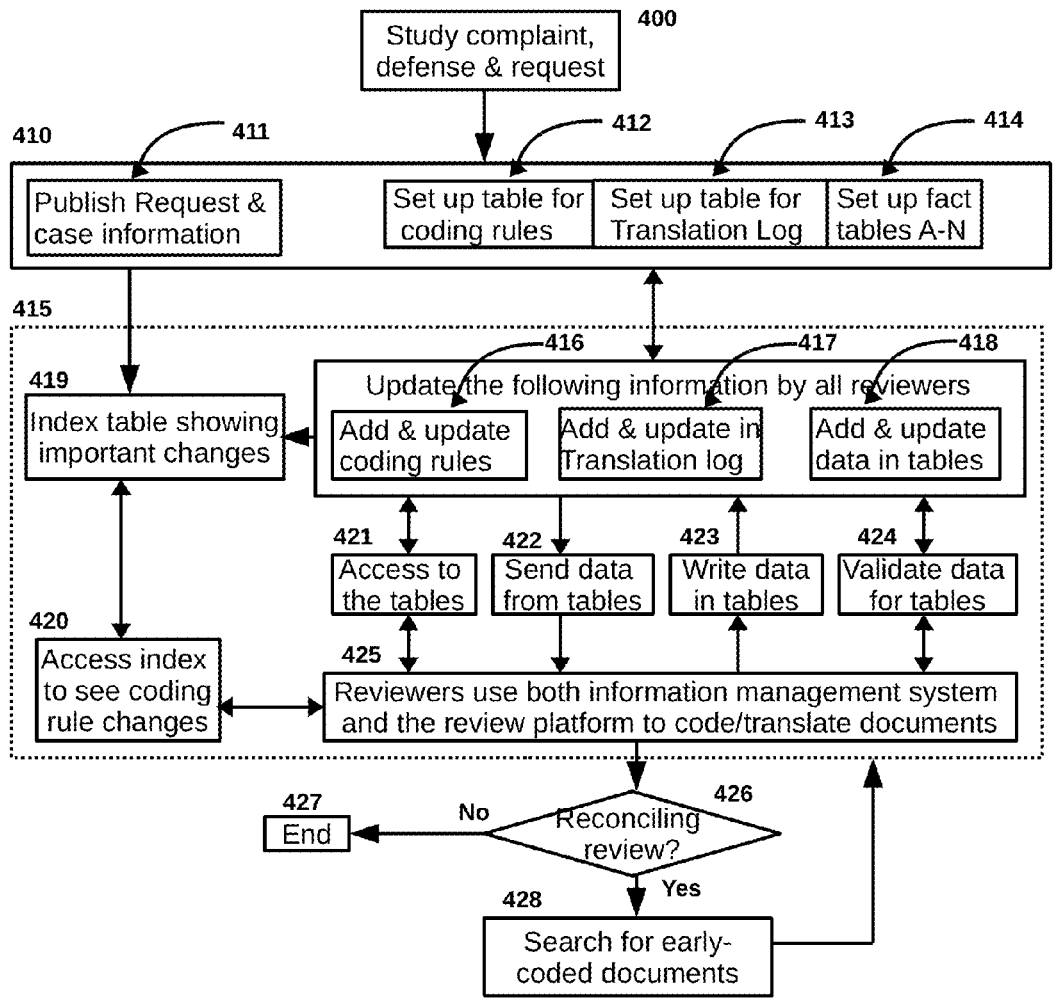
FIG. 1 shows the accurate coding process by using a document review platform and a discovery information management system (also "review-assisting system").

Translation protocol is intended for any foreign language even though the examples are provided in Chinese. All theories and practical problems discussed are equally applicable to other foreign languages except a few specific examples. When the translation protocol is used for one or more other foreign languages, the only additional requirement is data entry method for the foreign languages.

"Language context" or "context" is intended to have the broadest meaning which includes all text-related concepts ever discussed in linguistics, plus unlimited non-text components which may carry supplemental meanings for a subject under discussion or affect the interpretations of words and phrases in text, including social concepts, local culture, name convention, business practice, science practice, farming practice, human interactions, national conditions, geographic locations, local weather conditions, government organizations, legal environment, common knowledge, special knowledge in a field, author's subjective belief, author's personal knowledge, external facts, historical events, famous persons, common mistakes, historical usages, inhered usage errors, omitted assumptions, and distinctive personal usages. Any of the components may comprise a gigantic number of fine elements.

"Definition" may mean definition, comment, and explanation of words and phrases, depending upon the nature of the term.

"User" means project manager, document reviewer, translator, consultant, or any person in front of a document review client or a server that may have one or more machines. "Reviewer" means any person who works as a reviewer, including project manager, document reviewer, translator, consultant etc. Those words are used for convenience.

A. Relevant Corporate Document Characteristics

Two characteristics relevant to document review include the unique way of presenting verbal context and "transaction context," and incorporation of well-known facts in documents.

First, verbal context in corporate documents is different from the concept in linguistics. All relevant documents in a contract dispute may cover series of subjects from initial marketing effort, initial contact, preparation of bidding documents, tendering of bids, formation of contract, post-bidding activities, delivery of products, making payment, natural disaster, request for change of price, breach of contract, termination of contract, filing a lawsuit, retention of law firms, settlement discussion, drafting settlement agreement, and signing settlement agreement. It is the standard practice that corporate staff does not need to mention everything that has happened before. The verbal context in most documents is deficient in the documents themselves, but may be found in other related or precedent documents.

Second, many transaction documents do not provide all of important facts. The documents may freely incorporate facts commonly known in the corporation and the facts that the players know concerning the transaction. Therefore, many documents do not provide background information, verbal context, and transaction context. In the eyes of document reviewers, the documents contain unexplained terms, implied assumptions, mysterious persons, unknown product names, unknown serial number, unknown locations, unknown times, unknown purposes, unknown anything and everything.

The disruption of language context caused by document assignment makes it more difficult to ascertain "transaction context." Accurate review of documents is impossible under the existing review model. The four corners review rule is used for the convenience for reviewing context-deficient documents.

B. Single Super Lawyer Representation Model

A single super lawyer representation model ("SSL") is a traditional representation model by which a single lawyer does all legal services. In the SSL model, the lawyer (1) knows all laws; (2) makes all strategic decisions and makes all necessary changes; (3) reviews all documents and thus understands all case facts; (4) knows all elementary facts and their significance; (5) knows all legal issues; (6) does not have any internal communication problem; and (7) has no divided royalty, no conflicts of interest, and has little concern with his own liability. Therefore, the super lawyer can deliver superb legal services at the highest productivity.

C. Multiple Players Tasks-Divided Representation Model (Complex Representation)

A multiple players tasks-divided representation model ("MPTD") is one by which one or more law firms or a group of lawyers represent the client, with necessary supports from document reviewers, consultants, and data-hosting companies. This complex representation model ("complex representation model") can be characterized by the following:

(1) Legal and strategic decisions are made by lawyers with different legal expertise.

(2) Case knowledge is divided among many lawyers and many reviewers.

(3) The division of tasks also means everything is done by duplicates. Every reviewer needs to learn the same company history, transactions, common terms, and legal issues.

(4) There are serious communication problems among lawyers, document reviewers, consultants, and supporting staff.

(5) Due to the need to divide documents among many reviewers, documents concerning a single transaction, event, or fact are assigned to several reviewers.

(6) Due to practical difficulty in using cross-document context, each document is reviewed on its face and its significance is determined on the face and attachments. Many documents contain unstated assumptions, and concern only one or a few aspects of a transaction, event, or fact. Most documents can be coded only by "best call." Accurate coding and analysis is impossible.

(7) Due to potential multiple corporations within the case and a large number of attorneys working on the case, Conflict-of-interest rules have facilitated the hiring and employment of inexperienced legal staff and inexperienced reviewers.

(8) Law firms use new associates to manage review projects, and the lack of experience and special knowledge of review process can dramatically increase review time, greatly reduce review quality, and increase the risk of exposure.

(9) Intensive competition among staffing agencies forced them to race for the bottom. To secure staffing contracts, they reduce reviewers' qualifications to three generally irrelevant qualifications such as law licenses, school names, and GPA.

(10) There is an obvious distrusted relationship among all participants.

(11) Many uninformed clients fail to see the importance of document review and the role of passion to fight for the client, but hold an unrealistic expectation that it takes only a great lawyer or an extraordinary legal argument to win its case.

(12) Document reviewers do not have the super lawyer's passion to deliver best performance due to a total lack of incentive.

(13) In cases where documents are written in foreign languages, the review industry routinely uses misfit or mismatched translators, wrong translation method, unworkable document tracking method, context-deficient assignment practice, and tool-lacking working environment, generally producing documentary evidence unfit for trial.

D. Translation Performance

The invention is intended to improve document translation accuracy, and it is therefore necessary to determine a suitable measure for translation accuracy.

1. Translation Performance Measure

The translation performance depends on three things: the selection of documents for translation, the ability to preserve original meanings, especially concerning matters relating to the issues in dispute, and total translation time. Selection of documents depends on nature of case, issues in dispute, litigation strategy, and document composition. The document selection process is affected by a battery of practical difficulties arising from division of work and division of documents. The quality of translations is ultimately judged from their performance in achieving clients final goal. If translations give the client the best chance to win its case, the quality is excellent. If they give the client a fair chance to win or defend its case, the quality is fair. If they ruin the clients chance to win its case, the quality is bad.

Within the bound of adhering to facts, anything, good or bad, may be translated in multiple ways. By using words and expressions, the translator may exaggerate the stories, accurately reflect the stories, or express the story in the best light. This is similar to what attorneys present facts in court in the best light for their clients. Good translation should not put the stories in a worse light. Performance measure should take into account of how well translations treat matters important to legal issues. Finally, it should weigh production costs relative to the stakes of the case. Many of those performance parameters cannot be directly measured on review sites.

The performance of coding documents is limited by the reviewer's source language skills only. The accuracy of translations is limited by the ability of the translator in any of the two languages in the relevant field. The relative strengths in two languages affect translation quality in two different ways. If the translators' weakness is in the source language, the translator might poorly understand original substance but still can express misunderstood substances elegantly in the target language. The misunderstanding finds its way to the final translation. If the translators' weakness is in the target language, the translator may be able to understand the original document, but is unable to express what he understands in the target language. The translation will reveal bad English on its face. Both contain distortions and inaccuracies.

In the review industry, there is one prevalent misunderstanding of translation quality. A good number of lawyers pay too much attention to the image of their work products even though format and style can seldom change case outcome. When a law firm expect the same of translations, it may lead to unpredictable results. When original documents are created in a different culture for efficient communication, the best and most accurate translations cannot anything but elegant writings in the target language. This awkwardness of translations is in part due to its reader's unfamiliarity with the foreign context, but not a translation problem. Elegant native-style translations inevitably contain massive distortions. Any hiring and retaining policy to encourage pleasant translations may force translators to rewrite histories.

The best accuracy is achieved if a translator is able to understand original documents accurately and express his or her understood story accurately in the target language. One method for achieving the best accuracy is that document is translated jointly by two translators, one with native fluency in the source language and one with native fluency in the target language. The first translator translates the document into a draft translation as accurately as possible. The second translator then edits the draft translation, and, if necessary, rewrites the translation. In this process, they may discuss how to improve troublesome text in the best way. This method may be used to translate troublesome documents and critical documents.

Translation speed in terms of words per hour may vary by several to hundreds times. As in document review cases, translation quota will not achieve anything good end unless mistakes, inaccuracies, risk exposure, and self-incriminatory misstatements will not hurt client. There is a fundamental difference between widget manufacture and litigation production. In manufacturing, the total revenue is always based upon production volume of produced wedges. An imposed high production volume always leads to a better result. In litigation, the total production costs depend upon work volume, but the outcome of the case does not. In many noted leading cases, their outcomes hinge on a proper handling of a small set of key documents in support of or refuting disputed facts. The client may save litigation costs at the expense of a total defeat and exposed additional and future liabilities. This distinctive nature of litigation requires that document reviewers try their best to increase the chance to win. Any attempt to discount efforts for the sake of meeting daily quota and achieving performance ratings may jeopardize the prospect for victory. Reviewers' passion for protecting clients interest is an absolute requirement for getting the highest chance to win.

A translation project in a complex case poses a new problem: same terms are not translated as the same in different documents, and similar documents are not translated as similar translations. This problem is so serious that it makes most foreign cases unfit for merit trial.

2. Computer Algorithms for Translating Documents

Computer translation algorithms may be used to estimate what an article might be about and to generate basic terms for edits. When they are used to generate the terms, the translators can save time if the computer translations are not very far away from one proper translation. Even the topic-identifying task cannot be done reliably because the algorithm may improperly translate important words. Computer generated translations may be used when mistakes, inaccuracies, risk exposure, and even self-incriminatory misstatements will not hurt the client. There are many reasons why computer algorithms cannot do a good job.

It has been shown elsewhere that current algorithms are unable to (1) understand background technologies and technical matters, (2) associate various parts of language context to make an intelligent judgment, (3) associate different parts of materials in the same document, (4) properly treat assumptions, obvious expression errors, obvious omissions, and improper abbreviations, (5) appreciate informal expressions and all kinds of secondary meanings such as connotation, implication, sarcasm, and hidden messages, (6) detect inherent properties of matters, things, and events, (7) understand human emotion, malice, and intention, (8) make connection between two or more things by times, persons, event, or concept, and (9) recognize handwritten notes and contents on most drawings.

The above list is not intended as a complete list. In some situations, even skillful reviewers may disagree on how to interpret contents in troublesome documents, computer translation may be considered only in cases where articles are written in a plain style without any of those discussed substances. The difficulty is that the article would not tell whether it has encoded secondary messages. Secondary messages may be in documents concerning organizational power struggle, factional disputes, and matters relating to politics, and this is especially common in certain Eastern cultures. A secondary message can be encoded into the document by citing a historical character, famous event, well-known story, or special date. The presence of those things can make computer's translations useless.

The use of computer algorithms to establish document pool should be carefully scrutinized. Its ability to find responsive documents depends upon the selection of key matrix, document requests, algorithm designs, language, documents file types, and even writing styles. It may work well in one case but may completely fail in another case. If search keys are formulated from a brief review of sample documents and brief interviews with clients employees, it has real chance to leave out important documents. It will have two types of errors. If a unique key is not used, all documents that contain only this relevant key will be dismissed and thus making type I error. Poor selection of search keys may lead to deficient document tool. From such a document pool, one cannot create a complete translation pool.

E. Inherent and Common Translation Problems in Litigation

Translations for cross-border litigation has presented six common problems: (1) common errors and inherent distortions, (2) meaning distortions caused by context shift, (3) extremely poor bad clarity of translations due to term multiplicity, (4) meaningless translations of troublesome documents, (5) incomprehensible documents created by second language speakers in a foreign language context, and (6) great risks from using off-site translation service. For those reasons, translations in a vast majority of cases are unfit for trial.

1. Common Errors and Inherent Distortions

The following is a very brief survey of common errors and distortions. This is not intended as a complete list, and many problems are considered to be universal and have been discussed in linguistics.

a. Word Misuse Due to Lack of Vocabulary

If an original document has complex substances, verbatim translation is impossible for three separate reasons. The most obvious reason is that words and phrases for concepts or objects may exist in one language, but miss in another language. Each language may lack certain vocabulary. A foreign language may lack the vocabulary in new technologies such as abstract programming concept such as "servlet" "JavaBean." A culture may miss certain words and phrases in a subject because it does not embrace it. Traditional Chinese Medicine is established on different medical theories and is communicated in its own language. For example, "皇帝内经" ("Emperor Neijing"), a master piece of many famous ancient doctors and theorists in the name of emperor Xuanyuan, teaches how to control several internal elements and six external elements to prevent diseases and achieve longevity. This work cannot be translated into English because it contains a large number of words, expressions, things, and concepts that do not exist in English.

Two languages may have many counterpart social concepts, but many of the concepts are different. In the United States, one unique concept is residency, but the counterpart in China is "city residence" such as "Beijing residency." They actually share no common characters and cannot be translated as such.

b. Inaccuracies Introduced by the Closest Words

The meaning of any word in the source language may be different in some aspects from the meaning of the closest word in a target language. When a word is translated from the source language to the target language, distortions to the original meaning happens. Also, essentially all words in any language have multiple meanings and each of the meanings may be different from the closest word in another language. A Chinese adjective and the closest English adjective may differ in degrees and usages. Usages arise from language development. For example, an adjective in a language may modify certain nouns but not other nouns. Those rules are purely language-specific and are not based on any logic.

Meaning scope differences between two closest words in two languages are very common. Abstract nouns, adjectives, and adverbs all have unique scopes that are defined in the context. This problem can directly affect litigation outcome. If an issue is whether a term includes a particular object or action, one should look at the scopes of the term in both source and target language. Each term may have three categories of members: the members that clearly fall within the scope of the term, members that clearly falls outside the scope of the term, and members that may be subject to dispute. If the member is an included member in the source language but it becomes an excluded member in the target language, this distortion alone may change the outcome of litigation.

c. Permissible Combination in the Source Language May be Impermissible in the Target Language Each language allows certain word combinations but disallows other combinations. When a particular combination is permissible in the source language, but their translated combination is impermissible in the target language, the translator has to keep the bad translation or has to change the story.

d. Selection of Wrong Words in Vocabulary Trees.

A word in one language may be correspondent to the combination of two or more words in another language. Word A in the source language may be correspondent to words X, Y, or Z, depending upon its verbal context in the source language. In other cases, the combined scope of three words A, B, C in the source language may be correspondent to one word Z. Chinese words "炎症" may be translated into "infection" and "inflammation" in English, depending on its context. This is one of the reasons why verbatim translation can introduce fatal errors.

In another example, the common meaning of "fee" in English is charges and costs . . . . However, one of the meanings is "an estate in land." Translation of "fee" in the context of an estate of land into "charges" is an error. After this word is translated, the readers in the target language such as Chinese will not able to understand it. They cannot see no indication of the error because there is no connection between Chinese words charge and estate.

e. Errors and Distortions Attributing to Different Cultures

The scope of each word in a language is formed in its culture. No effort has been made that the scope of a word for expressing a concept or thing must be same in all language cultures. Indeed, it must be assumed that every word in one language is different from the closest word in another language. Every word and phrase gains its meanings in a cultural context and social context. This difference can be found in all words such as nouns, adjectives, verbs, and prepositions. "Medical supplies" in the United State may include things that cannot be considered as medical supplies in developing countries. This class of words includes a residence, tax system, business classification, business naming system, legal procedure, and employment related terminologies. If those words are verbatim translated into closest English words, they will gain different meanings.

f. Changes in Social Values as a Result of Language Context Shift

Certain value-related meanings such as good and bad are set by cultural value. Whenever such a concept is translated and the translation is presented to a different culture, their meanings are changed. Disciplining children by force may be admired in many foreign cultures, but could be viewed as a crime in the United States; premarital affairs are generally viewed as unacceptable in Eastern culture, but may be less objectionable in Western countries; good faith and fair dealings may mean different things in different cultures; fiduciary duty may be unknown in some foreign cultures; and "evil intention" may mean different things in different cultures; "good moral character" are greatly affected by social values in each culture. Many terms may mean different things in different cultures. When a legal instrument is translated and a dispute is decided by a fact finder in a different culture, it would change the outcome of the case.

g. Problems Caused by Writing Styles

Culture greatly influences the ways of expression. Authors in different cultures write articles in different writing styles. Authors in Mainland China often focus on passion, attitude state, and process to express actions rather than the action itself. The English culture does not embrace this expression style. If those expressions are translated into English faithfully, they would be verbose and awkward. If the expressions are translated into the closest expressions that native English writers would write, their meanings are changed. When the action is described by passion, attitude, state, and process, the author does not have to be the one who actually does it.

h. Word Usages Inconsistent with Recognized Common Meanings

In corporate documents, words and phrases may be used inconsistent with their common meanings due to a historical reason. Word misuse may arise from any of the following scenarios: (1) improper words are used to describe something when no better words are available, (2) proper words become improper after their described subjects are changed, and (3) words are used in errors which cannot be corrected. Verbatim translation, without noting the usage, would result in strange or misleading translations.

Improper words can be found in company names, logo, trademark, product names, company organization charts, and research and development reports. Improper uses are often related to inventions such as new concepts, new products, and new processes. Inventors may choose best words on the basis of what they know at the time of inventions, but due to further development and understanding, the words may have been used in a way inconsistent with their common meanings. After those words find their ways to a large number of documents, they cannot be eliminated. Since the misused meanings are not recognized in dictionaries, a verbatim translation of those words may erase the vestige of misuse.

Improper use of words may continue to be used in corporate documents simply because their uses have been accepted within the company. In this case, the company essentially assigns special meanings to the words, but the special meanings are unknown to the people outside the company. Special meanings include expanded scopes of existing meanings, and new meanings, or even conflicting meanings, which cannot be found in dictionaries.

i. Errors and Omissions in Original Documents

Errors and omissions in the original documents are common and may be noted by native readers. Usually, errors and omissions in original documents may be ascertained from looking at pronunciation, sentence structures, context facts, or other peculiar vestiges in the original documents. A proper translation of the documents requires the reviewers to study the content and indicate the problem with a proper annotation in the translations. However, verbatim translation will remove the vestige indicating the nature of errors and omissions, and makes translations incomprehensible. The readers in the target language will not be able to see the problem.

j. Information Deficiency in the Original Text

In a case where the target language requires certain information which is not provided in the original document, proper translation requires additional knowledge from the verbal context.

When the source language such as Chinese does not require article, but the target language such as English requires it, proper taking care of articles is a challenge. The translator may have to guess and the result may depart from the reality. In Chinese, 他偷车, 被 判处有期徒刑五年 . "He was sentenced to five years for stealing car." The original sentence is broad enough to include a car, two cars, several cars, and any number of cars. English grammar requires that the word "car" is written in a plural or preceded with an article. No perfect English expression can be used to include all those possible scenarios. This simple sentence cannot accurately translated unless the translator can get additional information from the verbal context. This is a universal problem that is caused by two different languages.

When the original text lacks all required information required to appear in an acceptable translation, the translator has to fill in. A translation using arbitrary singularity or plurality for objects and things may be contrary to reality, the workings of science, or the description in related documents. The lack of plurality in the source language is not a problem because its native readers understand this convention and would accept this ambiguity. When inaccurate and inconsistent plural nouns are used in the translation, the readers are confused. The translator may have to deduce the plurality for each of the nouns from the original document. To do this, the translator needs fully understand the content, and counts the member for each of the nouns. The translator may need to rely upon external facts (e.g., plural kidneys but singular heart) and basic knowledge (variables in a typical experiment designs) to figure out noun plurality. This additional research may require a great deal of more time than the time needed to choose arbitrary numbers or articles.

k. Errors from Failure to Correctly Using Active and Positive Voice

Some languages such as Chinese does not require that a sentence indicates positive and active voices, but others such as English requires it. A term or sentence in the source language must be translated with proper positive voices, depending on its context. Chinese phrase "不-活动" [not-active] can be used to describe an object that is "unable to move" or "incapable of being moved." If the object that it modifies is a sick animal or person, "inactive" is a proper word, but the object is a piece of metal which cannot be moved, it should be translated as "non-movable."

l. Impossibility to Preserve the Ambiguity in Original Documents

The phrases in a source language such as Chinese do not always reveal their subject-object relationship or accurate meanings. For example, 法国代表 [French-representative] may mean (1) a French governments representative, (2) a company representative housed in French, (3) a company representative who remotely handles business matters in French, and (4) a representative who is in some way related to French. When context is unclear, the only way of translating verbatim is "French Representative," which may be most probably construed as someone who represents French. Corporations do not require that words and phrases must be used according to language rule. Many factors such as conciseness, use convenience, easiness-to-pronounce, and writing length limitation may override language rules.

m. Uncertainty Meanings Caused by Word Order

In Chinese, the relative logical relationship of words is not always clear when a long list of words are used to modify a noun. In this case, the combinations do not have to comply with best convention and language rules.

One of such example is Chinese "未认证-行销动态-比较分析" (unconfirmed—sales dynamics—comparison analysis). The context reveals there are sales dynamic data, and an comparative analysis report, and both the data and the report has been sent to a whole group of employees for comments. The first word may modify the second and third word or the fourth and fifth word. However, in English, different modification relationships require different preposition structures. Therefore, the ambiguity cannot be preserved in the same way. This example shows that the relationship between different words depends upon what actually happened. Language rule may have little or nor role on what they actually mean. The only way to keep the same ambiguity is to use the same run-on structure which is really bad English, but the alternative would be total distortion of reality. Corporate documents may contain five, ten and more words, and their relative relationships are always unclear. Any factors such as a need to limit total characters and the need for keeping historical usages may force the author to use imprecise combination.

Another example is 未认正-差异-分析: the word-by-word translation is "unconfirmed—difference—analysis." When this phrase is a document subject, its precise meaning depends on what has actually happened. If the feedback is collected after a comparative difference analysis has been sent out for confirmation, but the author has not received any confirmation, the first word modifies "analysis." If the author sent comparative differences data out for confirmation and wrote the analysis based upon unconfirmed comparative differences, the first word modifies "comparative difference" data. In English, it may be (1) an unconfirmed analysis of the comparative differences, or (2) an analysis of unconfirmed comparative differences data. Because English requires more information on word order, an arbitrary translation would be in conflict with the reality.

n. Words Combination Happens to be Same as a Well Known Phrase

In Chinese, words can be freely combined to form a special phrase or word combination. A combined phrase may happen to be identical to a well known phrase. Correct translation of the combined phrase requires the knowledge of the subject. Verbatim translation of such phrase can lead to a fatal error. One such example is "初乳" which means beestings or first milk produced by the mammary glands in a late pregnancy. However, the phrase, 初乳, can be a combination of two words: one word 初 meaning the first appearance and 乳胶 meaning emulsion. Thus, "初乳" also means the formation of emulsion in the earliest time. By verbatim translation, this phrase would be translated into "colostrum," when it really means "first appearance of emulsion" in a laboratory. This is similar to the case where a special acronym happens to be the same as a well-recognized acronym in English.

o. Hidden Meanings Cannot be Translated (as in Word Games)

Chinese has a very long history but also has wealthy stories, historical events, famous places, and famous people to encode hidden meanings. An interesting article title is "房产的-调控-成了-空调" By word-for-word replacement, it would be: properties—controlling—becomes—air conditioner. The message means a lot more. At the time, the government implemented a housing regulation to control house price, but did not achieve a good result. Moreover, the last two words 空调 can also be a combination of 空 (empty, hollow, sky, air, in vain . . . ) and 调 (adjustment). Thus, the original statement becomes: controlling properties by the housing regulation becomes "adjustment in vain." The author really means that the effort of regulating properties has achieved nothing. Even more interesting is the sentence: "土地调空成了空调." The word-for-word replacement is: land—removal of ownership—become—adjustment in vain. In China, land belongs to state or local sub-divisions. The government can take land's use right away from any land users by policy or political movements. Here "调空" [different from 调控, above] means nullification of use right by policy. This sentence has a complete symmetry in their looks and sounds: 调空....空调. However, Chinese words can be used to play word games in various ways. For documents with word games, translation always drop out the secondary meanings. One famous example is the paired couplet title in Shanhaiguan Mengjiangnu Temple (山海关孟姜女庙). Some analysis published in the Internet shows it has a total sixteen different interpretations. If such encoded text is translated into any other language, its encoded messages will disappear.

If the source language has a very long history, it may have all kinds of way of carrying secondary meanings. Sine a corporation is just a small world, word games may be used for all kinds of purposes. Additional messages may be encoded by citing a famous event, place, person or story in the statement. Sometimes hidden messages can be highly relevant to an issue in litigation. For example, an admission of a crime by a tortured person may encode a message of denial. An approval of a board action by a director under duress may reveal his disagreement. In this kind of cases, a translation is unable to carry secondary meanings.

p. Special Meanings Recognized Only in a Communication Cycle

In the house industry, a sentence is "I have the termite sent to David, and it came from Bug Bust." Without understanding the trade, a reader would understand it as sending termite which was from Bug Bust. In the communication cycle, "the termite" actually means a termite inspection report while Bug Bust is a company that provides a service to kill termite. After the original sentence is verbatim translated into another language, the readers in the target language cannot get the original meanings. Other similar words include "the appraisal" (an appraisal report), "the valuation" (an valuation report), and the inspection (an inspection report). Such informal expressions are routinely used in a small communication cycle. In translating documents for such a group, the translator must learn their special communication habits.

q. Meanings of Statements Depend Upon Author's Personal Knowledge

The meanings of words and sentences may depend upon the author's personal knowledge. 人很愚蠢，他们不吃鱼。. The closest verbatim translation is "XYZ people are foolish; and they do not eat fish." This translation makes no sense because there is no obvious connection between intelligence and eating fish. The actual meaning would depend upon what the author's thinking. In one context, it is believed in the author's community that fish diet can make human smart. It really means that those people who do not eat fish are less intelligent. In another context where the fish is cheap and is widely considered as the best deal, it means "the people are foolish for not eating fish." Correct translation would require knowledge of the specific author. After the statement is translated, the readers in a different culture will have no clue. Personal opinion like this is highly subjective, and interpretation by objective method may lead to absurd results.

Short memos, calender entries, and technical notes may have large room for using different words and phrases. If an original sentence has some uncertainty, the translation generally cannot preserve the same uncertainty. The best shoot is to decipher the meaning at native level. The failure to decipher the original meaning may result in errors which cannot be detected in the translation.

2. Effects of a Shift in Language Context on Perceived Facts

Even if original documents are accurately translated, they may still have serious impact on the adjudication of the case because of the language context is incomprehensible to the hearing officers. Any of the foreign documents have incorporated cross-document verbal context, business transaction context, external facts, unstated assumptions, and potential errors and omissions. Those things are already troubles for readers in the target language. However, each of the documents is also intertwined with foreign culture and contextual elements such as foreigner names, foreign business practices, foreign science practices, foreign human interactions, foreign geographic locations, and foreign legal environment etc. It is simply impossible to avoid them. Those elements provide additional information necessary for the understanding of original documents. When an author writes email in foreign names and foreign company names, the foreign names and company names carry some information about the person and the company's business; if the author comments on slow work progress on a job site in a foreign city, the city name carries some information about the natural condition of the city; if the author comments some personal relationships, it carries information on their ways of social intercourse.

After a document is accurately translated, it would still inhere all elements of the foreign context. The translation would be incomprehensible to the readers who know only the context in the target language. The readers will have no clue as to the players (even not know sex and race), locations (all potentially relevant properties), unique geographic conditions, business environment, legal environment, plus potentially unlimited cultural concepts and potentially unlimited unique expressions. The hearing officers thus read words and phrases that either lack foundations or are attached with wrong foundations. Many things "do not add up." This problem alone (without any other errors and term multiplicity) would easily alter litigation course. At any rate, deciding a case is applying law to facts. When the hearing officers are unable to understand facts correctly, there is no way to reach a right result. This problem together with common translation errors and translation multiplicity makes most foreign cases unfit for trial on merit.

When cases originated in one culture is heard in another culture, their results often surprise litigants. When those cases are carefully examined from the target culture, their results are not surprising at all. The cases perceived in the foreign context are different from the same cases perceived in the forum context. The effects of context shift include: (1) the foreign context are lost in front of the hearing officers knowing only the forum context; (2) all information provided in cross-document context may become less obvious; (3) words and phrases may become incomprehensible due to a change in context; (4) the meanings of words and phrases are changed; (5) the scopes of collection nouns are enlarged or narrowed; (6) some original word combinations become unacceptable in the target language; (7) author's feelings and attitudes are changed; (8) cultural meanings of words and phrases are stripped and different meanings are forced onto; (9) the social values of identical conducts are changed; (10) the degrees of modifiers are changed; (11) external facts and unstated assumptions become less obvious; (12) improper usages become more confusing; and (13) original errors and omissions lose their vestiges. Such documents are very hard to read due to all kinds of mishaps.

Any of those factors may decisively change litigation outcome. In a contract dispute where a party is sued for violating a non-competing agreement prohibiting the sales of "office products" and if the items sold fall in the disputable category, the outcome would depend upon whether the items are office products. By using common sense the hearing officers take as granted in the Unites States, the company should win. However, the company may lose the case in a foreign nation because the trier of facts will not take the items as office products. The only way to prevent an unintended outcome is use of extensive annotations in the translation or provision of expert testimony on the scope of the term.

When an employment agreement is drafted in the United States, it may lose a lot of the claws when it is litigated in a foreign culture. Employment contract often contains words and phrases that are sensitive in each culture. Hiring employees in Brazil is easy, but termination of employees is difficult. An employment contract may be unable to protect Brazil employers as it could in the United States. When a party takes a position that is strongly against a cultural value, little can be done to change the outcome.

The social value chance might invite a hostile or sympathetic actions from the trier of facts; the stripping of context, verbal context, and business context may impair perceived facts, as understood by the hearing officers; improper usages, errors and omissions may distort critical facts; even sentence structures and word orders could affect litigation outcome if the central issue is construction of law and application of law to critical documentary evidence.

3. Illegible Translations Caused by Translation Term Multiplicity and Structural Multiplicity Different documents may contain the same term to mean different things. This phenomenon is referred to as "term conflict." In contrast, a thing, a concept, a person, or a location may be referred to by different terms in different documents or different sentences in the same document. This phenomenon is referred to as "term multiplicity." When term multiplicity exists in large numbers in translations, it can confuse readers. Neither term conflict nor term multiplicity is a real issue in native documents, but they become serious problems in translations in large discovery projects. Total elimination of term multiplicity is impassible.

Each language allows writers to freely use different sentences, adjectives and verbs. This is so called ways of expression. A careful observation shows that expression diversity is generally not allowed in person identities, entity identities, company divisions, product names, trademarks, logo, important events, important legal actions, key technologies, and important milestones. They tend to use those terms consistently in all corporate documents and in the public. Occasionally, some terms may have a limited number of variants, abbreviations, and shorthand, but they are recognizable by corporate staff and the public.

Corporate executives normally write their names in certain ways: some like to use full names; some, partial names; and others, abbreviated or short names. Their names may have several potential translation choices: sound translation of full name, sound translation of preferred name, correspondent foreign name, and correspondent preferred name. Some executives may have arbitrary foreign names, which are not related to their native names. Most corporate official titles also have many different ways of translation. A Chinese corporate title may have five or more ways of translation. Many entity names may comprise nation name, city name, or locality name, and one or more ordinary words. Nation's names (Burma vs. Myanmar), city names, and locality names all have different choices. Ordinary words include nouns, adjectives, verbs, and action words, which have far more translation choices or synonyms in any language. When ordinary words appear in company or entity names, they increase the ways of translations. The number of reasonable translations is directly proportional to number of ordinary words in entity names. A corporate structure may also have different ways of translation. For example, "sales department," "North America region," and "field office" may be translated as "sales division", "North American continent" and "representative office." In a typical email header or an address block, name, title, company name, division, address, city, and nation all have two to five translation choices, which can result in a huge number of combinations. To an English reader, two-word differences between two address blocks (such as name and city, title and nation, or person name and entity name) can be considered as two different persons. When one address block is different from another by three to ten words, there is no way for the readers to know whether they are for the same person. In determining whether two identified persons are same from translations, native speakers can "see" original native words through translations, and can make a good guess. However, hearing officers would not know how translation has contributed to the differences in the address block.

Three additional factors make it even hard to identify persons and entities in translations. When thousands of documents are translated without any constraints, translations may contain all potential ways of translations, which may be in hundreds or more. Even worse, many companies have two or more similar employees having similar names and similar titles, and their address blocks also have many ways of translation. It is entirely possible that the identities of the same executive in different translations may appear to be so different that they would be considered as different; whereas the identities of two different employees may look so close that they are considered as same. The unrestrained freedom in translating identity terms makes translations incomprehensible. Many terms may be translated with different wording structures, making the problem even worse.

The last factor is translation styles of many translators. Translations in a typical production pool exhibit a broad range of characteristics, as a result of different writing styles, technical knowledge levels, understandings of litigation, and translation philosophies of translators. Translations by computer algorithms can be anything from complete accuracy to total errors; translations by those who do not understand litigation nature may show massive distortions, inaccuracies, and even errors; translations by those who care about original meanings may consume a great deal of time to make repeated amendments; translations by a vendor in a context-deficient environment may reflect rewriting of stories; and those who really understand inherent problems and litigation nature may feel helpless, while second language speakers are confident of translating anything. Translations with massive stylistic, phraseological, and terminological inconsistency will make them hard to decipher in one or more aspects.

For example, "有线事业部上海测试局" (Its word-for-word translation: wired—business—division—Shanghai—test—bureau) has more than 200 ways of translations. If some translators change their word orders, the potential number of translations would be even bigger. Each of the translations is reasonable from translation point of view. When documents contain a large of number of variants, they confuse their readers. If the client has many similar test facilities with slightly different words, the translations will blur the subtle differences. Even worse, if other vendors or competitors use a similar name, the translations may mix their identities completely.

Terminological, structural and stylistic multiplicities are directly responsible for tracking translations by those who cannot read native documents. Tracking translations is seemingly simple task super lawyer representation model, but becomes extremely difficult under the multiple-player task-divided representation model. The degrees of difficulties is exponentially related to the number of documents and the number of participants involved. It would be an unmanageable task for a mass translation project. The result is some documents are translated many times, while others are omitted by mistake. In some cases, litigation attorneys may pick up documents for translation on the basis of reviewers' comments, but are unable to tell whether particular documents have been translated. When two or more litigation attorneys work on the same case, their inability to evaluate original documents makes the situation worse. In other cases, the right to designate documents for translation is delegated to document reviewers, but they do not have tool to check out all translated documents. Each reviewer picks up documents for translation on the basis of what the reviewer knows. Different reviewers may pick up the same or similar documents for translation. When a review project is going on for months or years, one reviewer may translate many duplicate and similar documents. This problem alone can easily double to triple total translation time while still producing incomprehensible translations.

Term multiplicity may affect client's interest in several ways. First, in government investigation cases where the litigants own documentary evidence is confusing and misleading, the government may demand additional documents and take additional depositions. This will compound litigation cost. Second, confusing and misleading translations may be responsible for protracted litigation which is undesirable. If a client can produce clear evidence to address the governments concern or main issue, the case may be deposed of much faster. If the documentary evidence is impossible to understand, the parties can only drag it because there is no way to hear it on merit. Finally, when time is run out, the parties may have to settle the case, not on the basis of merit, but purely due to the need to get-over-with-it. The end result is that the should-be-winner may be a loser, or an innocent party may have to pay a fine. In private civil cases, both sides may suffer from protracted litigation. In governmental investigation cases, it is hard to imagine any scenario where producing illegible documents can help client. A single questionable transaction described in a large number of duplicate and similar documents may "become" many illegal transactions done by many employees in the translations due to translation term multiplicity.

4. There is No Way to "Accurately" Translate Troublesome Documents Accurately

The difficulty in translating troublesome documents is overlooked in the review industry. Documents are created for conducting business with the maximum efficiency at the expenses of accuracy and elegance. Original documents may omit the substance that are known to intended readers, contain grammar, usage and spelling errors, use uncommon abbreviations, and have illegible dates, times, and place names. A vast majority of documents may be characterized as informal, casual, concise, with assumptions omitted. They may contain extracted characters and words as shorthand. Some extreme examples of troublesome documents include laboratory notes, calendar entries, informational technical reports, customer field reports, and database compilation. They are often incomprehensible.

Common translation problems discussed above are already very serious. Many additional factors make the problems worse. Those factors include (1) different translation methods, (2) different understanding of technical matters, (3) handwriting conditions, (4) omission of some materials concerning background, people, locations, facilities, and culture, and (5) the unavailability of related documents for establishing verbal context.

If an original document has one or more problems, it is impossible to keep the same problems in the translation because the source language and the target language do not share the same vocabulary and sentence structures. They may differ in many concepts such as articles, noun plurality, number consistence, tenses, conditional expressions, and specific usages. When a sentence is translated from a source language to a target language, necessary changes must be made based upon the substances and respective language rules. There is no way to keep the same uncertainties and same errors in the translation. Misspellings in English cannot be expressed in other language because they use different writing symbols; improper grammars cannot be preserved in a target language because they are governed by different grammar rules; improper use of adjectives and adverbs in the source language may be obvious, but the error vestige cannot be preserved in translation; casual expressions in English cannot be translated as similar causal expression in the target language. Essentially most problems in an original document cannot be preserved with all useful information. A resulted translation may lose original meanings, contain distorted meanings, and have additional meanings, and most of the information necessary to ascertain original meanings may be distorted or lost.

A source language such as Chinese do not need to indicate the number of nouns and do not require the consistency between subjects and verbs. The missing of such information, which is required by the target language, may make translation impossible.

If a laboratory note is about a series of experiments, verbatim translation of the note can introduce all kinds of errors. A subject mentioned in a research note may be "correctly" translated as a single person, but may be contrary to reality. If a laboratory note is about experimental design, the accuracy of the translation depends upon the proper writing-in of the plurality for various subjects. The pluralities of test subjects are not directly reflected in any text, and nor in the forms of associated verbs. They can be inferred from experimental designs. Verbatim translation with arbitrary selection of pluralities for the subjects may result in an impossible experiment. Failure to make proper and necessary changes in any of many aspects can also result in confusing and incomprehensible translations.

The ability to understand substance in the source language is critical in translating troublesome documents. Source documents may contain a large number of specialty words, jargon, abbreviations, acronyms, informal expressions, cultural expressions, company names, people and locations, and production facilities. The translators' familiarity with those concepts is a requirement for properly translating troublesome documents. In any language, a word may have one to potentially hundreds of meanings. The first a few meanings are for common uses, but the meanings in high order numbers are generally for special trades and technical fields. The translator must identify right words. In such documents, companies are written in one to two characters, locations may be spelled as notations of one or more characters, human manes may be initials, numbers, and notations, and facility names may be informal. The documents may contain words and phrases having cultural meanings and even contain local dialects. Thus, proper translation of those things requires multiple-fields background knowledge and a full understanding of underlying technologies.

If omitted assumptions cannot be found from the source document, they may be established by reading other related documents. In translating troublesome documents, one thing that could help the translator improve translation quality is to review related documents. By reviewing related documents, the translator can learn relevant companies, people names, locations, facilities, and background stories, and improve translation quality. If documents are selected and sent to a vendor for translation, the translator is not provided with context knowledge, and nor is it informed with the focus of litigation. The translator is at a disadvantaged position to ascertain original meanings.

When troublesome documents are verbatim translated, it is highly probable the original meanings are excluded and unintended meanings are introduced. Verbatim translation should not be used to translate troublesome documents if they are related to issues in dispute. Despite the problem in original documents, their meanings relevant to the issue in dispute may be deciphered from studying their context and related documents. After the documents are translated into a target language, they may become indecipherable riddles. Such translations cannot be used as critical documentary evidence. If those documents contain matters that are remote from issues in dispute, translations may be used to exclude the documents. If they are revolved around any critical issues, they should be translated with the most possible meanings, accompanied by a construction analysis.

Best translation can be achieved only by ascertaining original meanings in all possible ways. The accuracy of a translation depends on translation approach and the ability to analyze substances. The translator needs to understand background, specific substance, and related facts, and weigh probabilities of possible meanings. The sole judgment for the quality of final translations is how well to preserve: (1) the scopes of terms including subjects, objects, and concepts, (2) the logic relationship between any two parts, (3) the timing of all stated and implied events, (4) the order of all things, (5) the spatial relationship among all things, (6) the plurality of each of the things, (7) the feelings and attitudes of the writer toward to other persons and things, (8) the implied purpose of each conduct, (9) the subtle relationship between a thing and its modifier, and (10) the degrees of adjectives and adverbs. There are many additional parameters applicable to specific cases. They are referred to as "construction parameters" for translation purpose. After a document is translated from a source language to a target language, if any of those parameters are changed, the translation contains an inaccuracy or errors.

Not all of the "construction parameters" can be found in every document. Even perfect translations may be unable to preserve all of them. It is impossible to predict whether change of any of the parameters can interfere with factual findings or application of law. The feelings and attitudes of the author toward a particular subject, person, or thing may be meaningless in many cases, but may be critical in finding willful, reckless, and hostile conduct in punitive damages claim; the plurality of items may support or repudiate a legal theory; and a different spatial and sequential relationship may effectively repudiate a patent infringement claim or patent validity position. By using the construction method, certain meanings may be ruled out based upon ascertained facts, technical or logical impossibilities, or cultural prohibition, and certain meanings can be inferred. One or more interpretation differences may affect the disposition of an issue in litigation. To reduce burden of work, the analysis may be conducted with legal questions in mind.

5. Problems in the Documents Created by Second Language Speakers ("SLS") in a Foreign Context Many companies require their employees in a foreign culture to write business documents in English, and some legal advisers suggest that employees write English to save e-discovery costs. While such documents facilitate communications with English-speaking entities and staff, their use in litigation can pose even bigger risks.

When the author, who grows up in a non-English language culture, writes a document in English, she essentially writes the document through translation. What the author did is (1) form an ideal to express, (2) develop native sentences, (3) develop English sentences by imitating native sentence structure, and (4) substitute native foreign words by English words by pair-wise replacements. This four-step process has a huge room to introduce errors and inaccuracies. Such writings are totally comprehensible to his colleagues who know the foreign culture, verbal context, and transaction context, and would use the same process to create English documents, but are incomprehensible to those, including hearing officers, who will read the document from an entirely different language context.

The contents of such documents are inevitably intertwined with foreign culture, foreigner names, foreign business practices, foreign science practices, foreign human interactions, foreign geographic locations, and foreign legal environment. In creating the documents, the author has to address all kinds of difficulties. If the hearing officers know nothing about the foreign context, such documents would be incomprehensible to them. There are specific reasons for communication failure. Whether the documents can be used without further treatment would depend upon who reads the documents.

One of the specific problems is that foreigner names, foreign places, foreign business operations in the documents can be enough headache to native English readers because they cannot get any information (not even genders and races), cannot distinguish between facilities names, location names, object names, and human names, and do not know anything about foreign business environment and legal environment.

Another reason is that the author might use second language to mean something that did not intend. While the author can express ideas in native language easily, the author may have difficulty to express the same in the target language such as English. The author thus misuses words and structures in the language. One biggest problem is that the author may pick up certain inaccurate words consistently, and provide no vestige to reveal their misuses, those errors and omissions may become perceived facts, which cannot be corrected. The cultural difference may make this problem even worse.

They are many specific problems in such documents. One of the problems is meaning change due to cultural difference. In one example, the author may use "running dog" to mock a hired gun in the native culture, but the term becomes a loving character in the English culture. The author may try to express a concept in target language, but is unable to find a right way to express it, and the author uses a quoted native term "Guanxi" to express it. When the author is unable to use a usage in the target language, the author may also cite translated version. For example, a well-known way to express an action for achieving two purposes is "one stone for two birds." Chinese has a similar expression, which has the original meaning: "One arrow for two birds." If the author does not know "one stone for two birds," the author may use "one arrow for two birds." While this example may provide enough similarity, other substituted quoted expressions may be incomprehensible to native readers in the target language. All inaccuracies, errors, and incomprehensible terms will be written into original documents. In the worst case, they may quote foreign language terms directly.

One example showing the effect of context shift concerns employee's sign up practice. A new employee in China needs to process employment paper work and gets a new worker identification number. Based upon original Chinese statement, the official statement in English is "New employee will register on the first day and apply for an employee number." While this is the closest to the Chinese statement, it does not make any sense in the Western culture. The reviewer has a lot of explanations to do to help the hearing officers understand. Due to many differences in science, politics and business practices, this type of expression differences are common.

Another example shows how one word usage difference can lead to a problem. "The payment to our vendor was rejected by the Internet bank due to over payment." It is hard to understand why the bank rejected a payment because of over payment. However, intended meaning is really that the bank rejected the payment because the amount exceeded the bank balance or draft limit. The author wrote this English statement by imitating Chinese words. In Chinese, "付费过高" means "over payment", "over the limit" and "over the balance" and any other situations where the amount is more than a certain number. The author did not follow English tradition that insists that "over payment" and "over the limit" are for two different situations. Therefore, this statement may be changed as "The payment to our vendor was rejected by the Internet bank due to [over the limit or insufficient
balance]." This kind of problems is also common.

Another common problem is word order, plurality, articles, and so on. The source language and the target language may use different word order. In some foreign languages, when a concept or thing is modified by many adjectives, they may be placed in front of the word. In another language, the modifiers may be placed with different structures.

F. Sharing Case Knowledge Among all Attorneys and Document Reviewers

Case knowledge from reviewing documents is a required element for proper translation of documents. The method of the present invention for the sharing of case knowledge will improve translation performance.

1. The Needs for Sharing Case Knowledge

The method is based upon a fundamental presupposition that the substance in any corporate documents is unknown to both drafters and document reviewers in advance. No one can tell what is in the documents of any company. One cannot tell anything as to specific file types, document sizes, distribution patterns, and substances. This presupposition leads to two inferences. Document request with a proper scope cannot be propounded because the drafters don't know what their requests intended to reach. During the review process, the reviewers do not know exactly what the requests are intended to read on. This presupposition determines that the scope of the requests and their applications to documents cannot be determined in advance. They must be refined, improved, and perfected during the review process. The large size of document pool and large number of coding tags further complicate this trial-and-error process. For the same reason, a relevance search algorithm cannot be specifically designed for a particular case because the developers cannot know what they want in advance.

Among all documents, there are two kinds of documents: documents that contain insufficient information for coding, and documents containing elementary facts, which may help reviewers make coding decisions. When the knowledge of elementary facts is required for coding, it is certainly required for translation. For example, email sent from a client to a person concerning a legal issue, the existence of attorney-client relationship between the sender and the recipient determines how the document is coded for privilege. This elementary fact may be fully disclosed in one single document or revealed in several documents. The fact itself is generally not important and often non-responsive. This document is referred as critical fact-descriptive document ("CFD") because the described fact is critical to the reviewer's coding decision for the tag that is related to the fact. The described fact is often elementary relative to coding, but the fact itself may be highly complex. A chip may be found to be equivalent to a patented device after many years of prior litigation. For coding purpose, this fact is still regarded as an elementary fact. Those documents, whose coding is affected, are referred to as "affected documents."

The facts in critical fact-descriptive documents include attorney identity, law firm's role, consultants role, partners role, person's identity, employee's affiliation, transaction nature, product nature, identity of relevant product, model numbers, serial codes, product common names, product inherent properties, product features, unidentified shipments, measurement data, transaction names, code names, patent numbers, prior art references, publications and articles, acronyms and terms, informal phrases, undisclosed financial reports, business plans, poorly identified contracts, legal instruments, legal matters, cause of actions, case numbers, undisclosed subject name, document identity, property ownership, publication source, and virtually anything. Any of the above facts may become a critical fact if it is missing in other documents and affects the coding and translation of at least one affected document.

The number of critical fact-descriptive documents and the number of affected documents in any document pool are very large for the following reasons:

(1) Each of business transactions takes a long time to finish and extensive discussion about the transaction may take place. The discussion may be directed to any aspects of the transaction and may contain many unclear terms. Each of documents alone does not provide verbal context and transaction context for a reviewer to understand;

(2) Many complex legal issues are mentioned or discussed in different documents with an assumption that intended readers know;

(3) Documents are distributed to many employees and many business groups, and are saved on servers, personal computers, and notebooks, and all kinds of media;

(4) Substantially duplicate documents cannot be removed and cannot be bulk-coded. A large number of chain email messages of various lengths may discuss the same substance; and (5) Duplicate documents cannot be removed when the knowledge of certain corporate executives is an issue or documents are not exactly identical.

Critical fact-descriptive documents may be any documents that carry at least one elementary fact. A retainer agreement or billing statement of an attorney may establish the attorneys role in a transaction involving many parities; a document may describe a product revealing its infringing nature; dividend distribution statement can establish the statuses of shareholders; and a document discussing product type may imply if a product is a relevant product. A single document may be both a critical fact-descriptive document for some affected documents, but is also an affected document of another critical fact-descriptive document.

Critical fact-descriptive documents cannot be identified in advance and their appearance in any review order is unpredictable. In some cases, an elementary fact can be established by reading one single document. In other cases, a reviewer can gradually figure out an elementary fact from reading several documents in different relative positions. For example, in a complex negotiation transaction, many attorneys may discuss over a transaction without any background information. They may send, receive, and forward documents, review draft agreements, and make comments on drafts. Most of the times, they do not mention or imply whom they represent for. Occasionally, a lawyer may make a comment about its clients employees, clients business, client property, or clients preference in a way of indicating his affiliation with the client. From a very careful reading, the reviewer may be able to figure out that whom the lawyer represents.

Critical facts in critical fact-descriptive documents can be deceptive and innocent enough to be treated as garbage. The carrying documents may be non-responsive and could be excluded by relevant search keys. It is often concerned with something, which is not part of litigation focus, and it entirely depends upon the issue in litigation. It is "critical" in the sense that it is necessary to make correct coding decisions for other documents. In a jointly looting company case, it may a golf photo showing a business partner and a third party person when they own another business. The coding decision for a single tag may depend on two or more elementary facts. For a document sent to an attorney and another person, the privilege claim depends on the attorneys role and the identity of the second recipient. The email is privileged only if the attorney represents the client and the second recipient is clients employee but not a third party. The same principle can be extended to all kinds of other cases. Many fact inquiries are required to make a correct call for a tag.

In this disclosure, the focus is on the relative order or document sequence of a set of documents comprising one or more critical fact-descriptive documents and M affected documents. Many other documents may be anywhere in the document delivery order (the absolute order from the server), but are ignored as if they did not exist. A sequence of documents may be in one reviewer's review queue, and may be assigned to several reviewers. For example, a document sequence, as viewed from the server delivery time, may comprise two affected documents in a first reviewer queue, twenty affected documents in a second reviewer queue, one critical fact-descriptive document in a third reviewer queue, and fifty affected documents in a fourth reviewer queue. One can construct a relative order or document sequence for the documents by their actual delivery times ignoring all intervening documents. The intervening documents are assumed to be randomly distributed among all those interested documents without disrupting their relevant positions. While intervening documents may be ignored for this series of documents, the intervening documents and other documents may belong to another series of documents.

The earliest capture of the critical fact-descriptive documents will affect review accuracy and review costs. On a review project with only one reviewer, the reviewer will review all documents. For a particular tag, the reviewer has to make the best guess before the reviewer reads the first critical fact-descriptive document concerning the substance affecting the tag. After the reviewer reads the first fact-descriptive document, the reviewer can code remaining documents correctly. The overall error rate for this series of documents depends upon when this first document appears. If the reviewer encounters the first fact-descriptive document in 10% percentile, the reviewer will code 10% of the documents by best guess, and code the remaining 90% documents correctly. If the reviewer runs into the fact-descriptive document at the 40% percentile, the reviewer codes the 40% of documents by best guess, but will code the rest 60% of documents on this issue correctly. If this document appears in the last position, the reviewer may code all documents except the last one by best guess. As shown, the first critical fact-descriptive document appears at a relatively early position, the reviewer may have to make guess for a small portion of documents. A single reviewer, as in the super lawyer model, has an advantage. The reviewer can absorb all critical facts and use them in coding documents conveniently. The problem that single reviewer faces is her or his memory problems. The reviewer may forget critical facts that the reviewer has learned two months ago or may have to struggle to recall them by searching personal notes. If the whole series of documents are broken into sections and assign sections to a group of reviewers, some reviewers will be in much worse positions to review their documents.

2. Sharing Case Knowledge on a Need Basis

The ability to understand context-deficient documents will depend on the reviewer's knowledge space. The reviewers knowledge space may vary considerably. If the reviewer has acquired all knowledge of the technical background, the reviewer would have no need to learn relevant technical terms. If the reviewer has reviewed all documents for a given transaction, the reviewer has no need to learn the critical facts concerning the transaction and may automatically read in the document without noticing it. A sender name, John Doe, in email may cause the reviewer to code it as privileged document because the reviewer knows John Doe's counsel role. If the reviewer has reviewed corporate documents for many years and have known everything about the company, including past names, project code names, all litigation events, past and current key employees, this reviewer will be in a much better position to decipher the meanings of context-deficient documents. However, there is no way for a document reviewer to step into the shoe of those who were involved in the transaction. The document may incorporate external facts by timing, undisclosed logic, or undisclosed connections. Sometimes, if the document does not provide any indication on the incorporated external fact, the document reviewer does not have any indication to see the fact, which was very obvious to the insiders.

Each of the reviewers can learn only a small part of the case in the complex model. Document reviewers acquire different case knowledge through reviewing different documents. Sometimes, a subset of elementary facts may appear on many documents, and, occasionally, some or substantially all of them may appear in one document. The reviewers review only assigned documents rather than all documents, and thus learn different subsets. For a given series of elements, each of the M reviewers has the chance to learn a unique set of elements in the project life. Each of them learns more elements for the subset until the reviewer has encountered all of them. However, for several practical reasons, some or all reviewers may never learn all elements for each series of elements. One of the possible reasons is that some reviewers will not have the chance to read all documents covering all elements. In addition, if a case has too many series of elements and each series contains a large number of elements, it is impossible for the reviewers to remember them. Therefore, each reviewer may know different terms, case facts, and legal issues.

One quick solution would allow reviewers to share their knowledge. However, this idea has been long dismissed in application because the size of knowledge is too big to share. It would require endless discussion, meeting, training and binder updating. Therefore, a viable solution is allowing reviewers to share their knowledge on a needed basis.

G. Strategies for Improving Translation Performance

Most importantly, efforts should be made to preserve cross-document verbal context and transaction context as much as possible. A great deal of corporate email may contain only one to a few sentences. From the four corners of documents, many documents are incompetent for review. The reviewers can read all words "the bid," "XYZ," "the agreement," "the disaster," "material" "the suit," . . . but cannot understand what they exactly mean in relation to the document requests. The portion of incomprehensible substances in corporate documents can be anywhere from less then 1% to more than 95% in terms of word counts. Sometimes, the reviewers understanding of the terms may affect coding decisions in different ways. If documents are presented in a right order with proper context, the reviewer can progressively acquire the knowledge required to understand them. Those terms cited above may cause no problems if the reviewer has become familiar with the whole business transaction. This measure of preserving context, however, cannot solve problems caused by incorporating external facts and implied assumptions, and cannot solve problems from dividing works among different reviewers.

The second strategy is to break up the error propagation mechanism. If the reviewer does not know a critical fact, the reviewer will make a wrong coding decision for one, two, and many documents containing this fact. This error propagation mechanism is greatly enhanced in a term work arrangement under the complex litigation model.

Considering document assignments among all reviewers and the distribution of critical fact-descriptive documents, the strategy is to share critical facts among all reviewers. The sharing of critical facts can break up the error-propagating mechanism in the team-working environment. If UX-1654 is coded as infringing product while it is actually not, hundreds or even thousands of documents containing this model number may be coded incorrectly in a matter of hours. Not only does this reviewer code the documents incorrectly, all other reviewers, who do not know this fact, may code their documents incorrectly.

Another strategy is to reconstruct "transaction" context that is disrupted by team-working arrangement. The allocation of a series of documents among several reviewers makes the situation worse. If the document pool contains only one fact-descriptive document and only one reviewer gets it, the reviewer can correctly code the rest of the documents after reading it. The rest of reviewers will not see this document and have to code their documents by best guess. If this critical fact is available to the rest of the reviewers, they can avoid making the same mistake.

When a series of documents containing N critical fact-descriptive documents are assigned to several reviewers by number ranges or folders, some reviewers may get one at a certain relative position, some reviewers may get two or more at different relative positions, and other reviewers may get none. Those reviewers who get at least one will improve their ability to code after reading it, but those who do not get any will make the best guess throughout their review ranges. Even though, the first fact-descriptive document may appear in the first position in the server delivery time, the break-up of this series of documents among many review ranges make the review more difficulty. Since the whole series of documents is assigned to several reviewers, each reviewer reads documents out of verbal context and transaction context. All reviewers lack at least part of background knowledge and cannot understand terms, person identities, product model numbers, and informal expressions. Therefore, the solution is to share elementary facts and coding rule in real time.

H. Server-Implemented Collaborative Discovery and Translation Environment

"Elementary fact" may mean a fact, thing, term, or anything that can affect the coding of a document, and may mean a data record concerning an elementary fact.

1. The Need for Sharing Work Pieces at the Earliest Time

In such a team work environment, when a reviewer encounters a critical fact-descriptive document, the fact is collected for share with all other reviewers in real time so that the entire team can benefit. By this arrangement, all reviewers will be able to make a right decision as soon as any of the reviewers encounters the first critical fact-descriptive document.

The sharing of such critical facts may be justified for additional reasons. In some cases, a very important fact may be discussed only in one document. If this fact is not shared among all reviewers, the entire team may be in dark. Some critical facts may be collected at considerable costs to the client. Many times, critical elementary facts may be found from reviewing many documents or conducting considerable on-line searches. The facts that required open ended searches and on-line searches include (1) clients histories such as its acquisition histories, past name changes, past services, and products etc; (2) a party's relationship with client (this is particularly important in determining a privilege claim in joint defensive agreement), (3) a third party companies' affiliation which may affect preservation of confidential claim and privilege claim, (4) a third party lawyer's capacity which may affect privilege claim; (5) stock ownership when it affects the legal issue under discovery, (6) governmental official's identities in FCPA, (7) competing entities and competing products in merger clearances; (8) prior art in patent cases, and (9) past litigation history when it affects current discovery issue. The potential types and number of issues may be unlimited.

Accurate review needs the support of basic research tools such as Google Search or Bing Search. The need for conducting open-ended research can be demonstrated in an example encountered in a privilege review. In a case where the client attorney sent draft legal instruments to employees of his client with a copy to a government attorney, the client attorney has shown clear intention to waive privilege claim (unless a supervisory privilege claim is appropriate). Because the government attorney's identity is unclear, the document may be coded as privileged tentatively. However, if this document is actually withheld and a log is provided to the opposing party, it would raise a red flag. Withholding this and similar documents in a large numbers may invite a motion for sanctions on top of the time to re-review those and related documents. A large number of documents may be incorrectly coded simply because the reviewers do not know the identity of one recipient. Open-end search tools may be in separate computers for security reasons. Since every client conducts business with hundreds to thousands of other companies, lack of such a search tools will provide incentive for making very bad guess, which may totally discredit the quality of the review.

The benefit from sharing critical facts may be demonstrated. If the reviewer finds the document at position P=20% for M=1000 affected documents, all reviewers can correctly code the rest 80% of documents. Assuming the elementary fact affects one tag, the sharing arrangement will help the reviewers code the rest 800 documents correctly. Although the first 200 may be coded incorrectly, the need to conduct reconcile review may be very small, considering the fact that the last 800 documents may provide sufficient information to make early errors immaterial. This analysis also shows that inconsistencies and even direct conflicts in coding may not hurt clients case. If the errors are found in the last few document or after the review is concluded, the client may have to review the entire series of documents at much high costs.

The time that the reviewers use in coding documents will be reduced, and the overall one-path review accuracy and consistency will be dramatically improved. Thus, the number of documents required of fixes will be reduced. By sharing elementary facts, the reviewers who never get any critical fact-descriptive documents will benefit the most. Depending upon when the reviewer first encounters the documents discussing the elementary fact, the reviewer may be able to code some documents correctly. Many reviewers may be in position to "share" the elementary facts even before they start reviewing their documents. However, this sharing arrangement does not affect the coding of the first 200 documents in the case. That part of documents might contain many improperly coded documents.

If the overall appearance order of all fact-descriptive documents for all sequences of documents is 20%, a successful real-time sharing method can reduce corrective review for the 80% of documents. A real time sharing arrangement may reduce errors in the 80% of documents. The improvement in review accuracy of the responsive document pool is much more. The real time sharing would also reduce the time for reviewers to conduct duplicate research. If, for example, a reviewer knows that a particular model number is a non-responsive product, the reviewer quickly makes its coding decision. This knowledge allows the reviewer to code this tag instantly. However, if the reviewer does not know this model number, the reviewer has to try to find the information from the document and then still has to make the best guess. Due to gross insufficiency of context information, the reviewer may still make a wrong decision after a careful reading of the document. The benefits from the sharing arrangement are not limited to coding this document because many errors and inconsistencies may appear in other similar documents.

Several elementary facts may affect one single tag. If a document has three series of elementary facts, the reviewer does cross check for all three series of elementary facts. When a coding decision depends upon the correct determination of several series of elementary facts, "penalty" is harsh for any omission. After the reviewer has correctly identified attorney names from a large number of recipients, the reviewer fails to recognize a copy recipient who is a third party. The coding will be wrong, notwithstanding, the great effort the reviewer has made concerning the identity of attorneys. A document may be responsive to many issue tags, making the coding even more complex.

Implementing real time sharing of coding rules and elementary facts can also reduce review time for reading difficult matter. When documents contain complex technologies and difficult issues, the reviewers have to read them. However, if an elementary fact is fully understood and a coding rule concerning this fact is provided, the reviewers need less time to code the documents the coding decision of which may depend upon this fact. If a coding rule is to exclude all employee performance reports, there is no need to analyze sales data in such reports. It is also true that some elementary facts described in documents may be clueless. Some documents may discuss an elementary fact in detail, but do not reveal how it is related to document requests. The reviewers may spend a great deal of time to figure out this relationship. If a reviewer has done research on an elementary fact and makes a finding, the finding can help the rest of the reviewers code similar documents. The sharing of the summaries of issues, discovered facts, player identities, and incomprehensible terms is the best way to save time. If the documents contain hundreds of transaction code names, some of the transactions are responsive, while others have no bearing to the requests, the sharing of the elementary facts (e.g., the transaction nature) can help the reviewers save time.

FIG. 1 shows the accurate coding method in an embodiment of the present invention. From the document request, the litigation attorney first studies the request in light of defenses and complaint at Block 400. The system is set up specifically for the case at Block 410. The set-up steps include uploading and publishing the request and case background information on the server at Block 411, setting up a coding rule table at Block 412, setting up a translation tracking table at Block 413, and setting up elementary tables A-N at Blocks 414. The actions at the review process is shown in Block 415, where the coding rule table is updated at Block 416, the data records for elementary facts are added to table A at Block 417 and to table B at Block 418. The document reviewers at Block 425 can access data in any of the tables at Block 421, retrieve data from any of the tables at Block 422, write data into any of the tables at Block 423, and validate data for any of the tables at Block 424. The system optionally sets up an index table at Block 411, which can show (1) all the changes in elementary facts (i.e., "data records") and coding rules, (2) all the changes in the fact tables only, (3) all the changes in the coding rule table only, or (4) the latest changes. Each of the reviewers may periodically access the index table to view all the changes, selected certain kinds of changes or latest changes in coding rules and elementary facts at Block 420. After the first review is completed, the management needs to determine whether a reconciling review is conducted at Block 426. If there is a need to conduct a reconciling review at Block 426, a proper set of documents are identified and retrieved at Block 428 and a reconciling review is conducted according to Block 415.

Real time sharing of basic information requires many unique features. To achieve the intended purpose, the sharing arrangement meets the following conditions to have practical utility:

(1) The sharing method is able to handle any of the large number of coding rules and elementary facts such as attorney names, product classification, product nature, common acronyms, and document types. It is able to accommodate all kinds of potential data.

(2) The method should have the ability to work for different matters. If a system is useful only for one type of case, it is too expensive to develop.

(3) The method should have a simple web user interface for retrieving information, adding information, and searching information. Ideally, it should provide features for one-key search, interactive search, one-key retrieval, and one-form data entry.

(4) The system should have proper means for validating coding rules and elementary facts to insure that the coding rules and elementary facts can control the whole team.

(5) Optionally, the method should have the ability to avoid entering duplicate entry for same coding rules and same elementary facts.

(6) Optionally, all elementary facts should be well structured so that they can be used in a way all reviewers can understand.

(7) Optionally, all discovery information produced in this process can be conveniently backed upon in the course of discovery.

Accurate coding method requires the preservation of verbal contexts as much as possible. If documents have been extracted by a search using keys and key matrix and documents are extracted according to search hits, it would be more difficult to achieve coding accuracy. Exclusion of critical fact-descriptive documents or other critical documents from the review pool will make the review more difficult. At least improper search algorithms or improper search key matrix may remove the documents, which are critical to the proper review of documents. Whenever a search algorithm removes background knowledge and places each of the documents out of verbal context and transaction context, the reviewers have to code documents by best guess.

Improper document extraction methods may turn a large number of relevant and highly sensitive documents into "non-responsive" when they are reviewed out of verbal and transaction context. The method of present invention may be unable to remedy the effects from disrupting the review contexts. If document assignments totally destroy the verbal and transaction contexts, the reviewers may find that a large number sentences are incomprehensible, and thus have to make best guess. This will also decrease review productivity.

2. Using Discovery Information Management System

The sharing of case information may be achieved by using a discovery information management system ("review-assisting system"). This system has been fully disclosed in other patent application (Ser. No. 12/420,817). A review-assisting user interface includes a data retrieval tool for showing data records from database tables, a search tool for searching data records in the database tables, and a data entry tool for entering data records to any database tables. It includes optional tools for conducting global search, interactive search, editing whole table, looking up data (data presented in certain ways), validating data records, selecting different views, and navigating numbered pages. The review-assisting user interface under the manager account has the tools for setting up project and setting up database tables. This system allows project managers to change the table structures of the database tables instantly and reliably, and provides two unique data validation (this term is not used to mean known data validation concept) schemes.

a. Up-to-Date Review Instructions

The sharing of critical information in real time is not enough because the method only reduces certain kinds of errors and inconsistency. The system should provide real time review instructions and updated coding instructions. Use of illustrative coding map can effectively reduce the risk of porting different coding logic into the particular project. The map should be drawn in a way to reduce undesirable effects of the importing reviewers' experience and knowledge into the current project. This graph should contain default rules for each type of documents and options to alter the default rules as shown below.

TABLE 1

Instructions Showing Default Rules, Options and
Exceptions to Default Rules for Privilege Review
(Foreign language symbols are optional in this table)

| Document or Content | Default Rules | Option Out | Exceptions to Default Rules |
|---|---|---|---|
| Draft contract;合同草案 | [ ] P | [X] NP | [ ] P only if it has definitive evidence of lawyer's involvement in email, meta data, and text. |
| Press Release; 新闻稿 | [X] NP | [ ] P | [X] P only if it is concerned with the XWZ transactions. |
| Privileged email sent to partners; 发送到合作伙伴特权的电子邮件 | [X] break up privilege | [ ] Does not break up privilege | [X] the email does not break privilege if it is sent to [ . . . ]. |
| Email sent to attorneys and many employees | [X] NP | [ ] Tentative P | [X] P only if the author asks for legal advice expressly. |
| Email reveals no more what is required to lodge it | [X] NP | [ ] Tentative P | [X] P only if the message is concerning [ . . . ] or sending to or from [ . . . ]. |
| Email sent to a lawyer with FYI | [X] NP | [ ] Tentative P | [X] P only if the subject is obvious that the sender made an implied request for legal advice. |
| Email relayed to lawyer | [X] NP | [ ] Tentative P | [X] P only if the subject is obvious that the sender made an implied request for legal advice. |

The actual map used on the review site should contain a concise but comprehensive default coding rules. This table concerns general matters, which should not be placed in the coding rule table. Each type of documents may be treated differently at different review sites due to differences in the nature of case and litigation strategies. The litigation attorneys cannot assume that reviewers can follow a lengthy discussion or oral instructions. It would be futile no matter how much explanation is provided. The problem is that many reviewers have gained understanding that cannot be easily changed. Normal rules are the rules that most law firms follow under normal circumstances. The use of default rules, reversal default rules, or exceptions can be justified by certain facts, which are not on documents. The following are two examples:

Example 1

Draft Contracts

The key factor, which is not disclosed in the draft contract, is corporate drafting practice. In some companies, every contract is drafted by legal department, and its legal department is involved in every step from sending model draft, negotiating over terms, reviewing terms, editing drafts, and signing off. In this case, the client can defend a privilege claim by showing its general practice or by specific draft instances even though it may be costly to challenge and defend a privilege claim. In other companies, every draft contract is drafted by a group of well-trained employees. While those people might sometimes seek legal advice, they take care of everything in drafting contract. In this case, the default rule should be non-privileged. In many cases, there might be exceptions. For example, all settlement agreements are drafted by outside attorneys. In this case, the presumption is that draft settlement agreements are privileged.

Example 2

Email Sent to Lawyers and Employees

In determining privilege of email sent to attorneys and employees, one needs to determine if the message is intended for seeking legal advice. When an employee sends a message to five people, it may be for information only. However, it is also possible that the email is sent to solicit a comment. In many cases, one, or several recipients do make comments as to what to do. In some cases, attorneys do respond with legal advice. The communication pattern seems to show that at least for some sensitive matters, the sender seeks advice from both business people and lawyers. In one case, email sent to an attorney and four employees may be coded as not privileged. In another case, email sent to an attorney and fifty employees may be coded as privileged. The communication patterns, the nature of information, and the rankings and roles of the employees play differential roles in the determination of privilege. Those two examples tell why two law firms use exactly different default rules for coding certain draft documents.

b. Create Configurable Database Tables

The tables to be created for a second request review may include coding rules, translation tracking table, acronym and terms, player names, relevant products, optional transactions, and optional index table. The tables for a patent infringement case may include coding rules, translation tracking table, acronym and terms, player names, products, sales transactions, and optional index table. The tables for a commercial bribery review may include coding rules, player names, gifts and moneys, terms, compliance actions, and optional index table. The tables for a shareholder class action against their board members may include coding rules, translation tracking table, acronym and terms, player names, board meeting and actions, damages, and optional index table. The tables for a product liability action may include coding rules, player names, communications and knowledge, damages, and optional index table. Those examples show the most likely table structures. Each of the database tables (except the terms table) has at least one field (e.g., coding effect), which affects coding decisions, and generally has one field containing definition or comment. The entries in each of the tables may be multiple languages. In all cases, a foreign terms table may be useful as review assisting tool, and a special terms table may be set up for generating reference tables for editing documents created by second language speakers.

Unique litigation issues, peculiar case nature, and distinctive document compositions may require different tables of different table structures. If a company has only three products, there is no need to set up a dedicated table for products. If a corporation has several hundred of code manes (i.e., fictitious names) for past legal matters, and code names are important to issues in dispute, then a dedicated code name table may be set up. The tables of suitable table structures are designed. A person skilled in litigation would know how to best design tables for each particular case. The review-assisting system allows litigation attorneys to add tables, delete tables, and modify database tables to accommodate unexpected changes and new data elements found in the documents during review. Elementary facts are entered into respective dedicated tables or a shared master table. For example, attorney names, party names, and other key person names are entered in the names table.

For an attorney who reads the request and knows the case, selection and designing of tables are obvious. Project instructions and requests can be published under the instruction tab.

An image file of showing correct tag selection configurations (how tags are selected under various circumstances) may be published in the Instruction tab and may be lodged as an attachment under the Instruction page. By using graphic illustration, the potential misunderstanding of tagging selection rule can be minimized. The project manager can change the image of showing tag-selection configurations by updating the attachment.

c. Using a Coding Rule Table

The coding rules that affect individual documents are stored in the coding table. One example table structure in a web view for coding rules is shown in Table 2. The coding rules are written for specific types of documents. Each rule is sufficiently fine and detailed that it cannot be interpreted in different ways. Coding rules should meet the following guidelines.

(1) The coding rule should be fine and detailed enough to specifically refer to document type. An example of document may be identified by bates or control number.

(2) The main entry for each coding rule should be the common name and document title if they are reasonably short. If common name and title are too long, the most important key words for the document may be used and those words should appear in the document so that all documents containing this key can be found by search. For example, "sales data" may be used to refer all kinds of documents containing sales data. The long title may be written in the comment.

(3) If a long document contains a large amount of irrelevant materials, the entry in the main entry may be one or more key words for the relevant substance. For the sales data in a K-10 report, the entry might be like "sales data, k-10." In this case, both words may be a proper search key for finding this and all similar documents.

(4) Action types include "original," "amended," and "settled" etc. Additional designations may be added for specific purposes required in different cases. The action word may affect how this entry is used.

(5) The comment should contain information for accurately identifying the related document, and the reason for using the rule, its operation scope, and other critical information. It is highly desirable to cite a real document by bates number or control number. If a coding rule name is not proper for search, the reviewers can find the coding rule by searching the comment.

Coding rules are the instructions on how to code for specific documents and elementary facts. A typical coding rule table may contain the following coding rules.

TABLE 2

| Table for Coding Rules for a Second Request review | | | | | |
|---|---|---|---|---|---|
| Coding Rule or Subject | CH | CE | SE | Date* | Definitions or Comments |
| Sales data | 销售数据 | NR | O | Jan. 1, 2009 | Sale Performance in performance reports. |
| Annual Sales | 年销售额 | R | O | Jan. 2, 2009 | Those data are primarily for relevant products BAT-2121. |
| Annual Sales | 年销售额 | NR | A | Jan. 5, 2009 | All annual sales [CH: data are NR. |
| Annual Sales | 年销售额 | R | S | Jan. 10, 2009 | All annual sales data concerning are R. |
| Income and Profit | 收入和利润 | NR | O | Jan. 1, 2009 | Company-wise income and profit report. |
| Income and Profit | 收入和利润 | R | O | Jan. 1, 2009 | Income and profit report for X division. |
| Income and Profit | 收入和利润 | NR | A | Jan. 10, 2009 | Income and profit report for X division. |
| Performance Report | 业绩报告 | NR | S | Jan. 10, 2009 | The report generally contains sales data and refers to certain products, (S) per party agreement. |
| Commission Calculation document | 佣金计算文件 | NR | O | Jan. 1, 2009 | See example BAT-232323. |
| Daily Sales Report | 销售日报 | R | O | Jan. 2, 2009 | IF it mentions relevant products. |
| Daily Sales Report | 销售日报 | NR | O | Jan. 2, 2009 | IF it is for non-relevant products in general. |
| Income & profit | 收入与利润 | NR | S | Jan. 26, 2009 | All income & profits are NR, effective immediately. |
| Sales reports, spreadsheet | 销售报告, 电子表格 | NR | S | Jan. 1, 2009 | Example in Bat-0011111, NR by settled agreement. |
| Web contact log | 网络接触日志 | NR | O | Jan. 1, 2009 | Example in Bat-002222. |
| Trade News | 行业新闻 | NR | O | Jan. 1, 2009 | Trade News about this industry. |
| Trade News | 行业新闻 | R | A | Jan. 1, 2009 | News published by XYZ concerning telecommunication products, market shares of XYZ, and relative competitiveness of XYZ. |
| PRO-211, PRO-212, | PRO-211, PRO-212, | NR | O | Jan. 1, 2009 | PRO-211, PRO-212, power tools are removed from the |

TABLE 2-continued

Table for Coding Rules for a Second Request review

| Coding Rule or Subject | CH | CE | SE | Date* | Definitions or Comments |
|---|---|---|---|---|---|
| power tools PRO-600, power tools | 电动工具 PRO-600, 电动工具 | R | S | May 1, 2009 | relevant products. PRO-600 are added as relevant products, per agreement. |

Note:
The server-generated time data should contain hour, minute and second.

This table shows the coding rules for many specific types of documents and changes to the coding rules. First, the coding rules directly affect the coding decisions of difficult documents. Documents such as profit reports, sales documents, commission calculation reports, and performance reports exist in large numbers. Other documents such as commission calculation reports may specifically mention relevant products, but may have little use in antitrust analysis. The coding rules help reviewers reduce a substantial portion of coding inconsistencies. Second, this table, due to the way of operation, provides a clear-cut time line for each of the changes. The change dates should include actual time in seconds. When a change in a coding rule is made, the change takes place real time. It is easy to identify the documents coded before the change and the documents coded after the change. If there is a need to revisit the previously coded documents, a document processor can use the information to identify those documents. The law firm can use this table to study change histories. This table accurately explains coding inconsistencies and reasons for all changes. This table also indicates that relevant products defined in the initial request have been amended in a second phrase of review. The request dropped out some relevant products, but added new relevant products. This table indicates that some errors are actually the result of negotiated settlement and risk-taking decisions. Third, this coding table is very helpful in a future review. This table may contain hundreds or even thousands of entries, depending on the nature of the case and the size of documents. This coding table preserves all critical decisions, negotiated changes in coding rules, amendments to coding rules, and other work products. It is the work product that the entire review team might have worked for several months. By reviewing this table, the future litigation staff is able to understand great disparities in coding, coding logic, and risk taking-decisions. The detailed coding rules can help future litigation attorneys formulate a new plan for future discovery. If the case is litigated and remanded, and the client needs to find certain documents, the law firm can figure out how to conduct additional review.

Coding rules and certain elementary facts affect the entire review term. The discovery information management system provides two kinds of data verification methods in real time. Any data entries may be validated by managers or by reviewers vote. Generally, coding rules directly controls coding decisions while elementary facts are provided to assist reviewers. Coding rules may reflect strategic decisions, negotiated compromise, motion rulings, and other changes. Those changes do not have to be correct legally, technically, or logically. A litigant may take chance for doing so. The client and law firm can always choose to litigate it to avoid production of unnecessary documents. The parties can also change normal discovery rules on what should be produced or what should not by agreement. The right to add or change coding rules may be rested in project managers and litigation attorneys. An additional step for the validation of coding rules may be used to ensure that they are proper.

Subject to exceptions in specific cases, elementary facts are just facts that any reviewers collect from documents, verbal context, or by combining the substances in different documents. There are a great deal of elementary facts which can help reviewers code documents in one way or the other, but they generally do not specifically instruct reviewers to make a definitive coding decision. Those tasks of gathering elementary facts are ordinarily performed by document reviewers and thus may be entrusted to them. Therefore, elementary facts may be entered by reviewers and validated by reviewers using the voting method.

d. Use a Translation Tracking Table ("Translation Log")

The translation tracking table or log is used to allow any of the attorneys, reviewers, and translators to determine if the same or similar document has been translated and if there is need to translate a particular document. This table works with all tools including local search, global search, interactive search, data entry, record edit, edit whole table, delete record, file updating and file downloading.

(1) It should be useful in real time: entries are added in real time and accessed in real time.

(2) The entries are in compliance with a set of rules so that it is easy to identify translated documents.

(3) The reviewer can open original documents directly from the translation tracking table and optionally the translations as well.

(4) Preferentially, the translation tracking table should be implemented efficiently.

A translation tracking table is used to track documents by using "document identifying information," which means information sufficient for defining a document. It may include (1) Unique document ID or control number, (2) document author, date, recipients, and optional description, (3) file name, file type, file size, and other optional digital information, or (4) any combination thereof.

TABLE 3

Example Translation Tracking Table (Using Chinese as foreign language)

| ID | Author | Recipient | Content | Date | Type | Size | Original | Translation |
|---|---|---|---|---|---|---|---|---|
| 1 | Jack Zhang | Wu et al., | Third email discussing the missing of laptop in | Feb. 01, 2011 12:10:10 | email | 5 KB | View | View |

TABLE 3-continued

Example Translation Tracking Table (Using Chinese as foreign language)

| ID | Author | Recipient | Content | Date | Type | Size | Original | Translation |
|---|---|---|---|---|---|---|---|---|
| | [[张明]] | | oxidation workshop in May 2010. | | | | | |
| 2 | Company board | SEC | 2012 annual report; [Ch] 2012年年度报告. | May 2010 app | Word | 200 KB | View | View |
| 4 | LGE article | The public | Tenth paragraph concerns Client's merger with XYZ; [ch]与XYZ合并 | Not dated | PDF | 300 KB | View | View |
| 5 | Jack Stone ("石木克") | | Email discusses a prior fire incidence on building R; [ch]建筑物R以前火灾; [Only this paragraph was translated] | Feb. 10, 2010 12:15:10 | Chain email | 600 KB | View | View |
| 6 | Bush Ford | | The email commented on the prior fire incidence on building R; [ch]建筑物R以前火灾 [translated only this paragraph] | Feb. 11, 2010 12:19:10 | Chain email | 600 KB | View | View |

To avoid confusion from imperfection in any of the field data, the whole translation team should use sets of precedence rules. For the author field, the translator uses clearly expressed author, implied author [I], custodian [C], and no author as their appearance order; for the recipients field, they may use expressed recipients, implied recipients [I], actual recipients [A], and custodian [C]. Although custodian may be used in both the author field and the recipient field, custodian role can be ascertained by considering type of document, the job function of the custodian, and other indications in the document. The date precedent: clearly expressed date, intended distributed date, and other date on the document. However, printing date is not a good option because it depends upon the date of printing document. File type precedence is actual file type in the native view such as word, Excel, spreadsheet, and scanned file. The original column is placed with a link for opening the original document while the translation column is placed with a link for opening the original document. The links may be pointed to other document review system or another server.

The database table in support of this translation tracking table does not need to contain all fields. The document file and translation file may be stored in a separate database table, a folder, another storage location, or even on different server. In this case, those two fields may contain the address for finding the correspondent files or the links for accessing the correspondent files.

e. Multiple Language Entries in the Tables

The user can find the entry for each foreign term quickly and conveniently, but there is little need to show a long list of related foreign terms in a table view (except in the case of generating reference tables). The tables on web user interface are constructed for both people knowing multiple languages and those who can read only the target language. Indexing primary keys is optional, but not a requirement. The ability to sort terms in foreign languages and target language is desirable, but some foreign languages may present difficulties. In a multiple foreign languages review for a U.S. forum, the target language is always English.

As a general rule, foreign language terms may be entered into a dedicated column just like the English terms entered in a private column. When several languages are involved, terms in the most relevant language may be designated as a primary field while terms in less important languages may be entered as part of definitions or comments. Since all strings in the whole table are searchable by any part of strings, use of dedicated columns for foreign terms is not a requirement. If a term table is set up solely for rephrasing the contents of documents created by second language speakers, this table ("special terms") contains the key words in the target language, while foreign language terms may be placed in the definitions or comments field, if necessary.

Single Column Key Entry with Foreign Language Terms in Comments.

The primary column is for English terms, English definitions are placed in the definition or comment column, and other foreign language terms are placed as part of the definitions or comments with an indicator: [Ch] XYZ; [Russian] XYX. The foreign language indicator should be preceded with a space character. It is preferable that the table is designed so that search for any of the foreign terms and English term can be made. It is preferable that any words in any language within the entire table and even all of the database tables can be found by using the global search feature. Since those tables can be searched for all terms, all records can be found by searching any terms. If all table setup feature so set up, the dedicated table is used to hold a specific class of terms. The system may have C-term (Chinese terms), S-term (special English terms), and F-terms (French terms). Each of those terms may have many sub types. S-term table, for holding special English terms, may have types "Common", "Distinctive," "Unique" and "All" to indicate the nature of errors.

Multiple-Column Key Entries.

The tables may be constructed with multiple primary keys (as shown in FIGS. 7-8). For example, the first column is for English terms, the second column is foreign language terms, and the third and fourth columns are for definitions and comments. When a column is dedicated to a foreign language, it is indicated in the column head. The advantage is the data records can be sorted by foreign language terms. With minor modifications, sorting function can be added to show foreign language terms by their first word stroke counts or pinyin, and, for the group starting with the same word, it sorts data records by the stroke counts or pinyin of the second word. This function can be added by modifying existing sorting program for English terms by adding one conversion: all characters, which are used for sorting, are converted into stroke counts (e.g., the words are converted into 030506, 02130405, 041505433) or pinyin before they are used as the sorting key in the search.

More than two columns may be set up, one column contains target language terms, one or more column contains foreign language terms, one column contains definitions, and optionally one column contains comments, all in the target language. When a document contains more than two languages in alternate, it is very difficult to review them. The table setup allows the reviewers to sort entries for each of the foreign languages. Those tables can be used conveniently to generate swappable reference tables, and intelligent reference tables. A reference table with terms in the source foreign language can be generated, and terms in the target language can also be generated.

Mixing-Language Single Primary Key.

Any table may be set up so as to accept keys in mixing language. For example, all terms may be entered in the first primary field with a proper type indicated. The table may be named as "All-terms." It may contain many Chinese terms, many English special terms, English-special-error terms, and Japanese terms. By using different sub-type values, the system can extract any of the sub-types: only the Chinese terms, only the English special terms, and only the English special error terms. So a specific set of data can be retrieved to build a reference table. One disadvantage is that it would require additional sub-sub type for defining a specific category of terms while one advantage is that all terms can be conveniently used as the keys for highlighting the document. When a large number of short documents are written in mixed languages, it is desirable to shown an intelligent reference table containing only the terms that have been found in the document.

f. Data Validation Method

In a case that is less contentious, the law firm may delegate data validation task to experienced reviewers or a plurality of reviewers. The reviewers may be instructed to selectively create and validate coding rules. If a coding rule reflects litigation decisions and has significant effects on the whole review team, management of coding rules should be reserved to litigation attorneys. If a coding rule has only limited effect and does not require weighing risks and benefits, the right to validate it may be rested in experienced reviewers. This arrangement can be used to reduce the burden on litigation attorneys. This class of less important coding rules may be about attorney representation capacity, affiliation of persons with entities, the identities of governmental officials, the roles of third parties, and identities of relevant products. If a coding rule is concerned with purely technical matter or basic fact, the right to enter the coding rule may be delegated to reviewers and such a coding rule may be validated by a fixed number of reviewers' votes. This class of quasi-coding rules may be based upon meanings of technical jargon, the meanings of strange notions and expressions, recurring strange spellings, historically misused terms, and the meanings of words and phrases. Normally, two or three votes should be good enough to confirm such coding rules.

g. Using all Search Features

The review-assisting system is able to reduce time for searching for coding rules, elementary facts, and other helpful information. Such a system delivers result in one key search. If a reviewer is unable to make a decision on sales data, the reviewer enters just one words "sales," the reviewer should see all relevant rules on sales data. It might have five coding rules relating to "sales data." The reviewer identifies a relevant coding rule and codes the document. If a reviewer consistently experiences difficulty in coding documents on trade news, the reviewer can find and compare all coding rules relating to "trade news." Thus, this reviewer gains benefits from the work done by other reviewers.

Interactive search function may increase productivity. When a reviewer types in the interactive search box for the coding rule table, it causes the server to search relevant data source fields, retrieve data, send the retrieved data to the server, and display the retrieved data in the selection box for the reviewer to open this record. The field may use the field itself to provide data source. Assuming that the input box for the event field has been set up with the key field (the event field itself) as data source, when the reviewer types in the event field, the server searches the key in the event field and retrieves data pieces, sends data pieces to the client computer, and displays them in a pop-up selection box. If the reviewer moves the cursor to a data piece in the selection box and releases it, the data piece is dropped into the input box. If the data source contains a large number of data records, the reviewer can progressively narrow down data choices for the input box. The search algorithm should ignore articles in the fields. If a reviewer types "s", the server retrieves "the sales table", "a sales report," "a staff report" and "a staff meeting." If the reviewer types "st," the server retrieves "a staff report" and "a staff meeting." Interactive search method is a matured art, which can be implemented by using different technologies such as Ajax and remote scripts. They can be modified to meet those specific requirements.

It is desirable to implement interactive global search feature on this system. This can be easily achieved by modifying the back-end search program: when a last keystroke (e.g., "D") triggers a search, the client sends the accumulated keys (e.g., "TED") to the server, which searches for the accumulated keys in all fields of a shared table or all individual tables, and returns any found records. While all of the records have different formats, but they always have two common fields: a main field and a comment. The comment field contains most important information for review purpose. The rest of the fields may be packed together by any suitable delimiters or separators as in the normal global search result.

By using the feature, the reviewer can interactively retrieve potential data records from the entire assisting database. When the reviewer finds a useful data record, the reviewer moves mouse over the entry and releases it, this causes the server to send the selected record and display the full record below the interactive search box. This feature allows the reviewer to try different keys while seeing the interim records. This function requires high computing power and ample network connection bandwidth. For the best result, the system may be hosted in a local network with high network speed. The review-assisting system does not host a large amount of data and there is little need for constant monitoring. If such a system is hosted on the Internet, interactive search may be less ineffective.

h. Using Data Entry Features

In document review, whenever a reviewer finds a useful elementary fact, the reviewer enters it in the database for sharing. The reviewer decides to enter the data record in the coding table, translation tracking table, and other individual database tables. Each elementary fact is entered as a full data record. The database tables are structured with many other purposes in mind. The records are entered consistently. For product table, it may contain columns for product names, product numbers, product short names, comments, and optional data such as geographic regions. A name table may contain first name, last name, title, dates ranges, type, comment, and address. Not all columns can be used as search keys. The first column is used as default search keys although it is purely a convention. If a field contains several words delimited by a comma or semicolon, they are treated as independent search keys. A data record is first saved and marked as a tentative record, and is validated directly by a project manager or by a vote of several reviewers. Before such an elementary fact or tentative coding rule is validated, it may be marked with a unique marking such as a pair of red brackets (or any other suitable markings) while keeping the highlight color in web view.

The key rule is that reviewers should not enter a coding rule or elementary fact that has been entered. This can be showed in the following examples.

Example 3

Identification of Lawyers

A reviewer ran into a suspicious lawyer, but could not determine whom the lawyer worked for. A search in the names table returned no record. Thus, the reviewer knew the identity of the suspicious lawyer had not been resolved as of that point. Later, the reviewer saw a retaining agreement. At this point, the reviewer knew who the lawyer worked for and this was a critical fact in determining privilege. The reviewer enters this attorney name in the names table together with native name and the document ID. This newly entered record is a tentative record, but the correct citation of the document ID or control numbers allow other reviewers to validate this elementary fact.

Example 4

Identification of Infringing Products

In a patent infringement action, one of the tasks is to identify alleged "infringing" products. A party might have hundreds of products and each of them may have unique brand name, product model code, serial number, common name, and informal name. A document may only refer to a product by one of the terms. A reviewer encountered a model number. A search in the system using this model number returned nothing so the reviewer had to code some documents by best guess. The reviewer later encountered a document, which discusses this product and its relationship with the patent-in-suit. At this point, the reviewer knew it is an alleged "infringing product." The reviewer thus decided to enter this elementary fact in the product table. At this point, the reviewer found another reviewer had just entered a tentative record concerning the nature of the product. Therefore, the reviewer had no need to enter a duplicate record. However, the reviewer cast a vote in support of the tentative record.

Example 5

Bribery Investigation

A reviewer ran into a highly suspicious person who was identified by a strange email address. The email address was not found in the names table. Other emails revealed small bits of information: one email revealed that the person had certain medical problems; one email indicated that the person had vacation to play golf, and one email revealed that the person recently lost a lot money and needed "financial help." The reviewers entered pieces of information including some foreign language terms by using the same email address. This incomplete data record is to be supplemented by other reviewers.

Example 6

Identify of Critical Foreign Terms

Certain terms are so unique and distinctive that their appearance in documents can be distinctive evidence in support of a coding decision. One request in antitrust clearance is the research and development effort in relevant products relating to CDMA technologies. If this term affects the coding decision of limited number of documents, it should be entered in the terms table. If the term affects the coding decisions of considerable number of documents, it should be entered as a coding rule in the coding table. Foreign language words "码分多址" or "码多重进接" should be entered as an entry for primary column or as a part of comment as long as it can be searched.

Example 7

Identification of Code Names

Companies often use code names to refer to sensitive company matters. Code names have been used to denote research and development projects, pipeline products, asset purchase transactions, mergers and acquisitions, personnel actions, government inquiry, civil actions, criminal investigations, administrative actions, and audit programs. When a code name is used in documents, the reviewer needs to know the nature of the transaction denoted by the code name. Code names may be entered in the acronym and terms table, the coding rule table or even a dedicated table, depending on how it might affect coding decisions. The key together with translation may be entered as a main entry in the primary column or as part of a definition or comment.

Example 8

Identification of Incomprehensible Terms

Documents may be written in informal, distinctive, improper, or even wrong expressions. A term expressed in a native culture (i.e., 户口 [residence]) may have a different meaning from its verbatim translation. When such a name appears in documents, it should be given its cultural meaning with indication of its difference. One entry might look like: "户口" is completely different from state residence in the United States, and would cost a lot to "buy" one in China. This class of terms may be entered in the terms table or foreign term table.

3. Use of Integrated Review-Assisting Component

An alternative method is to integrate an information-sharing feature into any existing document review platform. One option is that the full features is integrated with a document review platform, and such full feature integration allows the two systems to communicate with each other in generating reference tables. As an alternative, information-sharing functions are integrated to make the final system simpler. All concepts discussed are equally applicable unless they are incompatible or modified. The concept is that all coding rules and elementary fact data are stored in one master table that is implemented with data retrieval feature, interactive search feature, global search feature, and data entry feature.

Figure 2:
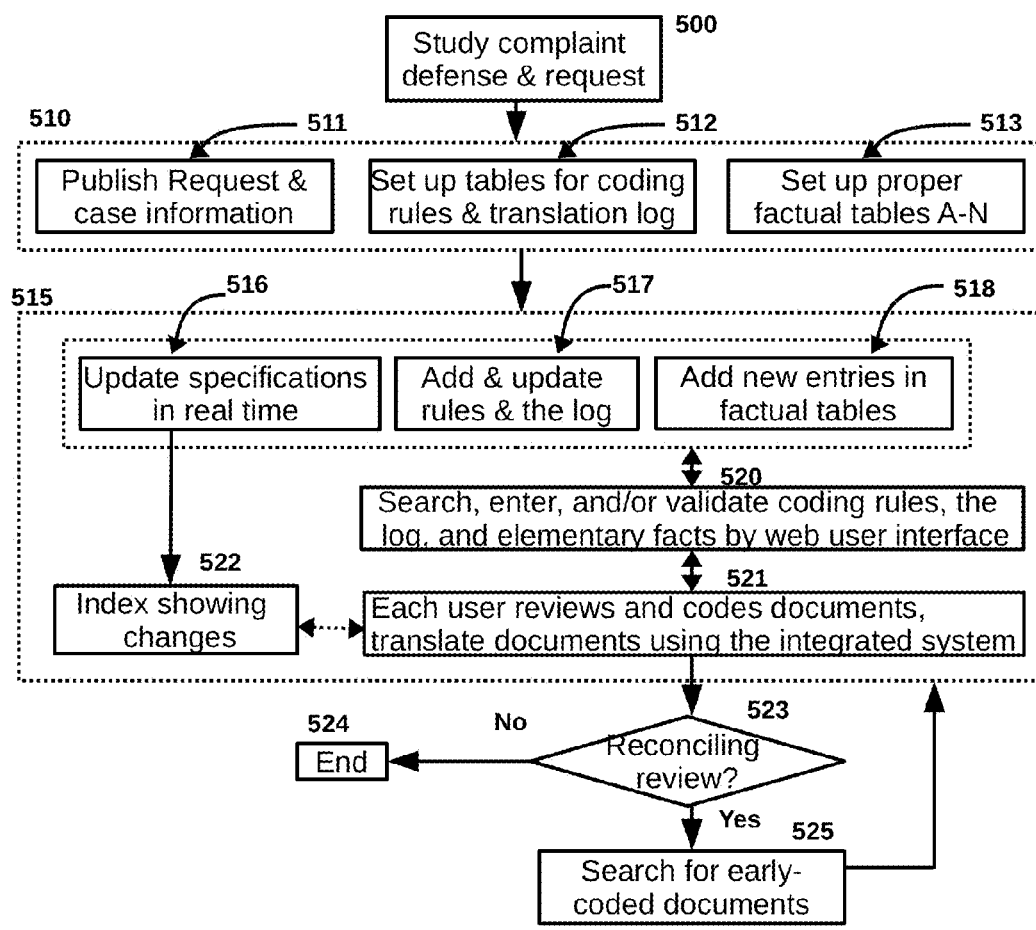
FIG. 2 shows the accurate coding process by using a document review platform integrated with review-assisting features.

FIG. 2 shows detailed steps for this second embodiment. From the document request, the litigation attorneys first study the request in light of defenses and complaint at Block 500. The management sets up the system for the specific case at Block 510. The set-up steps include publishing the request and case background information at Block 511, setting up a coding rule table with coding conventions and translation tracking table at Block 512, and setting up other fact tables A-N for storing elementary facts at Block 513. Those tables may be virtual or logical tables if data are stored in one database table. Data may be stored in one, two or more database tables. The basic actions in document review are shown at Block 515, where the manager updates the document requests or specifications at Block 516 and updates detailed coding rules from time to time at Block 517, while each of the reviewers adds elementary facts in the fact tables at Block 518. All of the important changes are optionally published in the index table at Block 522. During the review process, each of the reviewers uses a review-assisting user interface 520 to access requests at Block 516, the coding rule table at Block 517, and factual table at Block 518 while reviewing documents. Each of the reviewers may also periodically access the index table to see all changes, selected changes or latest changes in coding rules and elementary facts at Block 522. After the first review is completed, the manager determines whether a reconciling review is conducted at Block 523. If reconciling review is to be done at Block 523, a proper set of documents are found and retrieved at Block 525 and a reconciling review will be conducted.

To set up a coding rule table and elementary fact tables, the project manager needs to consider what kinds of coding rules and elementary facts should appear. The tables would depend upon the nature of case, document request and/or discovery objective. A master coding table in a second request case may be as follows:

TABLE 4

An Integrated Table Showing Both Coding Rules and Elementary Facts

| Subject or Coding Rule | Virtual Table | Scope Effect | Coding Effect/ sub Type | Date | Comments or Definitions |
|---|---|---|---|---|---|
| Sales data | Coding | O | R | Jan. 1, 2009 | Sale Performance (Ch销售数据) in a performance report. |
| Apple, John | Names | O | Attorney | Jan. 1, 2009 | Black and White LLP (Ch黑白律师事务所) for the client. |
| T. J. | Names | O | Partner | Jan. 1, 2009 | Director of Marketing (Ch:营销总监) of the client (to be updated). |
| tbx@law.com | Names | O | Client | Jan. 1, 2009 | In the negotiation of Green transaction for the client. |
| White, John | Names | O | Other | Jan. 1, 2009 | Government official in the stock action (Ch: 股市案政府官员). |
| Lee, Trouble | Names | O | Other | Jan. 5, 2009 | Employee of Competitor, XYZ corporation. |
| Annual Sales | Coding | S | NR | Jan. 5, 2009 | All annual sales data (Ch.年度销售数据) are NR. |
| Annual Sales | Coding | S | R | Jan. 10, 2009 | All annual sale data for Division (Ch: 部门年度销售数据) X are responsive. |
| Income and Profit | Coding | O | R | Jan. 2, 2009 | Company-wise income and profit report (Ch:公司收入和利润报告). |
| Income and Profit | Coding | O | R | Jan. 2, 2009 | Income and profit reports for X division (Ch: X部门收入和利润报告). |
| Income and Profit | Coding | A | NR | Jan. 10, 2009 | Income and profit report for X division (Ch: X公司收入和利报告). |
| Performance Report | Coding | O | NR | Jan. 2, 2009 | (Ch:业绩报告) The report generally contains sale data and refers to certain products. |
| Commission report | Coding | O | NR | Jan. 1, 2009 | (Ch:业绩报告) See document BAT-232323. |
| Sale Report, daily | Coding | O | R | Jan. 2, 2009 | (Ch: 每日销售报告) If it discusses relevant products. |
| Sale Report, daily | Coding | O | NR | Jan. 2, 2009 | (Ch: 每日销售报告) IF it is for non-relevant products in general. |
| Income & profit | Coding | A | NR | Feb. 1, 2009 | All income & profit reports (Ch: 收入和利润报告) are coded as NR, effective immediately. |
| Sales data, spreadsheet | Coding | O | NR | Jan. 1, 2009 | (Ch: 销售数据电表格), See document Bat-0011111. |
| Web contact log | Coding | O | NR | Jan. 1, 2009 | (Ch: 网络接触日志), See document Bat-002222. |
| Trade News | Coding | O | NR | Jan. 1, 2009 | Trade News (Ch: 行业新闻) about this industry. |
| Trade News | Coding | O | R | Jan. 1, 2009 | Trade news (Ch行业新闻) published by XYZ concerning the telecomm products. |
| CDMA | Terms | O | N/A | Jan. 1, 2009 | Code division multiple access (Ch: '码分多址," "码多重接接") |

TABLE 4-continued

An Integrated Table Showing Both Coding Rules and Elementary Facts

| Subject or Coding Rule | Virtual Table | Scope Effect | Coding Effect/ sub Type | Date | Comments or Definitions |
|---|---|---|---|---|---|
| FDMA | Terms | O | N/A | Jan. 1, 2009 | is the underlying technology related to the relevant products. R&D efforts for CDMA are responsive. "Frequency division multiple access" (Ch:频分多址), R&D on this topic is not responsive. |
| Virus, complaint | Coding | O | R-3 | Jan. 1, 2009 | The vulnerability to virus infection affects (Ch电脑病毒抱怨) competitiveness of relevant product. |

The first column, also referred to as the primary field, contains the identities of coding rules or elementary facts in forum language. Foreign language counterparts may be in the comment or entered in a dedicated column. The second column is a virtual or logic table, which is equivalent to a main classification. If the information is organized in several individual tables as in the discovery information management system, the main type is unnecessary. Possible values for the first column depend upon nature of case, and they generally include coding, names, terms, transaction, product etc. Instruction table is separate, but a different instruction table may be set up for different uses. The third column defines the scope effect of the coding rule or elementary fact, and common values include original ("O"), amended ("A"), or settled ("S"). Obviously, "settled" is generally applicable to the coding rules. The fourth column (coding effect or sub-type) contains values of signaling the effects of coding rules. The values for coding rules are "R" and "NR" for responsive and non-responsive. They control coding decisions for the type of documents identified. To code documents specifically for request numbers, the coding value "R" is affixed with one or more request numbers. For example, R-1,2,8 means that documents controlled by this coding rule are responsive to the requests 1, 2 and 8. The potential values in the coding effect/sub-type column for elementary facts depend upon table type, and affect coding decisions by operation of facts. For example, the sub-types in a name table include attorney, client, partner, and third party and they affect privilege coding, responsiveness coding, and hot document coding under various circumstances. The sub-type values in a product table may include suspect, normal, toxin, flagged, and all, depending upon nature of case and discovery objective. The term table may include all types of terms such as foreign language terms ("FLT"), special English terms ("SET" for editing English documents), acronym ("ACR"), and mistake-terms ("MIS" for terms that have been misused in documents). There is no need to enter index entries in this table. An index table is automatically generated from extracting coding rules and elementary facts from the master database table or individual database tables.

This integrated table or logic tables should be designed to have universal applications. The manager can set up different virtual tables under main types. Different cases require different table types, and different virtual tables require different coding effects or sub-types. Table values such as "coding" "terms" and "names" may be used as a filter to retrieve all records for the virtual table. So the reviewer can retrieve any of the specific set of data records defined by a table value. By using the convention, even the same virtual table may be used to store different data. For example, products and transactions may be combined in one virtual table. The data from this table can be exported like a dedicated table. Data from a dedicated table can be imported back into this master table.

This table is just a combination of many independent tables used in the review-assisting system discussed for the first embodiment. A person skilled in litigation and computer art can modify this table for different cases. By using one single table, global interactive search, global search, and data entry method can be implemented more efficiently. It reduces the overhead to constantly open and close several database tables. It, however, reduces the flexibility to set up sophisticated table structures. However, all interpreting or factual details can be put into comments. To facility data exchange between two systems using different database tables, utility tools are developed to import existing names table, terms table, acronym table, product table and transaction table into this master table. In retrieving data, the reviewers have fewer options to specify the ways of retrieving data. A powerful global search method allows the reviewers to find any data records. Advanced search and sorting methods are implemented for special uses.

The review-assisting user interface allows the reviewers to perform all functions conveniently. Interactive search function allows each of the reviewers to quickly determine if a particular coding rule, name, term, or elementary fact exists in the table. The user interface may be placed over document coding pane, the document list pane, the document view pane, or a separate pane. When the user interface is opened, it has all functions for collaborative document review.

If the document review system is integrated with a review-assisting system, a menu item such as "Full DAI" 150 is for opening the full-featured web user interface, which is shown in FIG. 3. The full-featured review-assisting system, as disclosed in Discovery Information Management System, can be integrated. This page has a top menu 550 for setting up database tables, a global search box 551, a full table-selecting bar 552, a view-selecting bar 553, a local table search box 554, a data validation status information tool 555, buttons 557 for opening data entry pages and data editing pages, and a page number-navigating tool 558. On this page, the reviewer can also open any of those pages shown in FIGS. 4-10, 15-20. The only functions that have not been shown on the review-assisting user interface is the search tool using multiple personal or private key arrays. This search tool can be placed next to the menu "Pad" or is placed at a point closer to the document view pane. The details for the full-featured review-assisting system have been fully disclosed.

Figure 4:
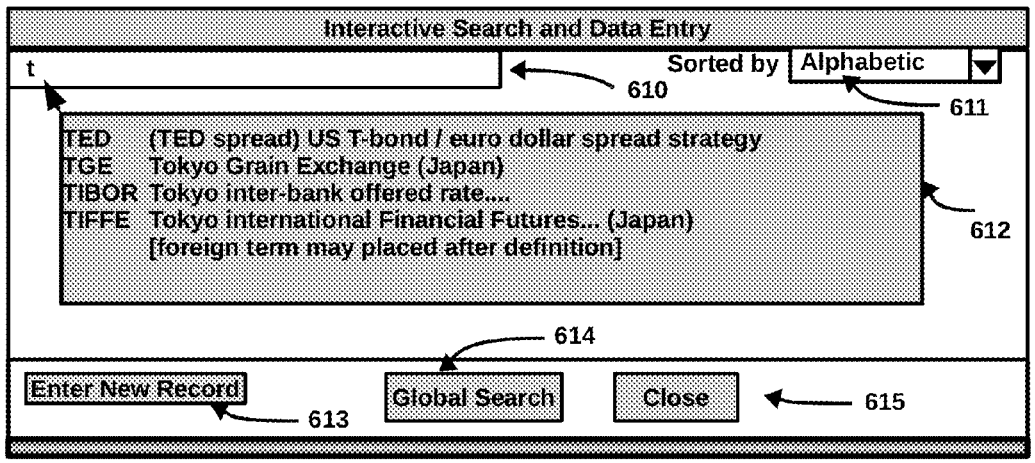
FIG. 4 shows a web user interface for conducting interactive searches with a button for opening a global search page.

FIG. 4 shows an interactive search page (which is in addition to the standard search page). It has an interactive search box 610, a sorting selecting box 611, a selection box 612, a global search submission button 614, and a switch button 613 for switching to a data entry page. In conducting interactive search, the system searches the main field although the search program can be modified to search several or all fields. If the interactive search feature is set up for searching all fields, the search program sends only partial records to be displayed in the selection box 612. It is desirable to show the portion of the text containing the typed letters so that the reviewer can determine which data record is selected for display. For example, if the reviewer types "CDMA" in the interactive search box 610, a record is returned because its comment field contains the typed key. This record may be displayed in the selection box 612 as "R&D, effort: Coding; O; R; this class of documents are directed to only the CDMA technologies . . . . " If the scope of the interactive search is limited to the main field, the sorting control 611 can be implemented. For the best result, both search and display methods may be implemented by default, but the project manager can configure default settings. For investigation cases, the project manager may select or set global interactive search scope to include all fields. For other cases, the interactive search scope may be set to the main field only.

In designing the review-assisting user interface, the key consideration is that each of the actions, interactive search, data retrieval, and data entry can be performed as efficiently as possible. It should not consume too much desktop space, but achieve the highest efficiency. The operations should not interrupt review work flow. If the reviewer finds one or more data records, the reviewer has the option to select one record to be displayed, as shown in FIG. 4. At this point, the server gets the record, updates the page, and displays the selected record below the interactive search box 610.

Figure 5:
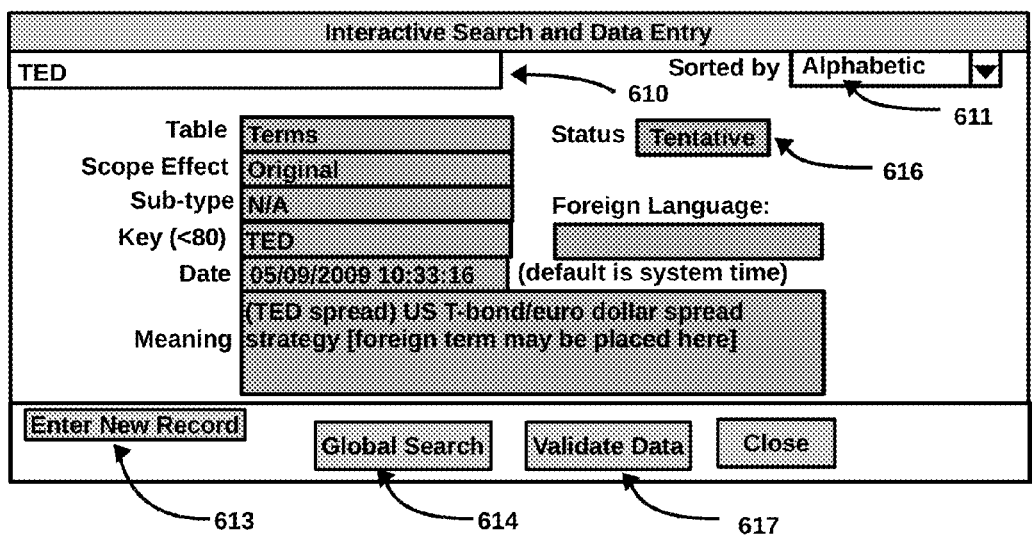
FIG. 5 shows a search result from an interactive search after the user selects an entry in a selection box.

FIG. 5 shows the record, which has been found from searching the key "TED." When a record is found and displayed, this page shows its data validation status 616. In addition, this page also shows a "Validate Data" button 617. At this point, the reviewer has three options. The first option is just to review the record and dismiss it. The second option is to read the record and validate it by clicking the "Validate Data" button 617. If the reviewer is non-privileged reviewer, the validation method is a voting method. A clicking of the button with a pop-up confirmation is counted as one vote for validating the record. If this vote is the last vote required to validate the record, the server will automatically change the validation status of the record (data statuses are indicated by different colors and notations) upon the casting of the vote. The principles and methods are fully disclosed in several United States Patent Applications for Discovery Information Management System. If the reviewer is a privileged reviewer, the reviewer just validates it by clicking it. The third option is to conduct more searches. If the record does not help, the reviewer can do another interactive search in the same search box or use the key left in the search box 610 from the last interactive search to conduct a comprehensive global search by clicking the global search button 614. This button is for submitting the form to a different search program, which conducts a more comprehensive search. It may search this table, discussion table, personal server pad table, and instructions and guidelines, to find all records containing the key. Upon receiving the search request, the server gets the value of the key, checks its data formality, uses it to conduct a search in all database tables, and returns all found data records.

If a reviewer runs into a critical fact-descriptive document and acquires useful information, which may assist other reviewers in coding similar documents, the reviewer may enter a coding rule or an elementary fact in the table. The reviewer types in the interactive search box one or more keys to make sure that the same coding rule or elementary fact has not entered in the table (FIG. 4). If the reviewer finds nothing, the reviewer clicks "Enter New Record" button 613 to open a data entry page shown in FIG. 6.

FIG. 6 shows how to enter a coding rule. This page contains a switch button 619 for switching back to the interactive search page. To enter a new coding rule, the reviewer first selects "coding" as the table type, selects "Amend" for the effect field, select "R" for the coding effect/sub-type field, and enters data for the main field (i.e., the key), the date field, and the comment field. The reviewer may enter specific date as the effective date, or skip it so the system uses its current system time as an effective date. When the reviewer submits the filled page, the reviewer will see the same page showing a server message 618 with the form cleared for next data entry. The server message is always for a prior submitted record, while the displayed data record in FIGS. 6-8 is for next submission. This message shows a record number and entry time for the last entry so that the reviewer immediately knows whether the last record has been entered successfully.

FIG. 7 shows how the reviewer enters a name. The reviewer selects "names" ("attorneys") for the table, selects "original" for the effective field, selects "Client" for the coding effect or sub-type, enters name, date and comment in respective fields, and submits the form to the server. To enter a term or acronym, the reviewer selects the terms as the table, selects "original" for the scope effect field, enters effective date if necessary, types the term and a comment in the respective fields, and submits the filled form to the server.

FIG. 8 shows how to enter a record for a term. By extending the basic logic, data may be entered in any of the individual tables or the virtual tables. In each of the cases, the server processes the form, gets the data, checks date format, connects to the database, and writes the data in a right database table. In those examples, the data entry form has six fields, but may contain fewer or more. The reviewer selects the table type in the first field. It has a drop-down box for the reviewer to select a table type. For a given table type, the reviewer can select coding effect or sub-type for the selected table. For a name, the sub-type may include attorney, employee, partner, and other parties, which can affect coding decisions in privilege and many relevancy reviews. Each table type is associated with only certain types of data. For example, "coding" may be used to retrieve all coding rules, "names" may be used to find all player names; and "terms" (or acronym) may be used to find all terms and acronyms. Coding rules are also used for the purposes of identifying right documents for a reconciling review.

The coding effect field in the database table optionally may be designed to use composite data regulating coding decisions. For example, the entry might be "C-R-O," "C-R-O," "C-N-A," and "C-R-A," where the first letter means coding rule, the second letter means coding decision (N=non-responsive and R=responsive), and third letter means effects: "original," "amended," and "settled." The use of composite data can reduce field number and save storage space. Status fields cannot be manipulated by reviewers, and may be implemented as independent fields. Regardless of how those statuses are implemented in the table, they should be displayed in the most convenient view for the reviewers. For terms table, sub-type is not required in normal situations.

FIG. 9 shows the search result for a global search. The data are found from all database tables including personal pad, instructions, discussion board, all configurable database tables, coding rules table, and translation tracking table. In a separate review-assisting system, where all tables have different field numbers and field types, the data records are packed together with a delimiter followed by its table name [transaction]. In an integrated system, all data records are packed in the same way as shown in FIG. 9. The long message from the discussion board may be truncated.

FIG. 6 also shows how to amend a coding rule. If a record for a coding rule or an elementary fact exists, but the reviewer wants to amend the rule or the elementary fact record, the reviewer can just interactively retrieve the record, open it, edit it, and submit the edited form to the server. The user may select a status "original," "amended," and "settled" as the values of scope effect. The server may automatically treat the changed rule as an amended rule, and the system automatically assigns "amend" if the reviewer has not chosen one. It should be noted that available options for scope effect and sub-type depend upon the table type. If names is selected, the scope effect would be "original" and sub-type would be "client," "attorney," "partner," "other party," and optional "opposing party." The reviewer may use the global search if the reviewer wants to conduct more thorough searches.

The table is has a data validation status field. To save display area, the validation status may be hidden on the web table and are shown in different colors of the main entry. In addition, their statuses may appear by notations or distinctive background colors. Thus, the reviewers would know if a record has been validated and whether the reviewer can validate a particular record. The status data may be shown as a separate column in the table 3.

4. Method for Minimizing Differences in Judgment

The most difficulty in discovery is of course that attorneys and reviewers interpret the same document differently. It is generally agreed that certain level of consistencies is desirable. To reduce the judgmental difference, three causes are explored below. Many other causes are intertwined with the three causes but will not be discussed.

The first cause is related to lack of language context. It is well known that context permeates the language. All words and terms in document definitions are context-sensitive and thus subject to different interpretations. "Dummy privilege review" is not a well-defined definition and can mean different things to different reviewers. Even those most common descriptive words such as "hot", "significant", "clearly", "relevant", and "responsive" means different degrees to different reviewers. They are subject to subjective interpretations. This class of words and phrases can be found in document definitions in abundance. This problem is enough to cause the review product to be worse then that of computer algorithm. This is also the reason why experience, knowledge and skills can become "liabilities" when the reviewers use them to reach an interpreting result contrary to the expectation of the manager. It also explains why a group of reviewers show great differences in their understandings because they have different context knowledge.

The second cause is practical inability to consider all variables, and there is no way to properly weigh all variables. This is the most obvious reason why three appeal court judges cannot reach unanimous opinion. Each judge selects and analyzes the variables based upon subjective preference. Each judge can decide a case first and then identifies those variables in support of his or her outcome while ignoring those variables contrary to her or his opinion. In a typical litigation case, the number of variables that affect any litigation decisions can be overwhelming but are often non-obvious to the reviewers. Example 1 shows why law firms used different coding methods. The large number of hidden variables is the reason why the problem can be addressed only when it appears. No solution can be found from gigantic review binders.

The third cause is the existence of a broad spectrum of varying corporate documents for any type of documents. This document characteristic turns many otherwise-definite words and phrases to indefinite words and phrases. For example, words such as "article," "legal instrument," "financial data," "draft contract," "public statement" and "board minutes" are very clear terms to any non-document reviewers. Everyone would say he or she understands. However, if they are presented with a broad spectrum of such documents, they may have to question whether they really "understand" them: the documents.

Corporate documents may concern anything between its non-existence and its existence or anything from an initiation stage, development stage, to its final existence stage. In one example, a document definition contains "invoices," which is a word everyone understands. In most corporation documents, hundreds documents may be related to invoices. Those documents include billing statements, draft invoices, receipts, handwritten notes on payment, payment vouches, commercial invoices, proforma invoices, banking documents showing payment, amendments to price, security transaction documents, descriptions of a transaction, documents showing payments without title invoice, packing slips, tentative orders, confirmed orders, and email confirmation of an order. When the document pool contains hundreds types of documents that are between invoices and non-invoices, or contain the substance of invoices, it is difficult to draw the line as a matter of practice. It makes no sense to produce a document titled as "invoice" but reject one containing same information except it has a different title. Further difficulty may arise when the reviewer tries to ascertain the intended purpose of a particular document definition and the massive number of responsive documents.

In another example, a request definition may include "financial data" without further definition. All native speakers understand it. If a corporation creates hundreds of varieties of documents containing or reflecting financial data, it would be hard to define its scope. Financial data may appear in sales summaries for days, weeks, months, quarters, years, and multiple year period, budget forecasts for different groups, products, and divisions, and financial forecasts for different products, different periods, different groups, and different purposes. Certain financial data may also appear in routine employees performance reports, bonus computation forms, company restructure document, and even personal resumes. It may be in all kinds of annual reports, circulars, budget plans, press release etc. The fine varieties may be in the order of thousands, and they might reach about 70% of corporate documents. Accordingly, different reviewers may take this definition differently. It is not sure what the request drafters really want.

There is same problem with "Research and Development Documents." The documents from a technical company may include all kinds of highly technical documents. Each document contains only a tiny slice of technical report, quality control analysis, or research and development report. Most email may discuss only one or few tiny aspects of customer support incidences, quality control tests, or research experiments. The documents may come in thousands of types. It is impossible to determine whether a document is related to customer support services, warranty services, routine technical maintenance, or true research and development.

Training is not effective solution to this problem because the scope of things to be trained is overwhelming. The most effective solution is implementation of an effective methodology. Review instructions should be written in a way to minimize different judgments influenced by personal knowledge, prior experience, and different levels of case knowledge. A good review instruction should be designed in light of the review industry general practices with well-defined context to minimize differences in understanding.

A brief written or oral instructions without indicating unique facts and clear intention to depart from common practices is ineffective to overcome reviewers coding habits. The best solution is to set review standards. Standard coding instructions should be presented in a compact version with reference numbers. Detailed explanations are provided in the review standard manual with reference numbers. Reviewers can check details from the standard review manual. After standards are set and reviewers understand the standards, they can code documents in improved accuracy. When litigation attorneys do not want to follow common practice, and apply a different rule or exceptions, it should be presented in a sharp contrast with common practices or well-known default rules. To further reduce coding errors, the coding rules for common documents and specific substances should be standardized, and all coding rules are written with clear context information such as cited document ID.

5. An Index Table for Tracking Translation Guidance, Coding Rules, and Elementary Facts FIG. 10 shows an index table for changes for all tables. It has a filter 630 to select a main type such as coding rules, names, terms or transactions. This table can be set up on the discovery information management system or as an integrated feature of a document review system. The index table is one web table showing all changes or recent changes in coding rules and elementary facts. This table should allow the reviewers select specific records by using main type and sub-type for the filters 630. Optionally, it can have one option to show all records in the table. The reviewers can find the latest changes by opening and see the index table by default. They should see the latest changes each day before the start of coding documents. In addition, the reviewers may see coding data records by different sorting methods such as normal entry dates and times, reversal entry dates and times, alphabetic order, and reversal alphabetic order. Foreign language may be entered as index entries in a dedicated column or part of the comment or definition.

6. Conducting a Reconciling Review and Make Amendment to Affected Translations

After a first round of review is concluded, the coding database inevitably contains errors and inconsistencies. Errors may be the result of human mistakes or changed coding rules during review. Inconsistencies reflect the differences in coding decisions for same or similar documents. If resource permits, a reconciling review may be conducted to further reduce errors and inconsistencies. In the traditional review model, a second review and a quality control review are normally conducted to improve consistencies. Under this review method, only certain documents are selected for a reconciling review. A change in the review may require amendment to the translation.

The document pool for a reconciling review can be created by searching all documents using a key word in changed coding rule and proper variants, and identifying the documents that are coded before the date of change. If "sales data" are key words in documents and the coding rule was changed at time=t, the documents coded before time=t are coded differently from the similar documents coded after time=t. The system searches and retrieves those documents containing "sales data" and other potential variants keys and that were coded before time=t. If the coding rule for a particular substance has been changed twice, at time=t1 and time=t2, the system searches and finds all documents containing the key and other suitable variants and selects those before time=t2. If "sales data" in the main entry of coding rules are properly search keys, they can be used directly. If the rule is named by a descriptive word, proper search keys are used to retrieve potential documents. Generally, it is not proper to use one tag value to retrieve documents because many documents might be coded as non-responsive. If many coding rules are changed during the review, the system finds all those documents, which might be affected by all changes in the coding rules. A reconciling review should focus on the following documents.

(1) Coding inconsistency before a coding rule is placed. Before a coding rule is provided, reviewers might use their best judgments in coding documents, and documents containing same or similar substance may be coded differently.

(2) Coding inconsistencies as a result of changes in coding rules. Certain documents were coded according to an early coding rule. Later, the coding rule was amended, and all documents that contained the same substance were coded differently. If coding decisions do not depend upon other substances, their tag values are conflicting with each other. The tag values for previously coded documents should be changed accordingly.

Reconciling review may be subject to any discovery agreements. During discovery, the litigation attorneys may negotiate with the requester to properly determine the request scope. The requester may consent to a narrow reading of a particular request or exclude specific substances. The requester may consent to the changes to the scope prospectively or on the conditions of producing previously coded documents as of the date. If a change is unconditional, the change in the coding rule can be treated in normal way. If a change is made on the condition it only affects review prospectively, all previously coded documents are produced.

I. Highlighting Terms in Original Documents Using Shared Dynamic Key Arrays

The search keys in multiple languages for highlighting purposes should be different from the search keys for building document review pool. The search keys for building document pool are formulated to get as many responsible documents possible, whereas the search keys for highlighting purpose are solely for improving review speed and coding accuracy. This need for highlights depends up reviewer's case knowledge, and a reviewer does not have to see all unwanted and useless highlights. The highlighted generic terms, which are necessary for finding potential documents for review, may interfere with the reviewers' attention.

It has been pointed out that each case raises unique legal issues and presents unique facts, thus requiring unique data tables and data structures. There are different ways to build search keys for highlighting purposes. The task of building personal highlight keys is burdensome. When a team of reviewers is reviewing documents from the same source, the documents have some commonality. On a given day, reviewers A, B, C may learn a set of special terms from some documents, and those terms may also appear in the documents for reviewers D, E, and F. Many terms may appear in all documents in different review ranges. For this reason, the search keys for highlighting purposes should be applicable to the whole review team.

One method of the present invention is to highlight special terms and certain generic terms ("quasi special terms") in dynamic and collaborative manner to achieve most helpful highlights. The method includes that (1) creating a shared table or several database tables or equivalent file for storing the terms together with definitions or explanations; (2) adding search keys from each of the client computers by using web user interface in real time; (3) verifying search keys[1] by reviewer vote or project manager in real time; (4) generating and rendering a document with highlighted terms for each of the client computer; and (5) changing highlighted terms by a reviewer on each of the client computers. This highlight method may be used in addition to the initial highlights used to build document review pool. The validation tool may be omitted for some terms. Optionally, each of the highlighted terms may be embedded with infotip, which shows the definition for the term in the dynamic display box when the reviewer moves mouse over the term.

[1] It once was referred to as "data validation", but is different from all conventional data validation methods. It is for verifying whether a critical fact or issue can be found from a document. It is a protocol for resolving potential different judgments. Fact or coding issue is disposed by a supervisory ruling or a consent of a threshold of reviewers.

In the preferred implementation, the terms for highlights are the same keys from the elementary facts and the coding rules. The use of those two classes of keys can further improve efficiency. All cautions such as the need for controlling the risk of adding wrong elementary facts and methods of validating them are automatically taken care of. The keys are entered into a well-structured shared database table or individual database tables. The structural limitations are implemented on the data entry form.

If a factual record is saved in a shared database table, it is preferable to use two classification types such as a main type ("virtual table") and a sub-type, which affects coding decisions by operation of facts. The value of the main type includes names, product, branch, and coding etc., depending on setup settings.

J. Search Documents Using Multiple Personal Key Arrays

The present invention provides a powerful search method, which can be used to search documents by using search key arrays that any reviewer can build personally. The search method is implemented to support foreign languages. This search method is designed for personal or private use. Since the key arrays are not shared, the reviewer can freely formulate them. In a situation when a reviewer runs into a series of documents where a critical issue may be always associated with one or more unique words and those words are not useful to other reviewers. In another situation, the legal issue may be so unique that use of personal keys is the best approach. Formulating search key arrays, selection of search order, review focus, and review habits are highly personal. It is possible that the same process used successfully by some reviewers may be totally unworkable to others. This has a lot to do with the reviewers knowledge of search algorithms, ability to understand the effects of different logic operations, different keys combination, and different review orders. When the document has tens to hundreds pages, it can dramatically improve review speed and coding accuracy. It would be impracticable and cost-prohibitory to conduct hard review manually.

FIG. 11 shows that the search page allows a reviewer to selectively search the document by using a plurality of personal or private search key arrays. It has a "Current Search" button 641, and the button 640 is for closing this search page. The reviewer provides a search key array anytime right before conducting a current search. It also has a plurality of setup buttons 642 which allow the reviewer to set up four sets of search key arrays (A, B, C, D), and set up the storage destination for each of search key arrays, and select a search platform. For example, the reviewer can enter search key array A (A1, A2 ... An), search key array B (B1, B2 ... Bn), search key array C (C1, C2 ... Cn), and search key array D (D1, D2 ... Dn).

FIG. 12 is for setting up each of search key arrays. The reviewer clicks the correspondent setup button 642 on FIG. 11 to open the setup page. The reviewer provides a search name, delimited key arrays, selects key storage destination, and selects a search machine. When the search key array is saved on the server, it is persistent until it is deleted. When a single key is used, the search function helps the reviewer to navigate through each of the highlights. When a key array is used as search keys, the search result may have all found words highlighted. The search tool may also be modified to add a Next button that allows the reviewer to navigate along all found words (e.g. A1→A3→A3→A1→A2 in the document).

Figures 14, 15:
FIG. 14 shows a current search box docketed on a document view pane where the "Expand" button is for opening a full search page, which is swappable with a compact search page.
FIG. 15 shows a document with highlights and an intelligent reference table, where the reference table shows definition or comment for each of the highlighted special terms in the document.
Figure 21:
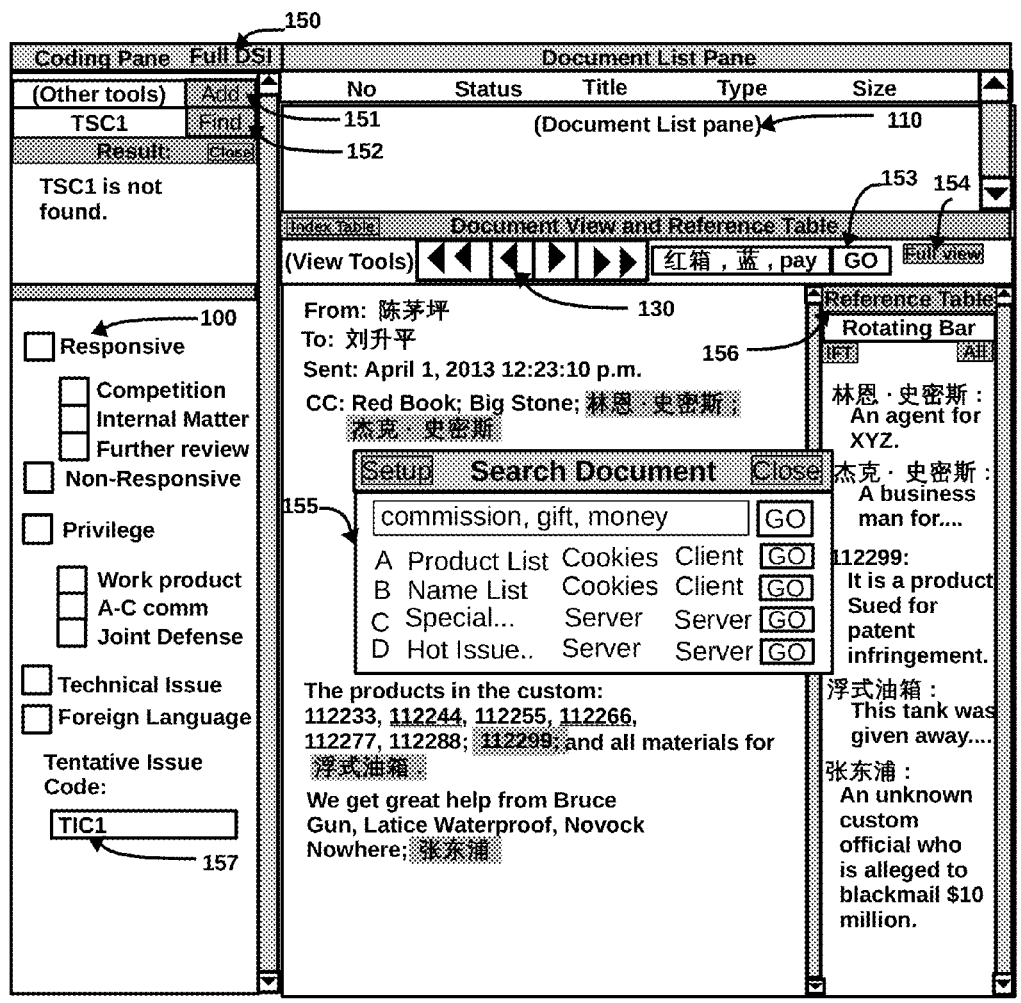
FIG. 21 shows an integrated web user interface for an accurate document review system that contains (1) a search box for instantly checking elementary facts or coding rules in a shared database table or individual databases, (2) the button for opening the page for adding data records to a shared database table or individual databases tables, (3) the button for opening the full-featured web user interface of the review-assisting component, (4) a configurable search tool for conducting searches using plural personal or private key arrays, (5) swappable reference tables, and (6) a tentative issue tag with an input box for accepting a tentative issue code for the document.

FIG. 13 shows a compact search form allowing the reviewer to search the document using any of the search key arrays. It is swappable with the full setup page shown in FIG. 12. FIG. 21 shows that the current search box 153 docketed on the border of the document view pane. A "full view" button 154 is for opening a compact search page 155, from which the reviewer can open the full search page (shown in FIG. 11) and the setup page (shown in FIG. 12). FIG. 14 shows how this tool is docketed on the document pane.

The search function is implemented in two modes: conducting search on the document on the client computer, and call the server to search the document. When the first option is used, the client computer retrieves the selected search keys from cookie, uses the search key arrays to search through the displayed document or the whole document (if document is display in sections, the program needs to have the capacity to follow up, and marks up each of the found keys, with an option to display a dialog to indicate the end of search. In this case, this search may keep the original default highlights that the server added at initial loading. However, the found keys from this search are marked in a color different from the color for the original highlight. For example, the words intended for getting responsive documents may be highlighted in yellow, but the words found by this client search may be marked in blue.

When the reviewer selects the server as the machine for conducting a search and presses the Search button (shown in FIG. 11), the server gets search instruction for conducting the search using the designated search keys, getting the document, conducting a search in the document text, reconstructing the document with hits highlighted, and re-sending the document for rendering. This search may be used in place of the search and highlighting in the initial loading or as an additional feature.

If the key array is saved on the client computer (see Group D), (1) the reviewer submits the filled search; (2) the browser retrieves the selected search keys from the browser's cookie; (3) the client sends the search request together with the key array to the server; (4) the server gets the key array from the submitted form; (5) the server retrieves the same document; (6) the server searches the document text using the submitted key array, marks up all found words according to designed color schemes, and builds a new document; (7) sends the newly built document to the client computer; and (8) renders the document in the same way as for initial loading. It may overwrite any default highlights. To preserve all initial-loading highlights, the system needs to conduct the default search right before the step 6. Of course, the default search and this search may be combined as one single step.

If the keys are saved on the server (See group C), (1) the reviewer submits the filled search form, (2) the server gets the search request, (3) the server retrieves designated search key array from the database table on the server, (4) the server retrieves the same document, (5) the server searches the document text using the search keys, marks up all found words according to a designated color scheme, and constructs a new document, (6) the server sends the newly constructed document to the client computer, and (7) the client computer displays the document. To preserve loading highlights, the system may need to conduct the default search right before step 5. Of course, the default search and this search may be combined as one single step.

By implementing two types of swappable search modes, the reviewer can achieve the highest efficiency. If the server is busy, the reviewer can use the client computer to conduct searches. Its utility is demonstrated in the following examples.

Example 9

Search Three Types of Documents in Rotation

A reviewer runs across three classes (A, B, and C) of documents in high frequencies. The reviewer sets up three sets of search key arrays 1, 2 and 3 in different languages. During document review, if the reviewer runs across a class A document, the reviewer does a search using search key array 1. If the reviewer runs across a class B document, the reviewer does a search using search key array 2. If the reviewer runs across a class C document, the reviewer does a search using search key array 3. If the search on the client computer is unworkable or unsatisfactory, the reviewer may change search machine. If the reviewer runs across a document that does not belong to any of the three classes, the reviewer enters new keys to do a current search. By using this search method, the reviewer can save the time for repeatedly entering search keys and excessive time for doing single-key searches hundreds of times.

Example 10

Investigation into Corporate Looting

The focus of an internal review is focused on commission, several employees and several agents, and several product numbers. From the review, commission may be expressed in money, reward, and incentive. The key array 1 is {commission, money, reward, and incentive}; key array 2 is {stone, black, green, woods, Bluehead, Redhead, and Greenhead}; and key array 3 is {PN1234, PN4487, PN9976, PN5599}. All the keys may also have two or more foreign language terms. For Excel files containing commission and money, the reviewer does a search using key array 1; for any document containing agents or employees, the reviewer conducts a search using key array 2; for any document containing product numbers, the reviewer does a search using key array 3. For a document containing mixed materials, the reviewer do three searches by using three key arrays.

K. Generating Swappable Reference Tables

Figures 16, 17:
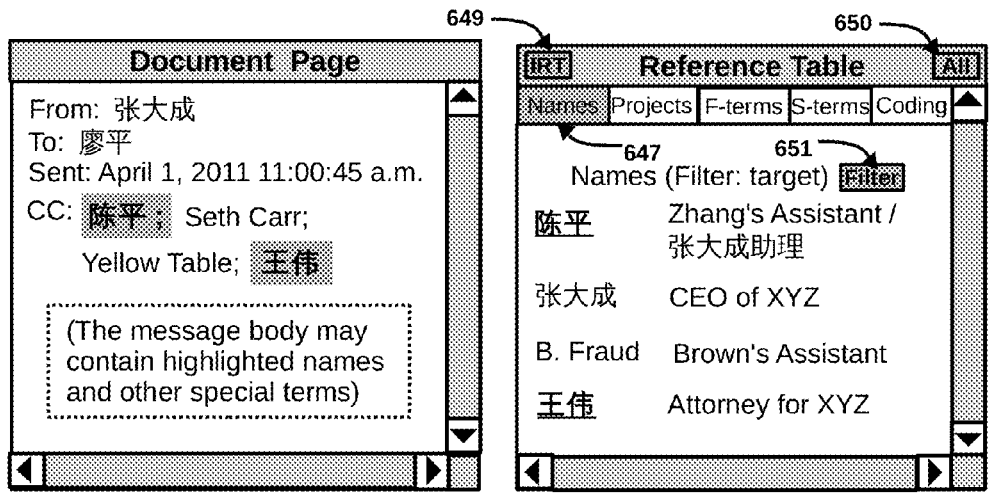
FIG. 16 shows email message in the document pane and a reference table showing definitions and comments for some of the highlighted names.
FIG. 17 shows an account receivable in the document pane and a reference table showing definitions or comments for some of the highlighted projects.

The present invention also includes a method of generating a reference table showing relevant definitions in both forum and foreign language, next to the document under review, as shown in FIGS. 15-17. Foreign language terms can be placed in any ways. Reference table means a web page or pane showing definitions or comments for highlighted terms. It may include a menu bar ("rotating bar") 647 for switching between different reference tables in consistent with virtual tables, elementary fact tables, or any other predetermined keys-classification schemes.

1. The Need for Using Reference Tables

There are at least four needs for using reference tables.

By using reference tables, the reviewer can reduce the time for conducting endless cross checks to learn the terms. The reference tables are placed side-by-side to the document under review, it can help the reviewer increase review speed and reduce the risk of making mistakes. For a document containing a large number of highlighted terms, swappable reference tables can make review task easy.

By using reference tables, the reviewer can get all work products of other reviewers in real time. This eliminates all unnecessary duplicate research efforts. Many times, an elementary fact or legal issue may be resolved after an extensive research or analysis by another reviewer.

Reference tables can dramatically improve the learning speed of new reviewers. New reviewers may know nothing about highlighted terms and their significance. Highlight terms are so overwhelmed in the number that new reviewers may simply ignore them all. Many of highlighted terms are related to issues in the coding table or individual database tables. New reviewers may need to know a hundred attorney names out of thousands of names, several dozen target products out of hundreds of products, and several dozens service contracts out of thousands of contracts. By looking at the relevant terms and displayed definitions in reference tables, they can quickly learn the target subsets and excluded subset for each category of elementary facts or issues.

Reference tables can help the reviewer find help information instantly. Assuming that a reviewer encounters four types of documents: A, B, C and D. For type A documents, the reviewer needs to know a subset of O facts; for type B documents, the reviewer needs to know a subset of P facts; for type C documents, the reviewer to know a subset of Q facts; and for type D documents, the reviewer needs to know a subset of R facts. Each of the reference table may contain one subset of facts. By reviewing reference tables by using rotating bar, the reviewer can conveniently see all of the facts.

If a document contains a list of meeting attendees, and the reviewer wants to know if any of the names are among a group of target employees, the reviewer clicks on the name table in the rotating bar which has been set up to retrieve target employees. Now, the reviewer can compare the highlighted names in the document with the names in the reference table. The reviewer may pay attention to some highlighted names and the information about them in the reference table (similar to FIG. 16). Next document may contain totally different facts, and the reviewer can use a different reference table.

2. Create Reference Tables

The reference table feature may be implemented as an integrated tool of an existing document review system or as a function of a separate review-assisting system.

(a). Create Database Tables and Table Structures for Storing Source Data for Reference Tables The reference tables have universal applicability. Their source data may be the search keys for constructing review pool, search keys for creating highlights in documents, data records in the shared table in an integrated system, data records in one or more elementary fact tables in a separate system or integrated system, or any equivalent files.

Source data may be the product of those sources and other supplemental data. The source data may be from those stated sources in real time or stored in a separate database table or equivalent file. To separate special terms from generic terms, special terms may be kept in a separate block in a file or saved in database table marked with "special" type. If the source data are stored in a shared table, the shared table should have a main type and a sub-type, with an option of using additional sub type.

If a separate review-assisting system is used, source data are entered in the configurable database tables. In this case, all related functions in the review-assisting system are available. If reference tables are implemented on the document review system, a master table or several individual tables may be used.

(b). Set Up the Relevant Terms in Different Scopes

The number and types of reference tables may be organized according to the individual database tables used in the discovery information management system. They are designed to show information for the most relevant terms rather than any terms. Main tables in a separate system and virtual table/main types in the integrated system are changed to show different examples.

The reference table should allow the reviewer to selectively display the terms in varying scopes: (1) certain special terms in the current document, (2) all special terms in the current document, (3) all highlighted special and generic terms in the current document, (4) certain special terms in the source data, (5) all special terms in the source data, (6) all special terms plus some generic terms in the source data, (7) some special terms and some generic terms in the source data, (8) all terms in the source data, and (8) any other combination. The scopes for 1-3 can be achieved by using a similar method for generating intelligent reference tables. Inclusion of all terms from the database in the reference table can be achieved by using the "All" button 650 in FIG. 16. Other varying scopes can be achieved by using "Set up tables" 550 (FIG. 3) and the setup functions in FIGS. 18-20.

The scope and number of reference tables are set up under the page for "Setup Tables." If N series of terms or elements may appear in different documents, the manager sets up N reference tables that will be the default tables for all reviewers. One good way to organize the terms is the table structures or virtual table classification. This classification may favor efficiency. This probability favor appears to be related to corporate capacity limit and human task assignments. If a shared database table is used, the reference tables are set up in two levels of settings. First the type and number of tables are setup by project manager or server administrator. The reviewer can set up the filter for each of the reference tables. If the reviewer encounters a document that requires a new reference table, the reviewer asks the manager to add a new database table or a virtual table. This can be done in the same way for the coding rule table and elementary facts tables.

FIG. 18 shows the simplest setup page for an integrated system using a shared table. It has a page title, a left column and a right column. The left column contains all of the main type values or virtual tables such as names, projects, F-terms (foreign language terms), S-terms (special English Terms), and coding rules. Each of the right drop-down boxes contains all possible sub-type choices. "All" is available for each of the tables. On the basis of the sub-types value, the reference table for the names table shows only client attorneys; a project table in a patent case show all projects; the reference table for the F-terms table shows only "Flagged" terms; the reference table for the S-terms table shows only special English terms; and the reference table for coding rules shows only amended coding rules. The setting data are saved in database or equivalent file under the reviewers account. For each table, the reviewer can change default filter to his own value. All other data not affected will continue to have default values.

FIG. 19 shows the setup page using several individual database tables. It is similar to the setup table in FIG. 18 except that it also provides a column for setting up a sorting order 657 and a page display size 658. The sorting field may be any field in the virtual table or individual tables. For example, the fields in the product table may include product name, product ID, type, sales region, and comment. It has a central column that allows the reviewer to enter values for a filter. The reference table displays terms in the order consistent with the sorting key. It also allows the reviewer to set up the page size.

FIG. 20 shows a more powerful setup tool. When the reviewer selects one virtual table, the system opens a second setup page similar to that shown in FIG. 20. Each virtual table can be treated as a real table, and the system shows all columns for each virtual table. The sub-type is treated as one column just like any of the rest of other columns. This design is more powerful because the reviewer can fine-tune filters. All special requirements concerning date, integer and float should be met. The reviewer can set up ranges for date, integer and float columns. For text fields, the reviewer can use all common logic operations.

The setup page in FIG. 20 is opened from a setup page opened from the "Set up tables" in FIG. 3 or from a proper setup page for integrated system. Since the setup page is generated for the data in configurable database tables, it may have different fields including text, integer, varchar, char, date, and blog. In the section for setting up filers and values 660, the default rule to "All." A date field 663 has two input boxes for start date and end date. Any number, float and double field (661), also has two input boxes for a start value and an end value. The handling program is designed to accept one single value if one of the two input boxes has no value. Text fields 660 and 664 allows the reviewer to select a common logic operation keys such as "contain," "equal to," "not contain," and "not equal to" etc. Since database table contains only permissible field types, the system is able to create a setup page with all those input boxes. In addition, it has the drop-down box 665 for defining a cascading sort order, a drop-down box 666 for selecting a field as a search key for highlighting the document, an input box 667 for setting a page size, and selecting a rotating bar style 667 with options being compact, first-four letters, and full name. For a terms table, the possible choices for the drop-down box 666 would be F-term, S-term, S-error-terms and All etc so reference table can be generated for all terms, foreign terms, English special terms, and English error-terms. The sorting order of terms is based upon the sorting key in an alphabetic order or a reverse alphabetic order. The setting data are saved as the reviewers personal data that controls only personal reference tables for the reviewer. Sophisticated setup is not necessary if the table contains a small number of data records.

Example 11

Use Names Table as a Reference Table

As shown in FIG. 16, in generating detailed information about persons, the server gets the source data from the names table. Each of the records in the names table contains, among others, personal affiliation information. The server retrieves the data records according to the filter that the reviewer has set. The filers may include "attorney," "key-player," "opposing," "third-party," "target" etc. Due to the selected value of the filter, the server displays the definitions or comments only for those names that belong to the selected type. The reviewer may see all names by using "all" for the filter 651.

Example 12

Use the Terms Table as a Reference Table

The records in the terms table (a specific table containing all kinds of terms) may have several types such as "generic" and "special." A filter value, "special", may be set by default, but it is subject to change by the reviewer. When the server generates a reference table, the server retrieves only special terms. Any virtual table may be set up with the filter "All." In this case, the reference table could include all terms in the terms table. Foreign language terms may be placed as part of the main entry, in a dedicated column, or as part of comment. To build a reference table by generic terms can be achieved by using the "setup tables" page. Generic terms can present in the terms table with a special type "generic."

Example 13

Get source data from a shared table for a reference table

If the review-assisting feature uses a shared database table, the server gets proper terms based upon filters: table type, sub-type, and optional sub-sub-type. In generating a reference table containing employee names, the reviewer selects the "names" as virtual table and "employees" as a sub-type.

After the reference table feature is set up, addition of new records will not affect the behaviors of the reference tables. If a newly added record is of the selected sub-type, it will show up in a reference table. If a new sub-type is added, the data records of the new type would automatically appear if the sub-type is set to "all." Some types of data records may have great reference values while others may have no reference value. The manager can determine whether the data records of any new type should appear in a reference table.

Although reference tables should show only special terms in most cases, it has the ability to show all terms, which may be useful in same cases. One the menu in the rotating bar is for generating a reference table for all terms available in the source data.

(c). Creating and Using an Intelligent Reference Table

A reference table may be shown at the time of loading a document according to a setup setting. This reference table is also referred to as a start reference table. It is desirable to show the terms that are most relevant to the document under review.

When the reference table feature is integrated with the review system, the start reference table may be formed to contain only the special terms that are present in the document, but other special terms that are not found in the document do not appear in the reference table. It is preferable that the special terms in the document are highlighted. This type of reference table is referred to as intelligent reference table, as shown in FIG. 15. Generally, each highlighted special term should have a correspondent data record in the shared table or in one of the individual database tables. When a special search term is not in the shared or individual database table, a data record can and should be added to the shared table or an individual table. If the search keys for creating highlights in the document are also from the shared table or individual database tables, then each highlighted term also has a correspondent data record.

In generating a start reference table, the server first searches the document and identifies among the search keys the special terms that exist in the current document, and then finds those data records in the shared table or all individual tables. If search keys for highlighting the document are of different source, the method for creating intelligent table includes the steps of (1) retrieving the search keys from the data source, (2) using the search keys to conduct a search in the document, (3) if the server finds a key in the document text, marks the search key as a "hit key", (4) finding data records for each of the hit keys in the source data, and (5) constructing a reference table using only data records for the hit keys. If the document has M highlighted special terms, the server finds M data records and shows M definition entries. Special terms may include certain useful generic terms if information about them is useful.

Example 14

Display an Intelligent Reference Table

As shown in FIG. 15, an order list contains, among others, customer names, products, order numbers and prices. The system uses all search keys to find and highlight three special terms "Blue Tank", "Stone Chair" "Spin Rice" and "1602.51." The server uses the hit keys to find the data records in the product table. It finds three records with definitions. It also finds a comment for 1602.51 in the shared or individual tables. Foreign language words may be displayed as part of the main entry, in a dedicated column, or as part of definitions. If the reviewer wants to know other terms, the reviewer can use the rotating bar 647 to open other reference tables, and reopen the start intelligent reference table.

If the reference table is implemented in a separate system, the system running reference tables does not know what special terms appear in the document. So, the reference table can show default special terms or display any of the several reference tables arbitrarily in the initial loading. The system for generating reference tables may select the terms on the basis of historical highlight frequencies in building document pool or reviewer initiated searches. The server counters highlight or hit frequencies of terms and save them in a database table by using an accumulator for each of the terms. The reference table shows those special terms that have the highest past highlight frequencies. After a start reference table is displayed, the reviewer can change the reference table by clicking the rotating bar and changing filters in the setup.

The second method is the document review server sends the message to the review-assisting system for generating the reference table so that it knows the hit terms together with the user Id. The review-assisting system then generates an intelligent reference table and sends it to the client computer. This system should work if both systems are deployed on a private network. With minor changes and adjustments, collaboration between the document review system and the review-assisting system can be realized.

(d). Create a Menu Bar ("Rotating Bar") for Opening Different Reference Tables

Considering the distributions of elementary fact data under the focus-of-interest hypothesis, a useful reference table should show the most useful terms and their definitions in light of the document under review. The rotating bar is useful for two reasons.

First, if all reference tables have been set up, the reviewer can open each reference table. By rotating reference tables, the reviewer opens a reference table A for a first document (FIG. 16), a reference table B for a second document (FIG.

17), and a reference table C for a third document. If a document contains no special terms, the reviewer does not need reference table, just skip it.

Second, a single complex document may contain several series of elementary facts such as attorney names, problem projects, and hot legal issues etc. In this case, the reviewer can just open three reference tables in turn: the names reference table, the projects reference table, and the hot-issue reference table, as in the reference tables in FIGS. 21-22.

3. Placement of the Reference Table and Invoking Buttons

The reference table should best meet the following requirements: (1) The reference table is easy to access or lose its utility if the reviewer needs to go through many buttons; (2) The rotating bar allows the reviewer to switch different reference tables by just one click; (3) The reference table should be placed in a location without interrupting review work flow; and (4) The reference table should use display screen area efficiently. All none-functional web elements should be avoided. The reviewer should be allowed to access the setup tool conveniently.

Referring to FIG. 21, a document review system always has a document folder pane, a document list pane 110, a document pane 120, and a coding pane, 100 and document advance tool 130. If the reference table is on a separate system, the invoking button for calling reference tables is placed in the view selecting bar 553 (as shown in FIG. 3), even though it can be placed anywhere. In this case, the reference table would have the normal size, but the reviewer can scale the web page size and place it next to the document pane.

FIG. 21 shows how the reference tables and other features are integrated with a document review platform. The rotating bar 156 for changing reference tables may be placed at the top of the reference table. The setup page for reference tables may be accessed from the "Full DSI" 151 indirectly. The reference setup pages (FIGS. 18-20) may also be invoked from a link placed in the setup page opened from a setup page as "Set up Tables" in FIG. 3. The setup function is available under the managers account. The button for invoking and rotating reference tables may be placed on the top of the reference table.

The reference table 150 may be placed on the left or right side of the document view pane. Its size should be scale-able. To reduce screen usage area, it can be implemented as a pane over another pane with a switch button so that the reviewer can switch between them. It may be implemented as swappable pane for the coding pane, but this arrangement may interfere with review flow. It may be implemented as a swappable pane over the document list pane if document advance button is not blocked.

4. New or Updated Data Records Automatically Show Up in Reference Tables

Data entry forms allow the reviewers to enter data easily and efficiently. The forms provide structural limitations so that data are properly entered. When many database tables are used, the system provides tools allowing the reviewers to select any individual table. It is highly desirable that the system is implemented with a unique tool that the reviewers can use to seek a supervisory ruling or a vote of other reviewers. Any data records entered properly will show up in the right reference tables automatically.

5. Some Application Examples of Using Reference Tables

Example 15

Review of Common Spreadsheets

Custodian maintains order summaries daily, weekly, monthly, and annually. Excel spreadsheets contain customer names, product names, transaction names and comments, all in hundreds. Depending upon review focus, the reviewer opens the reference table for customers, the reference table for products, and the reference table for transaction numbers. By using different filters in setup or adjusting filers, the reviewer may open reference tables for targeted customers, targeted products, and targeted transactions.

Example 16

Review of Litigation Docket

A massive litigation docket contains cases, parties name, attorneys, descriptions, and budgets etc. The investigation focus is to find all past cases related to a matter under current investigation. It is known that a dozen attorneys were exclusively associated with this type of cases. The reviewer opens a reference table showing this small set of attorney names and compares attorney names in the docket against this small list. The reviewer needs to look into details only for entries associated with the small number of attorneys. This reference table, the reviewer has much less need to crosscheck attorney names in the document against attorney names in a master table.

Example 17

Review of Product-Review Articles

Company product-review articles contain discussions for most of its products. The investigation objective is to find a small subset of products from all of its products. Product review articles do not include all background information. The reviewer opens a reference table for all product names for understanding their background or opens a reference table showing only the small subset of products. The reviewer can avoid time-consuming crosscheck for each of the products.

Example 18

Investigation into Corporate Looting

Internal review is conducted to discovery employees responsible for corporate looting. Complaint is directed to ten key employees. The reviewer is instructed to pay a special attention to those employees in all documents concerning commission, gifts, discounts, payment, money and check, vacations and official travels. A reference table containing those employees is used for cross-reference. Also, when an employee is unclear due to name initials, spelling errors, or improper format, the reviewer may need to check it in the whole employee list.

Example 19

Use of a Reference Table to Find Products

If the reviewer sees a product list on the document, the reviewer can select product table as a reference table, with "infringing" as filter. If the reviewer knows all products, there is no need to use the reference table. If the reviewer does not know highlighted product names or numbers, the reviewer can find from parallel reference table definitions about highlighted products. If a product is not in the reference table, the reviewer may invoke the data entry form to add it.

Example 20

Use of a Reference Table to Find Customers

If the document contains a list of customers, the reviewer can select a names table and select "customer" as sub-type to generate the most closely related reference table. If a customer name is not in the reference table, the reviewer may invoke a data entry form to add it.

Example 21

Use of Several Reference Tables for a Complex Document

If the document contains many things, the reviewer may see many highlighted special terms. If the reviewer is unable to understand one or more products, the reviewer can open a product table with "All" sub-type. If the reviewer runs across unfamiliar human names, the reviewer opens a names reference table with a proper filter. The reviewer repeats the process until the document is fully reviewed. If an important term is not in the reference table, the reviewer may open the data entry form to add a record for the term.

L. Use of Tentative Issue Code to Track Translation Problems and Risky Documents In litigation, the need for marking various types of documents arises for various reasons. This issue coding technology can be used to flag any translation issues for specific documents. Since types, compositions and substance of documents are unknown before they are reviewed, it is impossible to foretell what are watched for. Only the whole reviewer team, which has concluded the review, knows all side legal issues. For experienced reviewers who have read the documents, the additional time to add a code in only about 10 seconds, and the total number of the documents may be several to several hundred. The total cost is very small.

This simple implementation helps the review team (1) identify risky legal issues in the earliest time so as to avoid re-review at much high costs, (2) identify potentially risky documents for proper treatment and alerting client attention, (3) prevent scandalous and harmful publicity by keeping out non-relevant and harmful documents, and (4) legally withhold documentary evidence which might trigger new investigation or private cause actions.

Legal process is the most common cause for bringing down companies. A piece of innocent paper may threaten its existence. The client should never trust the protection of confidential agreement, court order, and confidential stamps. It must be assumed that those measures could be defeated lawfully or unlawfully. A full protection must be directed to document production. Many large companies, especially foreign companies, now do their business in multiple technical fields and under many sets of laws. It is impossible for a single super lawyer to imagine that might be the devils in a mountain of documents. There is no way to foretell side legal issues in advance.

The background of all reviewers is often diverse enough to cover the gigantic areas of laws. If the client is big enough to require a thousand of reviewers to review its documents, the review team may very probably have enough collective expertise to cover every area of law relevant to the company (except the foreign matter). A review team may include in-house counsel, past DOJ attorneys, retired criminal attorneys, retired patent attorneys, retired labor-law-attorney, past associates, exit law firm partners, foreign labor attorneys, and foreign attorneys. Some of them might have practiced law for many decades, and such a single experienced lawyer may be able to identify critical legal issues in many fronts. From combining the experience and knowledge of all reviewers, a single super document reviewer emerges. The only thing is to provide a tool and a set of ruling for them to work together.

To deal with uncertain and risky issues in documents, the super attorney would note various documents that might have potential impact on client. Taking care of litigation risks is an inherent function of the lawyer. It was realistic when only one lawyer handled the case and when the client had only a small number of documents. In the complex production model, one difficulty is how to assign tentative issue codes for different issues. Designation of an issue code by management is unrealistic because the need arises whenever a reviewer encounters an issue. If individual reviewers are authorized to assign tentative issue codes, there is no known method for synchronizing tentative issue codes.

A method in the present invention allows all reviewers to assign issue code in real time (FIG. 21). When a reviewer encounters an uncertain issue, the reviewer (1) checks to see if a proper issue code has been assigned in the coding rule table using Find 152, and uses it if the issue code has been assigned, (2) assigns a tentative issue code for the tentative issue tag 157 in compliance with any formality specification, (3) codes the document with the tentative issue code for the tentative issue tag, (4) publishes the tentative issue code together with the document ID and an explanation in the coding table (by using the "Add" button 151 or the "Full DSI" button 150). If a second reviewer runs across this or similar document, the second reviewer is required to check and would find this tentative issue code in the coding table. There is no need to question code assignment because it can be changed globally. To avoid potential misunderstanding, it is important to include document ID so every reviewer can see the document.

This coding and publishing rule is to synchronize the decisions of all reviewers so that they act as a single super lawyer. In the end, some documents may be coded as TIC1, TIC2, TIC3, TIC4, and TIC5 in the tentative issue tag, while the details about all tentative issue codes can be found in the coding rule table. If there is a need to get any or all of those classes of documents in the future, project manager can pull them by searching those issue codes in the tagging database. The project manager can also find related documents by using document IDs from the coding rule table. This protocol helps the reviewers track issues dynamically and avoid duplicate and inconsistent tentative issue codes.

M. Collaborative Review and Translation Environment

1. Complete Translation Environment

Figure 22:
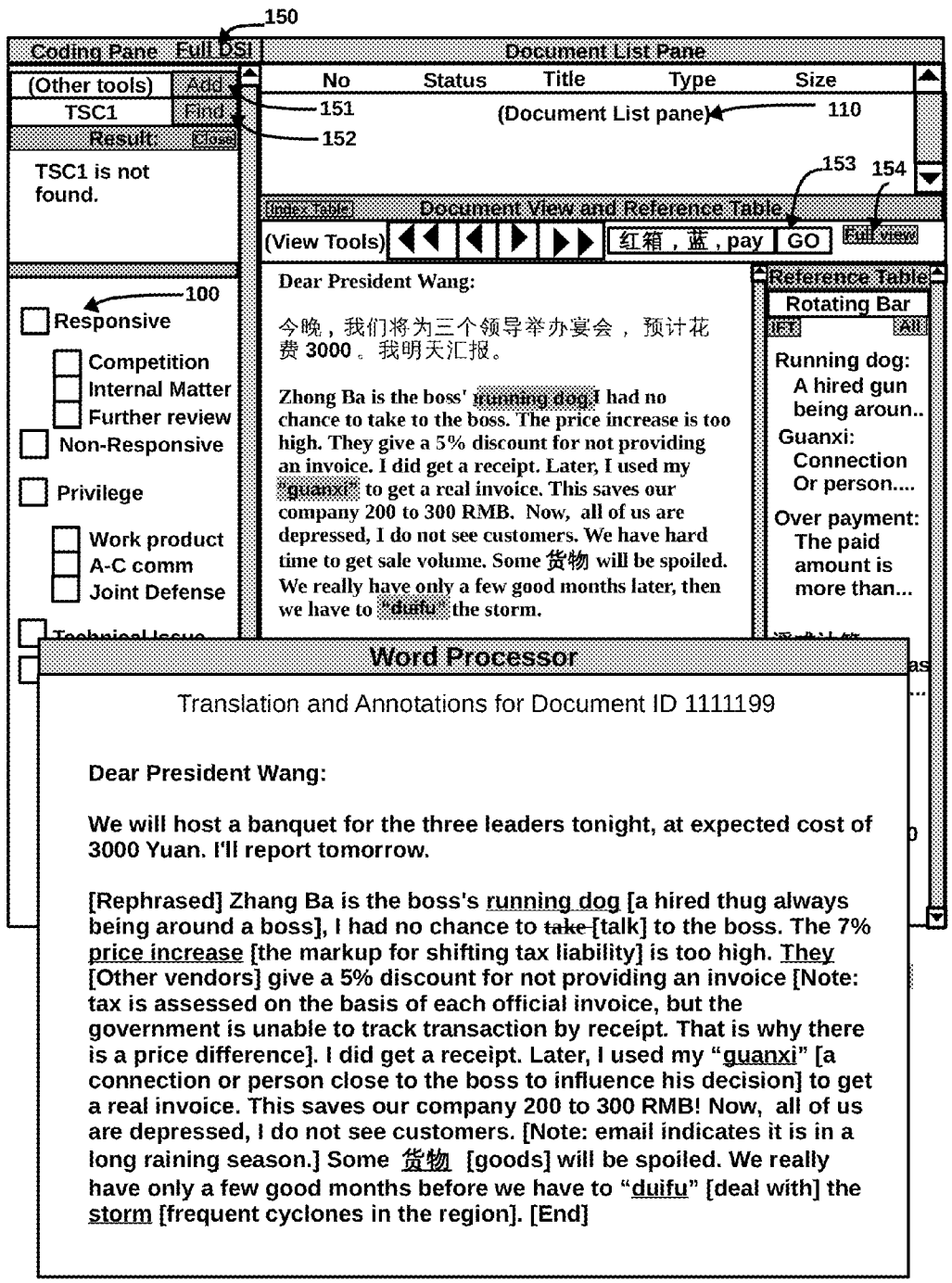
FIG. 22 shows a collaborative translation environment, where Chinese text is translated and English text is edited with its contextual information added.

FIGS. 21-22 shows the final document review and translation environment. Under such a review/translation environment, every tool discussed above, and all contents stored in all configured and fixed database tables are available to the reviewer. The project manager can set up project, and set up configurable tables. Each of the tables contain terms in a source language, correspondent term in a target language, and definition or comment in any language in various ways. Each reviewer can search information at any time by local, interactive and global search methods, add useful case information to the database, use personal pad's search tool to search personal notes, and use reference tables to show special or relevant terms in foreign languages and/or target language. The reviewer can also see updated instructions, updated coding rules, and an index table showing updates. Every feature discussed above or in the discovery information management system or the integrated review-assisting system is available to each of the reviewers in translating documents.

Words and phrases which are closely related to a foreign context may be entered in the term table as a class denoted by type "context." When a document contains any of those terms, the reviewer can find their definitions or comments by local search, global search, interactive search, or reference table. Some example keys are "tax mitigation" "residency" "storm" "raining season" and "landlord." Each of them may carry a great deal of meanings for a given language context.

Tracking translations for documents becomes a simple task of retrieving data records from the translation tracking table and adding data records to the table with an option to validate data records. Translation tracking table works exactly same as any other tables except that it has the additional functions for uploading and downloading both original document and optional function for uploading and downloading translations.

The translation tracking database table discussed above automatically works with a data entry tool for entering new records and search tools for finding data records. When a reviewer has translated a document, the reviewer enters both basic information, the original document, and the translation on the data entry form, and have the data record saved on the server and files uploaded to the server to be stored in the database table or other designated storage space. To avoid potential duplicate work, it is preferable to create a data record for the document before starting translation so that other reviewers can know that someone has started translating a particular document. Upon the finishing of the translation, the reviewer then uploads the finished translation into the server for immediate access by other reviewers, if it is required.

When a reviewer encounters a document and needs to decide whether the document has been translated, the reviewer first checks the translation tracking table. It is preferable to open a translation tracking table or refresh an opened table to get the latest information. If the table is large, the reviewer may have to use search function. If the reviewer finds that a translation has been done, the reviewer can add a note in the reviewer's note, check the check box for the translation tag in the coding pane, or write a comment in any other suitable field.

This translation tracking table and the precedence rule still cannot eliminate all potential problems in several situations. One of the situations is that when a document is so large that only part of the substance is relevant. For example, if an email contains more than 20 back and forth responses, it would be very unproductive for the reviewer to identify important substance. A chain email contains 20 component email, first ten does not have any responsive information for translation, but the email message at 11 contains responsive materials and the email at 15 contains additional relevant materials. Therefore, the reviewer may use the address block of the message 11 as the logging information. The address information in the relevant message and other characteristic words and phrases in the description field or body may be used for identification purpose.

The second class of documents requiring special handling is large database, compilation, excel file, and large presentation when part of its content can be treated as independent from other contents. For example, the entries in many excel files (for maintenance of data records) are independent of each other. For this file, the only thing need to be translated is the column head and those entries that require translation. If there are multiple numbered lines, those lines may be placed next to each other with or without indicating omitted matter. If there are numbered in the table, it should indicate page number and the approximate location on the page for each of the entries.

2. Minimizing Term Multiplicity

In the native language, there is only one way to write a name, and any modification to any words would mean something else. This rule seems universal in any language. In English, entity names and person names cannot be freely replaced with synonyms. For similar reasons, an identical person's name may appear in different documents but they are actually two different people. Indeed, product name, material name, shipping description, location, legal issues etc. may be translated into different terms in different translations. Date and time can also cause problem when a source nation uses its own calendar. Daytime difference can be an issue in certain cases where the timing of an action plays a role.

Organization structures and company names are based upon business needs, rather than language precision and expression elegance. Product common names may be translated in different ways. Virtually any number of possible ways can be created. An effort to map their relationships would consume an extremely large amount of time. Global term multiplicity of translations can be summarized in the following table.

TABLE 5

| Type of Terms | The Contributions for Multiple Translations | Aggregating Factors (other than Number of Attorneys and Number of Translators) | Significant Level |
|---|---|---|---|
| Human Names | Sound translation v. official counterparts v. arbitrary foreign name; spelling variants, short names; different titles, changes in surnames | The number of documents and degree of cultural differences | Very |
| Corporate Names and Corporate Structure | Most corporate units may be translated into different words, and many organizations may contain functional words which are subject to different translations | Strange structures, uncommon business, and use of ordinary words. | Very |
| Places | Country names, province names, city names, localities names may have full name, short names and variants. | Nation, language, and culture | Depend |
| Facility Names | Each of the characters or words are subject to (A*B*C . . . ) ways | Length of words, use of place names, | Very |

TABLE 5-continued

Global Term Multiplicity for Certain Target Terms

| Type of Terms | The Contributions for Multiple Translations | Aggregating Factors (other than Number of Attorneys and Number of Translators) | Significant Level |
|---|---|---|---|
| | of translations according to the combination rule | frequency of ordinary words. | |
| Product Names | Official names, descriptive names, common names, short names, and notation systems. | Nature of products, length of names, and naming convention | |
| Transaction Names | All descriptive transaction names may be translated in (A*B*C . . . ) ways according to combination rule | Transaction complexity, lengths of names, and naming convention | |
| Important Corporate Events | All descriptive event names may be translated in (A*B*C . . . ) ways according to combination rule | Company history, acquisition frequencies, and events. | |
| Relevant Legal Matters | All descriptive legal matter names may be translated in (A*B*C . . . ) ways according to combination rule | The nature of business, company history, and naming convention. | |
| Date and Time | Different calendar systems, and in some case, the day time differences | In the nation using a different calendar system, hours is important only in certain cases | |

As illustrated above, possible ways of translations are due to the number of words and the possible ways of translations of each word. The large number of translators and the large number of documents always facilitated the creation of a large number of different, inconsistent and even conflicting translations.

Term multiplicity cannot be eliminated entirely, but can be reduced and even eliminated for certain types of narrowly defined terms ("target terms"). The scope of the target terms should be based upon what is shown in Table 5 with proper adjustment for specific cases. The most probable adjustment is to include in the target terms any words and phrases revolving the issues in dispute. While it is hard to imagine, the scope of this sub class of terms can be easily determined. For example, it a critical issue in a case is a company's marketing conduct, then all terms concerning its marketing activities become target terms. A particular market activity known as fax-back may not be rephrased as fax return, fax response, returned fax, replied fax, fax reply etc. even though they can be used in ordinary situations. If an issue in dispute is certain fruit species, then all terms revolving fruit species must be used consistently.

The major steps for minimizing term multiplicity in the target terms include (1) defining the scope of target terms, (2) creating a database table or using an existing database table, (3) adding terms to the database table by each or some of the reviewers in reviewing documents, (4) translating the document, which include the steps of identifying each of the target terms in the original document, finding its correspondent term from the database table, and using its correspondent term as the translation of the target terms, and (5) saving the translation on the client computer and upload it to a server by a file uploading form ("document uploading form") or by email. Every function and feature discussed above or disclosed in cited patent disclosure can be used.

It is a wished that multiplicity in other aspects be narrowed down as much as possible. Considering expression diversity in native language and potential costs for achieving it, it is impracticable. The only thing that may be achievable is to set up an outer boundary for stylistic and terminological diversity. It is hoped that a group of reviewers can gradually develop similar translation styles under the guidance published in instructions and coding rules so that they will not create completely different translations for an identical document.

3. Edit Documents Created by Second Language Speakers

There is no convention to "translate" or "edit" documents created by second language speakers in the legal industry. If such documents are used as critical evidence or control law in the target language, four-type corrections need to be done: (1) obvious errors should be corrected; (2) distinctive errors in usages, expression orders, plurality etc. should be corrected; (3) all quoted foreign terms such as sound equivalents, original characters or words, or other foreign-language forms should be replaced by the target language equivalents; and (4) and proper adjustment should be made to offset the effects of context shift.

A set of special terms in a dedicated table or as a type in the all-terms table are created holding terms such as running dog, residence, over payment . . . . If those terms are stored in a dedicated table, they may be designated with several types ("common," "distinctive" and "personal" etc.), depending upon nature of errors. The common usage errors in many languages by a unique second language speakers (common English usage errors by Native Japanese Speakers) can be found from published teaching books and other publications. A table can be created in a matter of hours and terms can be loaded into dedicated terms table or shared terms table with a type value. All functions implemented in discovery information management system or an integrated review-assisting system can be used for those terms.

In editing such documents, it is preferable to correct obvious errors first. There is no rule for defining obvious errors but it is obvious to a native speaker. This type of errors are normally influenced by their native language. Quoted terms, which may have many forms in their native languages, should be replaced by English equivalents. This is a word-for-word replacement in light of verbal context. Finally, the effects of context shift on perceived facts should be offset. This task may be the most painful and difficult one in litigation. This may require special skills and methodology.

The tasks of translating and editing a Chinese document is shown in FIG. 22. The document contains an email "From: Zen Ping Zhang; To: President Wang; Sent: Apr. 10, 2009: 01:12:30; Re: 宴会/invoice," with the following text:

今晚, 我们将为三个 领导举办宴会, 预计花费 3000。我明天汇报。

Dear President Wang: Zhang Ba is the boss' running dog, I had no chance to take to the boss. The price increase is too high. They give a 5% discount for not providing an invoice. I did get a receipt. Later, I used my "guanxi" to get a real invoice. This saves our company 200 to 300 RMB. Now, all of us are depressed, I do not see customers. We have a hard time to get sale volume. Some 货物 will be spoiled. We really have only a few good months later, then we have to "duifu" the storm.

This document is comprehensible in the eyes of native Chinese reviewers, but is totally incomprehensible to native English readers. A large number of documents like this can found in any case. In light of language context in China, the English part is edited as follows:

Tonight, we will host a banquet for the three leaders at expected cost of 3,000 RMB. I'll report tomorrow.

[Edited] Zhang Ba is the boss' running dog [a hired-thug always being around a boss], I had no chance to take [talk] to the boss. The 7% price increase [the markup for shifting tax liability] is too high. They [other vendors] give a 5% discount for not providing an invoice [Note: tax is assessed for each official invoice and the government is able to track each official invoice, but does not track receipt. That is why there is a price difference]. I did get a receipt. Later, I used my "guanxi" [connection or person close to the boss to influence his decision] to get a real invoice. This saves our company 200 to 300 RMB! Now, all of us are depressed, I do not see customers. [Note: the email indicates it is in a long raining season.] Some 货物 [goods] will be spoiled. We really have only a few good months later before we have to "duifu" [deal with] the storm [frequent cyclones]. [end]

This annotated text can convey original meaning. As shown in FIG. 22, all tools discussed above are available for the translator. Real-time case information, reference table, coding rule table, foreign terms table, special terms table, and other factual tables are available to the reviewer during translation. Those tables contain the work products of the entire review team from the first day of review. Each of the reviewers thus stands on the "shoulder of a superman." The translated and edited document is sent to database or folder on a server by a file uploading form or to an email address by email.

N. Utilize Reviewers' Experience and Knowledge

Review quality cannot exceed what the reviewers can deliver. Identifying hot issues and skillful treatment of risky documents depend upon reviewer's experience and skills. Many important facts and legal issues are spotted in document review. Sometimes, certain hot issues are spotted outsides the scope of intended review. Experienced reviewers are in a much better position to identify documents in support of claim or defenses. Long experience cannot be substituted by several days of training. Due to the extreme difficulty of the tasks, acceptable translations are not achievable by reviewers or translators who have neither required knowledge nor substantial experience.

The review industry needs to develop a method for defining relevant experience and a method for using experience. In selecting reviewers, consideration should be given to (1) the reviewer experience in reviewing similar cases, (2) the reviewers knowledge of underlying technologies, (3) the reviewers experience in using review platforms or similar platforms, and (4) the review substantive legal knowledge.

The real question is whether a review environment can properly use reviewer's experience. First, a review environment may be unable to utilize review experience due to the total mismatch between their experience and the assigned documents. Second, experience can be a liability in a review environment where review plan, instructions, coding tree, and litigation strategies are at odds with the super lawyer's practice standards and the management is unable to provide adequate reasons for their departures. In such a situation, computer algorithms, new graduates, and high school students can do better job.

The review industry needs to develop a standard review classification and assignment system for matching reviewers with documents. Each reviewer should be assigned with one or more classification codes. In processing documents, documents are assigned with one or more standard review classification codes. The assignment program tries to match the reviewers with the documents by review classification codes. By using this system, whenever possible, ledges and journals are assigned to accountant reviewers, transaction documents are assigned to those who know secured transactions, R&D documents are assigned to technical reviewers, and documents of general nature may be assigned to all reviewers. Assignment of documents outside reviewer's expertise should be made as fallback measure. Difficult documents may be subject to review by two or more reviewers with different backgrounds. All reviewers should be charged with responsibilities to identify risky documents. Since this method is implemented in the assignment program, it is not shown FIG. 21.

O. Other Critical Factors that Affect Document Review and Translation Performance The method of present invention provides the chance to achieve the highest review and translation performance possible in theory.

However, actual performance is what the reviewers can deliver. Reviewers' performance depends upon review experience, reviewer's desire to make great contributions, document context conditions, and the effects of task quota. If the reviewers lack incentive to make positive contributions, the method of the present invention is destined to fail. Total disruption of document cross-document verbal context and transaction context turns a review into a guessing game. When reviewers are demanded or expected to code certain number of documents, reviewers become competitors. The competition will defeat collaborative spirits for them to help others by contributing their critical work products. Any quota requirement, whether it expressed or practiced in retention policy, will totally defeat the method of the present invention. Finally, the virtue of the collaborative discovery method for the complex representation model is based upon the assumption that all players care about the interest of their clients. Any distrust between players will also make the method unworkable. Some problems can be addressed by changing liability laws, staffing practices, retention incentives, and conflict-of-interest rule.

In those exemplary embodiments of the present invention, specific components, hardware parts, arrangements, and processes are used. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A method for improving consistency and accuracy of the translations of a large number of documents being translated from a source language to a target language for a legal proceeding or a legal matter by a group of users, each of the group of users being on a client computer connected to at least one server in a network, the method comprising the steps of:
    determining at least one term type for target terms which are required to be used consistently in all translations by all of the group of users;
    providing at least one database table for storing the target terms of the term types on the at least one server, wherein, the at least one database table comprises fields for storing an original term in the source language, a correspondent term in the target language, and a correspondent definition or comment;
    generating a user interface for sharing the target terms, wherein the user interface supports a search tool for searching target terms on the at least one server and a data entry tool for entering the target terms into the at least one database table;
    obtaining a document, as a source document, from the at least one server and opening the source document on the client computer of any user of the group of users for review;
    identifying target terms of the term type by their original terms in the source document for collection, wherein each of the identified target terms is collected by determining a correspondent term in the target language and creating a correspondent definition or comment; opening a data entry form of the data entry tool for adding each of the target terms; filling in the data entry form with the original term, the correspondent term, and the correspondent definition or comment, as a data record, by the any user of the group of users; submitting the filled data entry form to the at least one server; getting the data record from the submitted data entry form on the at least one server; and saving the data record in the at least one database table on the at least one server for immediate access by all of the group of users;
    obtaining a document from the at least one server and/or a computer in the network and opening the document, as a current document, for review, wherein the current document contains at least one target term in the form of an original term;
    opening the current document in a supported web form or in a suitable word processing application on the client computer for translation, wherein each of the at least one target term in the current document is translated by searching the original term in the at least one database table as a key to find the correspondent term in the target language and corespondent definition or comment, and using a found correspondent term as the translation of the original term in the translation or using the correspondent definition or comment as an annotation;
    saving the translation on the client computer; and
    uploading the translation to the at least one server for storage by using a document uploading form or emailing the translation to a designated email address.

2. The method of claim 1, further comprising the steps of identifying translations by searching the target terms that have been used improperly and amending the identified translations by the group of users.

3. The method of claim 1, further comprising the steps of generating an intelligent reference table at time of loading a document for review, wherein the intelligent reference table contains an original term and a correspondent definition for each of target terms that appears in the document.

4. The method of claim 3, further comprising the step of generating a rotating menu bar for switching between different intelligent reference tables consistent with the term types of the target terms in database tables or virtual tables, or a predetermined term classification of the term types.

5. The method of claim 1, further comprising the steps of generating a setup page for a search tool using a plurality of personal search key arrays and saving the personal search key arrays on the at least one server for any user of the group of users, conducting a current search using an array of manually entered keys, or conducting a search using one of the saved personal search key arrays.

6. The method of claim 1, further comprising the step of adding a new term type to the at least one database table or adding a new database table for storing the target terms of the new term type within a project life, wherein the new term type is at least one selected from the group consisting of names, entity identities, company divisions, places, facilities, products, transactions, trademarks, logos, important events, legal matter, uncommon abbreviations, key technologies, usage and spelling errors, generic terms, special terms, foreign language terms, and misused terms.

7. The method of claim 1, further comprising the steps of conducting a search for a coding rule, assigning a tentative issue code for a document, submitting the tentative issue code together with other coding data to the at least one server, and saving the submitted tentative issue code together with other coding data on the at least one server for immediate access by all users of the group of users.

8. A method for translating or editing the text of documents created by second-language speakers in a source language locality by a group of users on client computers connected to at least one server in a network, the documents being intended for use by native speakers in a target language locality, the method comprising the steps of:
    providing at least one database table for storing data records for terms which are misused by the second language speakers, wherein each of the data records comprises a misused term, a correct counterpart, and a correspondent explanation;
    generating a user interface for each user of the group of users for sharing the terms, wherein the user interface supports a search tool for searching the terms on the at least one server and a data entry tool for entering the terms on at least one database table on the at least one server;
    sending a document, as a source document, to the client computer of any user of the group of users for review;
    identifying in the source document each of the terms which is misused for collection, wherein each of the terms is collected by the any user of the group of users by opening a data entry form of the data entry tool; filling in the data entry form with the term, the correct counterpart, and the correspondent explanation, as a data record; submitting the filled data entry form to the at least one server; getting the data record from the submitted data entry form; and saving the data record in the at least one database table on the at least one server for immediate access by all users of the group of users;

obtaining a document, as a subject document, from the at least one server or a computer on the network, and storing the subject document on the client computer of the any user of the group of users, wherein the subject document contains at least one misused term;

editing the subject document in a suitable word processing application by the any user of the group of users on the client computer, wherein the subject document is edited by correcting obvious typing, spelling, or grammar errors; identifying each of the at least one misused term, searching each of the misused terms in the at least one database table on the at least one server to find its correct counterpart, and replacing each of the at least one misused term with the correct counterpart or correcting the at least one misused term according to the correspondent explanation; and/or adding annotations for terms which are associated with the source language context;

saving the subject document, as an edited subject document, on the client computer; and uploading the edited subject document to the at least one server for storage by using a document uploading form or emailing the edited subject document to a designated email address.

9. The method of claim 8, further comprising the steps of generating an intelligent reference table showing correct counterparts or correspondent explanations for the misused terms highlighted in the subject document, or generating an intelligent reference table showing a predetermined number of the misused terms having the highest historical highlight or appearance frequencies.

10. The method of claim 8, further comprising the steps of constructing a master term table comprising terms that are often misused by second language speakers, correct counterparts, and correspondent explanations and loading the master term table into the at least one database table so that the subject documents are searched using the terms in the master term table and highlighted in the documents, and displayed in a reference table together with correct counterparts and correspondent explanations.

11. The method of claim 8, further comprising the steps of constructing a master term table containing a large number of terms clearly associated with the source language context and their correspondent explanations, and loading the master term table into the at least one database table, as a separate type, for use in creating annotations that assist native speakers in the target language context to understand subject documents.

12. The method of claim 8, further comprising the steps of identifying a quoted term in a language used in the locality of document creation in a source document by any user of the group of users on the client computer, entering the quoted term with a correspondent term in the at least one database table on the at least one server by using a data entry form, searching a subject document using the quoted terms in the at least one database table by any user of the group of users, and replacing each of the found quoted terms by its correspondent term for the target language context.

13. The method of claim 8, further comprising the steps of searching a subject document and highlighting words and phrases that match the misused terms in the at least one database table, and generating a reference table showing only definitions or explanations for each of the misused terms.

14. A method for tracking document translations for an e-discovery project by a group of users on client computers connected to at least one server in a network, the method comprising the steps of:

determining at least one term type for target terms which are required to be used consistently in all translations by all users of the group of users;

providing at least one database table for storing the target terms, wherein the at least one database table contains fields for storing an original term in a source language, a correspondent term in a target language, and a correspondent definition or comment for each of the target terms;

creating a translation tracking database table for storing data records comprising document identifying information, document description, and document file or information on retrieving a translated document;

generating a user interface for each of the client computers, wherein the user interface supports tools for conducting document review, a tool for searching the translation tracking database table, and a tool for displaying the content of the translation tracking table;

collecting target terms by each user of the group of users in course of document review in the steps of identifying each of at least one target term by its original term in the source document, determining a correspondent term in the target language, and creating a correspondent definition or comment; opening a data entry form of a data entry tool for adding the target term; filling in the data entry form with the original term in the source language, the correspondent term in the target language, and the definition or comment, as a data record, by the each user of the group of users; submitting the filled data entry form to the at least one server; getting the data record from the submitted data entry form; and saving the data record in the at least one database table on the at least one server for immediate access by all of the group of users;

creating a pool of translations of documents during document review by the each user of the group of users in the steps of opening the current document in the user interface or in a suitable word processing application on the client computer for translation, wherein each of at least one target term in the subject document is translated by searching the at least one database table using the original term in the source language as a search key to find the correspondent term in the target language, and using the found correspondent term as the translation of the original term in the translation or use the correspondent definition or comment to provide an annotation, wherein, upon loading a document, as a current document, for review, the each user of the group of users searches in the translation tracking database table for documents that are same or similar to the current document, retrieves data records concerning translated documents and reviews retrieved data records on the user interface, downloads a translated document from the translation tracking table on the at least one server or a designed storage space of a computer in the network to the client computer, opens the translated document in the user interface or in a suitable word processing application, compares the translated document with the current document to determine if the current document needs to be translated, and translates the current document in the user interface on the client computer or in the word processing application on the client computer or a separate computer if the current document needs to be translated; and repeats the steps above from loading a document as a current document for review to translating the current document.

15. The method of claim 14, wherein the translation tracking database table further comprises a field for storing an original document for a translated document and the user interface contains a feature for downloading the original document.

16. The method of claim 14, wherein the document identifying information comprises at least four fields selected from the group consisting of document ID, author name, recipient name, date, file name, file size, and file type.

17. The method of claim 14, further comprising the steps of validating a data record on the translation tracking table by clicking a validation button on a web page showing the content of the translation tracking table and/or by clicking a vote button on a web page showing the context of the translation tracking table.

18. The method of claim 14, further comprising the steps of editing any of the data records in the translation tracking table by using an edit tool or edit table tool, uploading an amended translation or an original document to replace or supplement an existing translation or an existing original document, and deleting a data record from the translation tracking table.

19. The method of claim 14, further comprising the steps of sorting the translation tracking table by using a sorting key selected from the group consisting of author name, recipient name, copy recipient names, document date, description, file name, file size, and file type, translation date.

20. The method of claim 14, further comprising the step of generating an index table showing latest changes in translation guidance and coding rules for any of the group of users.

\* \* \* \* \*